United States Patent
Ding et al.

(10) Patent No.: US 11,568,261 B2
(45) Date of Patent: Jan. 31, 2023

(54) SYSTEM AND METHOD FOR MAX-MARGIN ADVERSARIAL TRAINING

(71) Applicant: ROYAL BANK OF CANADA, Montreal (CA)

(72) Inventors: Weiguang Ding, Toronto (CA); Yash Sharma, Toronto (CA); Yik Chau Lui, Toronto (CA); Ruitong Huang, Toronto (CA)

(73) Assignee: ROYAL BANK OF CANADA, Montreal (CA)

( * ) Notice: Subject to any disclaimer, the term of this patent is extended or adjusted under 35 U.S.C. 154(b) by 490 days.

(21) Appl. No.: 16/664,139

(22) Filed: Oct. 25, 2019

(65) Prior Publication Data

US 2020/0134468 A1    Apr. 30, 2020

Related U.S. Application Data

(60) Provisional application No. 62/751,281, filed on Oct. 26, 2018.

(51) Int. Cl.
*G06N 3/08*    (2006.01)
*G06K 9/62*    (2022.01)

(52) U.S. Cl.
CPC .......... *G06N 3/084* (2013.01); *G06K 9/6256* (2013.01); *G06K 9/6267* (2013.01)

(58) Field of Classification Search
CPC ...... G06N 3/084; G06N 20/10; G06N 3/0454; G06N 3/0472; G06N 3/0481; G06N 3/088; G06N 20/20; G06N 3/08; G06N 20/00; G06N 3/0445; G06K 9/6256; G06K 9/6267; G06K 9/6276; G06K 9/6257; G06K 9/627; G06K 9/6271; G06V 10/82;
(Continued)

(56) References Cited

U.S. PATENT DOCUMENTS 8,266,083 B2 * 9/2012 Weston ................ G06K 9/6276
706/45
9,681,125 B2 * 6/2017 Wang ..................... H04N 19/23
(Continued)

OTHER PUBLICATIONS

"Adversarial Perturbations Against Deep Neural Networks for Malware Classification"; Kathrin Grosse, arXiv:1606.04435v2 [cs.CR] Jun. 16, 2016 (Year: 2016).*
(Continued)

*Primary Examiner* — Michael S Osinski
(74) *Attorney, Agent, or Firm* — Norton Rose Fulbright Canada LLP

(57) ABSTRACT

A system for generating an adversarial example in respect of a neural network, the adversarial example generated to improve a margin defined as a distance from a data example to a neural network decision boundary. The system includes a data receiver configured to receive one or more data sets including at least one data set representing a benign training example (x); an adversarial generator engine configured to: generate, using the neural network, a first adversarial example (Adv1) having a perturbation length epsilon1 against x; conduct a search in a direction (Adv1-x) using the neural network; and to generate, using the neural network, a second adversarial example (Adv2) having a perturbation length epsilon2 based at least on an output of a search in the direction (Adv1-x).

21 Claims, 12 Drawing Sheets

(58) Field of Classification Search
CPC .... G06V 10/462; G06V 20/00; G06V 30/194; G06T 2207/20081; G06T 2207/20084; G06T 5/002; G06T 5/003; G06T 7/0012

See application file for complete search history.

(56) References Cited

U.S. PATENT DOCUMENTS

| | | | |
|---|---|---|---|
| 10,007,866 B2* | 6/2018 | Criminisi | G06V 10/82 |
| 11,093,820 B2* | 8/2021 | Zhang | G06N 20/20 |
| 11,126,898 B2* | 9/2021 | Speiser | G06V 30/413 |
| 2017/0316281 A1* | 11/2017 | Criminisi | G06K 9/6257 |
| 2019/0098034 A1* | 3/2019 | Wakasugi | G06T 7/13 |
| 2019/0122378 A1* | 4/2019 | Aswin | G06T 5/003 |
| 2019/0130110 A1* | 5/2019 | Lee | G06N 3/02 |
| 2019/0164287 A1* | 5/2019 | Gregson | G06T 7/0014 |
| 2019/0197466 A1* | 6/2019 | Hand, III | G06V 10/454 |
| 2019/0340456 A1* | 11/2019 | Odashima | G06K 9/6256 |
| 2020/0065942 A1* | 2/2020 | Hiasa | G06T 5/50 |
| 2020/0097767 A1* | 3/2020 | Perry | G06K 9/6256 |
| 2021/0019878 A1* | 1/2021 | Iizawa | G06T 7/0008 |
| 2021/0273964 A1* | 9/2021 | Izumi | H04L 63/1416 |
| 2021/0318661 A1* | 10/2021 | Niu | G05B 13/048 |

OTHER PUBLICATIONS

"Feature Squeezing: Detecting Adversarial Examples in Deep Neural Networks"; Weilin Xu, arXiv:1704.01155v2 [cs.CV] Dec. 5, 2017 (Year: 2017).*

Jonathan Uesato et al., Adversarial Risk and the Dangers of Evaluating Against Weak Attacks, arXiv:1802.05666v2 [cs.LG], Jun. 12, 2018.

Ali Shafahi et al., Adversarial Training for Free!, arXiv:1904.12843v2 [cs.LG], Nov. 20, 2019.

Zang Yan et al., Adversarial Margin Maximization Networks, arXiv:1911.05916v1 [cs.LG], Nov. 14, 2019.

Gavin Weiguang Ding et al., Advertorch v01 An Adversarial Robustness Toolbox based on PyTorch, http://arxiv.org/abs/1902.07623v1, Feb. 20, 2019.

Jeremy Cohen et al., Certified Adversarial Robustness via Randomized Smoothing, arXiv:1902.02918v2 [cs.LG], Jun. 15, 2019.

Jérôme Rony et al., Decoupling Direction and Norm for Efficient Gradient-Based L2 Adversarial Attacks and Defenses, arXiv:1811.09600v3 [cs.CV], Apr. 3, 2019.

Vladimir N. Vapnik, The Nature of Statistical Learning Theory, Springer, 1995.

Matthias Hein et al., Formal Guarantees on the Robustness of a Classifier against Adversarial Manipulation, arXiv:1705.08475v2 [cs.LG], Nov. 5, 2017.

Christian Szegedy et al., Intriguing properties of neural networks, arXiv:1312.6199v4 [cs.CV], Feb. 19, 2014.

Gamaleldin F. Elsayed et al., Large Margin Deep Networks for Classification, 32nd Conference on Neural Information Processing Systems (NeurIPS 2018), Montreal, Canada, 2018.

Ruitong Huang et al., Learning With a Strong Adversary, arXiv:1511.03034v6 [cs.LG], Jan. 16, 2016.

Yusuke Tsuzuku et al., Lipschitz-Margin Training: Scalable Certification of Perturbation Invariance for Deep Neural Networks, arXiv:1802.04034v3 [cs.CV], Oct. 31, 2018.

Chuan Guo et al., Low Frequency Adversarial Perturbation, arXiv:1809.08758v2 [cs.CV], Jul. 22, 2019.

Runtian Zhai et al., Macer: Attack-Free and Scalable Robust Training Via Maximizing Certified Radius, arXiv:2001.02378v4 [cs.LG], Mar. 14, 2022.

Nanyang Ye et al., Bayesian Adversarial Learning, 32nd Conference on Neural Information Processing Systems (NeurIPS 2018), Montreal, Canada, 2018.

Jonathan Uesato et al., Are Labels Required for Improving Adversarial Robustness?, 33rd Conference on Neural Information Processing Systems (NeurIPS 2019), Vancouver, Canada, 2019.

Anish Athalye et al., Obfuscated Gradients Give a False Sense of Security: Circumventing Defenses to Adversarial Examples, arXiv:1802.00420v4 [cs.LG], Jul. 31, 2018.

YisenWang et al., On the Convergence and Robustness of Adversarial Training, arXiv:2112.08304v2 [cs.LG], Apr. 23, 2022.

Gavin Weiguang Ding et al., On the Sensitivity of Adversarial Robustness To Input Data Distributions, Published as a conference paper at ICLR 2019.

Moustapha Cisse et al., Parseval Networks: Improving Robustness to Adversarial Examples, arXiv:1704.08847v2 [stat.ML], May 2, 2017.

Francesco Croce et al., Provable Robustness of ReLU networks via Maximization of Linear Regions, Proceedings of the 22nd International Conference on Artificial Intelligence and Statistics (AISTATS) 2019, Naha, Okinawa, Japan, PMLR: vol. 89.

Jure Sokolic et al., Robust Large Margin Deep Neural Networks, arXiv:1605.08254v3 [stat.ML], May 23, 2017.

Yao-Liang Yu, The Differentiability of the Upper Envelop, Department of Computing Science, University of Alberta, Nov. 7, 2012.

Huan Zhang et al., The Limitations of Adversarial Training and the Blind-Spot Attack, Published as a conference paper at ICLR 2019.

Hongyang Zhang et al., Theoretically Principled Trade-off between Robustness and Accuracy, arXiv:1901.08573v3 [cs.LG], Jun. 24, 2019.

Aleksander Madry et al., Towards Deep Learning Models Resistant to Adversarial Attacks, arXiv:1706.06083v4 [stat.ML], Sep. 4, 2019.

Nicholas Carlini et al., Towards Evaluating the Robustness of Neural Networks, arXiv:1608.04644v2 [cs.CR], Mar. 22, 2017.

Yair Carmon et al., Unlabeled Data Improves Adversarial Robustness, arXiv:1905.13736v4 [stat.ML], Jan. 13, 2022.

Dan Hendrycks et al., Using Pre-Training Can Improve Model Robustness and Uncertainty, rearXiv: 1901.09960v5 [cs.LG], Oct. 20, 2019.

Sergey Zagoruyko et al., Wide Residual Networks, arXiv:1605.07146v4 [cs.CV], Jun. 14, 2017.

Dinghuai Zhang et al., You Only Propagate Once: Accelerating Adversarial Training via Maximal Principle, arXiv:1905.00877v6 [stat.ML], Nov. 1, 2019.

Alexander Matyasko et al., Margin Maximization for Robust Classification using Deep Learning, 978-1-5090-6182—Feb. 17, 2017, IEEE.

* cited by examiner

Algorithm 1 Max-Margin Adversarial Training. $\epsilon$ contains perturbation lengths of training data. $\epsilon_{inc}$ is the increment of perturbation length. $\epsilon_{min}$ is the minimum perturbation length. $\epsilon_{max}$ is the maximum perturbation length. $PGD(X, \epsilon)$ represents PGD attacked $X$ with maximum perturbation length $\epsilon$.

1: Randomly initialize network $N$
2: Initialize every element of $\epsilon$ as $\epsilon_{min}$
3: repeat
4:   Read minibatch $B = \{X^1, \ldots, X^m\}$ from training set
5:   Make predictions on $B$ using $N$
6:   Divide $B$ into two, wrongly predicted $B^0$ and correctly predicted $B^1$
7:   for each $X^i$ in $B^0$ do
8:     Retrieve perturbation length $\epsilon^i$ from $\epsilon$
9:     Adversarial example $X^i_{adv} = PGD(X^i, \epsilon^i)$
10:     Unit perturbation $\delta_{unit} = \dfrac{X^i_{adv} - X^i}{\|X^i_{adv} - X^i\|}$
11:     if prediction on $X^i_{adv}$ is correct then
12:       $\epsilon^i_{new} = \|\arg\min_\eta [L(X^i + \eta \delta_{unit})]\|, \eta \in [\epsilon^i, \min\{\epsilon^i + \epsilon_{inc}, \epsilon_{max}\}]$
13:     else
14:       $\epsilon^i_{new} = \|\arg\min_\eta [L(X^i + \eta \delta_{unit})]\|, \eta \in (0, \epsilon^i)$
15:     end if
16:     $X^i_{adv} = PGD(X^i, \epsilon^i_{new})$
17:     Update $\epsilon$ with $\epsilon^i_{new}$
18:     Put $X^i_{adv}$ into $B^0_{adv}$
19:   end for
20:   Concatenate $B^0_{adv}$ and $B^1$ as $B'$
21:   Do one training step of network $N$ using minibatch $B'$
22: until training converged or maximum number of steps reached

FIG. 4

SYSTEM AND METHOD FOR MAX-MARGIN ADVERSARIAL TRAINING

CROSS-REFERENCE

This application is a non-provisional of, and claims all benefit, including priority to, U.S. Application No. 62/751,281, entitled "SYSTEM AND METHOD FOR MAX-MARGIN ADVERSARIAL TRAINING", filed on 2018 Oct. 26, incorporated herein by reference in its entirety.

FIELD

Embodiments of the present disclosure generally relate to the field of machine learning, and more specifically, embodiments relate to devices, systems and methods for training neural networks against adversarial attacks.

INTRODUCTION

Trained neural networks are useful in a wide variety of technical applications. Neural networks are often trained against benign inputs (e.g., inputs that are not specifically selected to cause classification problems). However, trained neural networks are vulnerable to adversarial attacks where an artificially constructed imperceptible perturbation is applied to an input, causing a significant drop in the prediction accuracy of an otherwise accurate network.

The level of distortion is measured by the magnitude of the perturbations (e.g. in $l_\infty$ and $l_2$ norms), i.e. the distance from the original input to the perturbed input. For example, in image recognition, a small perturbation that injects differences otherwise unrecognizable to the human eye into an input signal may be able to shift a neural network's output from a correct classification to an incorrect classification.

Taking a benign example into consideration, a neural network may be trained to correctly classify an input image as that of a panda bear. However, adding small changes to this benign example by applying a perturbative noise to the input may cause a shift of classification such that the same image of a panda bear is incorrectly classified by the system as a bucket. The use of such perturbative noises provides a tool with a high probability of success in fooling the neural network as part of an adversarial attack.

In particular, adversarial attacks are example inputs that can be intentionally designed to cause a neural network to make a mistake. Adversarial attacks are especially difficult to defend against because it is difficult to predict what aspects will be used in generating future adversarial examples at the initial training or designing stage of a neural network.

Adversarial attacks are particularly worrisome in implementations where incorrect classifications could lead to significantly adverse outcomes. For example, for image recognition in relation to automated vehicles, an adversarial attack can be used to fool the neural network such that a traffic sign, or a road obstacle is incorrectly interpreted, leading to a crash.

SUMMARY

It is desirable to have a neural network that has a high level of robustness (e.g., improved resistance) against adversarial attacks. Adversarial attacks can, for example, apply artificially constructed perturbations (otherwise imperceptible to humans) to an input, causing a significant drop in the prediction accuracy of an otherwise accurate neural network and the misclassification of said input. Adversarial attacks pose a specific technical problem to be addressed. A technical solution is described herein that is used to generate improved adversarial examples for training a neural network such that the neural network may be able to generate correct outputs despite some level of adversarial attack being present in the test set/production data set. Accordingly, the robustness of the neural network is improved. The embodiments described herein are useful in practical implementations, for example, in relation to verification of various banking or financial institution features such as mortgage provisioning, improved virus/malware detection, and/or machine vision/facial recognition applications.

The disclosure provides a specific improvement over other approaches to adversarial training. In particular, the disclosure improves the adversarial robustness of a neural network from a margin perspective, and proposes Max-Margin Adversarial (MMA) training, a practical approach for direct input margin maximization. Because of its "direct" margin maximization nature, MMA training is an improvement over alternate approaches of adversarial training which have the inherent problem that a perturbation length $\in$ has to be set and fixed throughout the training process, where $\in$ is often set arbitrarily. Moreover, different data points may have different intrinsic robustness, thus fixing one E value for all data points across the training procedure is suboptimal.

As noted herein, fixing the value of the perturbation length can cause undesirable technical outcomes where adversarial examples that are generated for training are not particularly useful for the actual training to improve robustness, because they are either (1) too close to the original such that the machine learning classifier cannot readily distinguish them (i.e., too hard), or (2) too far from the original such that the classifier would have little to gain from distinguishing them (i.e., too easy).

MMA training resolves problems associated with said fixed perturbation magnitude $\in$ in the sense that: 1) the approach dynamically determines (e.g., maximizes) the margin, the "current robustness" of the data, instead of robustness with regards to a predefined magnitude; 2) the margin is determined for each data point, therefore each sample's robustness could be maximized individually; and 3) during training, MMA selects the "correct" $\in$ for adversarial training, which could improve efficiency of learning.

Actively determining the perturbation length instead of using a fixed perturbation length is important as it helps produce adversarial examples that are more useful for training.

Described further are validation results showing the technical improvement of some embodiments relative to comparison approaches. While there may be some computational costs incurred (additional training epochs, reduction of "clean accuracy" against a non-perturbed input), benefits are shown in respect of improved "robust accuracy". Accordingly, an overall average accuracy (averaging clean and robust accuracy) is exhibited in some embodiments.

Adversarial attacks are especially difficult to defend against as it is difficult to know when training or designing a neural network what aspects are used in generating the future adversarial examples. Generating improved adversarial examples is important and the approaches described herein in some embodiments provide for an improved margin and more useful adversarial examples relative to nave approaches. Furthermore, embodiments described herein provide a technical solution, in the form of an improvement to a technological process, that can be incorporated as a practical application in financial systems (e.g., credit provisioning systems), identity verification systems, image recognition systems, malware detection, among others.

As an example, MMA training may be used to improve prediction accuracy in the context of credit card application approvals. A neural network classifier may be used to assess whether an individual's application, whose income is situated on the cut-off point for said credit card application, should be approved. Typically, the classifier is trained to reject applicants whose income is at or below the cut-off. However, suppose that the same individual later modifies his/her income by a negligible amount, such as $1, and re-applies for the same credit card. In that case, the classifier would approve the application despite there being virtually no difference in the applicant's profile, simply because the individual's income is no longer at or below the cut-off point. MMA training could be used to identify such perturbations that are close enough to the decision boundary that a neural network without MMA training would not otherwise identify as problematic.

In a first aspect, a method is provided for generating a data set representing an adversarial example in respect of a neural network, the method comprising: receiving one or more data sets including at least one data set representing a benign training example (x); generating a first adversarial example ($Adv_1$) having a perturbation length $epsilon_1$ against x; conducting a search (e.g., a binary search) in a direction ($Adv_1$-x); generating a second adversarial example ($Adv_2$) having a perturbation length $epsilon_2$ based at least on an output of the search in the direction ($Adv_1$-x).

In another aspect, the method includes training the neural network against adversarial examples using $Adv_2$.

In another aspect, the method includes conducting a binary search in a direction ($Adv_2$-x); and generating a third adversarial example ($Adv_3$) having a perturbation length $epsilon_3$ based at least on an output of the binary search in the direction ($Adv_2$-x).

In another aspect, the method includes training the neural network against adversarial examples using $Adv_3$.

In another aspect, the binary search includes at least determining a point near the benign training example and along a search direction such that a logit loss is approximately zero at the point.

In another aspect, the perturbation lengths are stored in a dictionary data structure.

In another aspect, when the neural network encounters a new training example, a stored perturbation length is used to initialize a hyperparameter representing a minimum perturbation length.

In another aspect, the training includes labelling the adversarial examples as negative training examples.

In another aspect, the method includes determining a level of available computational resources, and upon determining that the level of available computational resources is below a pre-defined threshold, training the neural network against adversarial examples using $Adv_2$.

In another aspect, the method includes a prediction based at least upon a logit loss of a perturbation, and wherein the prediction indicates that the logic loss >0, training the neural network against adversarial examples using $Adv_2$.

Corresponding systems, computer readable media, apparatuses, devices, and special purpose machines are contemplated. In some embodiments, the neural network is configured for interoperation with upstream data sources and downstream computing systems, for example, generating classification output data sets which may be used for controlling one or more automated or semi-automated functions.

The method can be performed on a specialized computer server having software stored thereon in non-transitory computer readable media. When the software, such as machine-interpretable instructions provided in the form of object code, is executed by a processor, the processor performs steps of the method. The computer server can be a server that operates in a data center of a financial institution, for example, coupled to a message bus where data sets can be received and/or output. The computer server can be activated to generate data sets representative of adversarial data sets for training a neural network.

The adversarial data sets can then be used in downstream training iterations to improve the robustness of the neural network. For example, the adversarial data sets can be used for supervised training whereby the training data are marked as adversarial or not, and then a reward function can be applied to the neural network to tune the neural network based on whether it is able to successfully classify the adversarial data sets as adversarial (and conversely, safe data sets as safe). An example practical implementation can include a neural network for image processing for automated driving, which, for example, classifies objects visible to the vehicle's sensors. The computer server can be utilized to generate adversarial examples which are specially adapted by the server applying a dynamically determined perturbation length. These adversarial examples, for example, could be traffic signs misclassified as garbage cans.

As the adversarial examples are generated at a "just right" range of difference from the original images, the adversarial examples result in a better trained outcome whereby the neural network because more robust against adversarial examples. While other approaches can also generate adversarial examples using a fixed perturbation length, these examples are often not useful and can result either in useless rounds of training as a result of examples that are "too easy" or "too hard".

When a malicious user attempts to fool the neural network with an adversarial example to have it mistakenly misclassify a traffic sign as a garbage can, in some cases, the trained neural network may have a higher probability of making a correct classification due to an increase in robustness against adversarial examples, and accordingly, an accident may potentially be avoided. However, it is important that while the approach may improve robustness, it cannot guarantee success against all adversarial examples.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 4 is an example pseudocode provided in accordance with an embodiment and is provided as an illustrative, non-limiting example.

DETAILED DESCRIPTION

Figure 1:
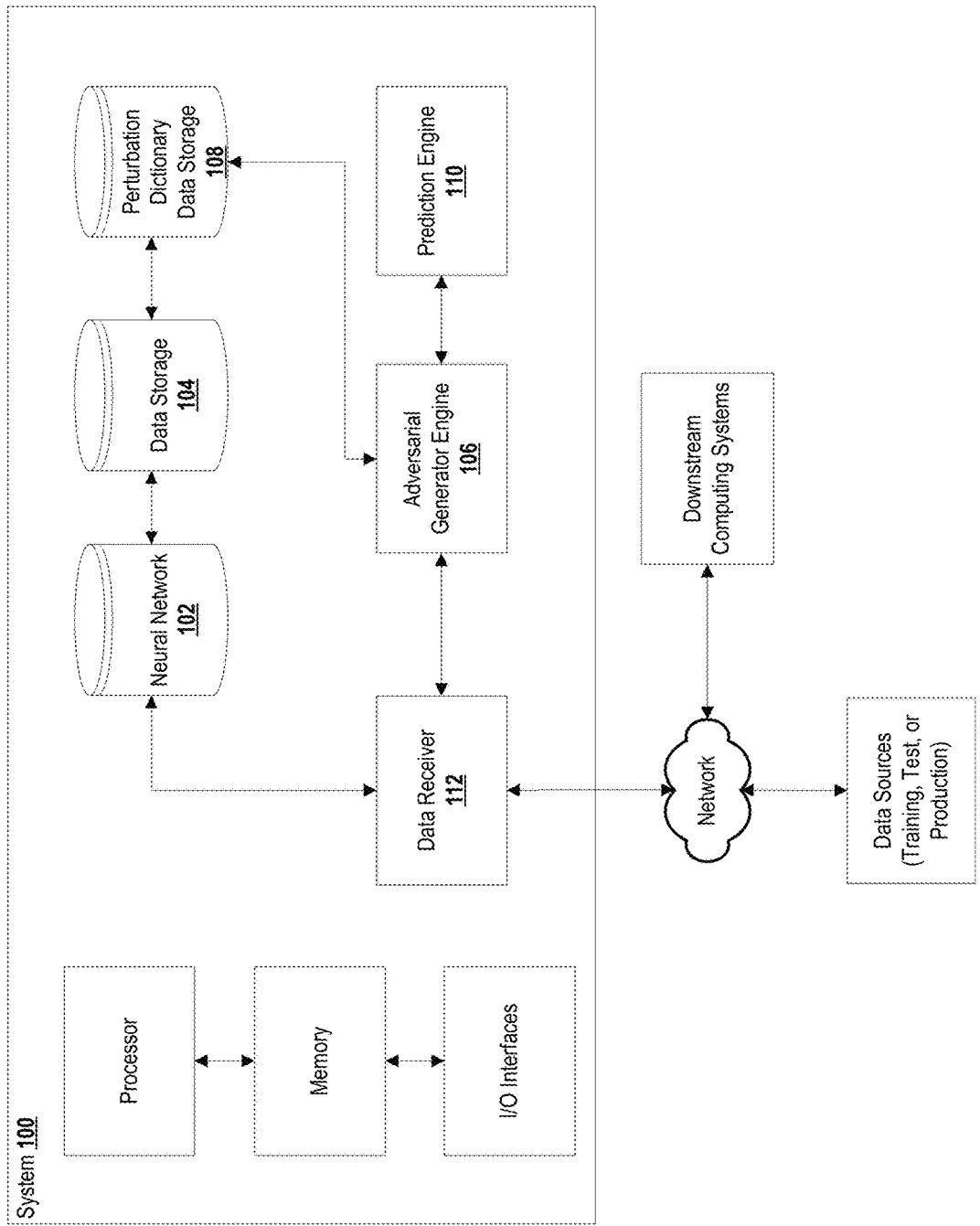
FIG. 1 is a block schematic of an example system for generating adversarial examples having an improved margin, according to some embodiments.

Approaches and mechanisms are described that are directed to improving a level of robustness (e.g., improved resistance) against adversarial examples of a neural network.

Improved adversarial examples are generated for training a neural network such that the neural network may be able to generate correct outputs despite some level of adversarial attack being present in the test set/production data set. Adversarial examples are generated whose margin (the distance from the data point to a decision boundary) is improved (in some embodiments, maximized).

This is an improvement over other approaches where, for example, the distance when used for generating adversarial examples is an arbitrarily selected distance. Adversarial attacks are especially difficult to defend against as it is difficult to know when training or designing a neural network what aspects are used in generating the future adversarial examples.

Applicants have studied adversarial robustness of neural networks from a margin maximization perspective, where margins are defined as the distances from inputs to a classifier's decision boundary. The study shows that maximizing margins can be achieved by minimizing the adversarial loss on the decision boundary at the "shortest successful perturbation", which suggests a close connection between adversarial losses and the margins. As provided herein, validation results were generated to test various example embodiments, and improved technical outcomes are found in certain situations.

Improved approaches related to Max-Margin Adversarial (MMA) training to directly maximize the margins to achieve adversarial robustness. Instead of adversarial training with a fixed, MMA offers an improvement by selecting the margin as the "correct" individually for each point. The description further rigorously analyzes adversarial training in the perspective of margin maximization, and provide an alternative interpretation for adversarial training: adversarial training is maximizing either a lower bound or an upper bound of the margins. The experiments confirm the theory and demonstrate MMA training's efficacy on the MNIST and CIFAR10 datasets w.r.t. robustness.

To aid in understanding, the following definitions are provided:

Logit loss: for a data example the logit loss=(largest logit except true label)−(logit of the true label).

A prediction, described in various embodiments, is based on the following: when logit loss >0, prediction is wrong, when logit loss <0, prediction is correct.

Binary search: inputs of binary search are 1) a data example; 2) a neural network; 3) a search direction; 4) minimum and maximum search length; and 5) number of search steps. The purpose of binary search is to find the point, near the data example, and along the search direction, such that the logit loss is approximately 0 on this point.

It is very similar to classical binary search, where if, at a point, the logit loss is larger than zero, then the search range becomes from the minimum length to the length of this point, and vice versa.

Epsilon dictionary (epsdct): epsdct saves the suitable perturbation length of a given training example that was used to perturb it the last time when it is encountered. When an example is met for the first time, this value is initialized as mineps (a hyperparameter that is minimum perturbation length).

Suitable perturbation length: here it means that after a norm constrained attack with perturbation length, the closer it is to logit loss, the more suitable is the adversarial perturbation, because it is closer to the decision boundary. The approach shows that if an optimal perturbation within a norm constraint is close to the decision boundary, then optimizing the neural network on it will maximize the margin.

Adversarial example is an example with an adversarial perturbation.

As described in embodiments below, the mechanism is described in relation to K-class classification problems.

Denote $S=\{x_i, y_i\}$ as the training set of input-label data pairs sampled from data distribution D.

For this description, the classifier is considered as a score function $f_\theta(x)=(f_\theta^1(x), \ldots, f_\theta^K(x))$, parameterized by $\theta$, which assigns score $f_\theta^i(x)$ to the i-th class. The predicted label of x is then decided by $\hat{y}=\arg\max_i f_\theta^i(x)$.

Let $L_\theta^{01}(x, y)=\Pi(\hat{y}\neq y)$ be the 0-1 loss indicating classification error, where $\Pi(\cdot)$ is the indicator function. For an input (x, y), Applicants define its margin w.r.t. the classifier $f_\theta(\cdot)$ as:

$$d_\theta(x,y)=\|\delta^*\|=\min\|\delta\| \text{ s.t. } \delta:L_\theta^{01}(x+\delta,y)=1 \qquad (1)$$

Where $\delta^*=\arg\min_{L_\theta^{01}(x+\delta,y)=1} \|\delta\|$ is the "shortest successful perturbation". Applicants give an equivalent definition of margin with the "logit margin loss" $L_\theta^{LM}(x, y)=\max_{j\neq y} f_\theta^j(x)-f_\theta^y(x)$.

The level set $\{x:L_\theta^{LM}(x, y)=0\}$ corresponds to the decision boundary of class y. Also, when $L_\theta^{LM}(x, y)<0$, the classification is correct, and when $L_\theta^{LM}(x, y)\geq 0$ the classification is wrong.

Therefore, the approach can define the margin in Eq. (1) in an equivalent way by $L_\theta^{LM}(\cdot)$ as:

$$d_\theta(x,y)=\|\delta^*\|=\min\|\delta\| \text{ s.t. } \delta:L_\theta^{LM}(x+\delta,y)\geq 0, \qquad (2)$$

where $\delta^*=\arg\min_{L_\theta^{LM}(x+\delta,y)\geq 0} \|\delta\|$ is again the "shortest successful perturbation".

As described herein, the term "margin" is used to denote $d_\theta(x, y)$ in Eq. (2). For other notions of margin, the description will use specific phrases, e.g. "SLM-margin" or "logit margin."

FIG. 1 is a block schematic of an example system for generating adversarial examples having an improved margin, according to some embodiments.

The example system 100 is implemented on one or more processors operating in conjunction with computer memory, and in some embodiments, is a computing device or a distributed set of computing devices, such as one or more computer servers. Each component described herein is provided as an illustrative non-limiting example and may be provided through the one or more processors operating with the computer memory. The computer processors include electronic circuitry. The system 100 may include one or more input and output interfaces, which may include application programming interfaces and/or hardware interface devices and displays.

A neural network 102 is maintained at data storage 104, which includes a plurality of input nodes that each map to an input feature being analyzed from a received input, and a plurality of hidden nodes used for representing various interconnections between the input nodes and one or more output nodes. The one or more output nodes can, for example, each represent a possible outcome or classification, etc.

The neural network 102 can be established to heuristically track relationships between the input nodes and the output nodes, such that weighted interconnections between the computing nodes are modified over time as more training examples are provided to the neural network 102 to tune the weights in accordance with the structure of the neural network 102. For example, in some examples, neural network 102 may be established such that the hidden layer includes feed forward, backwards propagation, multiple layers, etc., which are used to modify how the neural network 102 responds to received training sets of data.

Over time, the interconnections are tuned such that in response to new input data, the neural network 102 is able to generate one or more predictions, which can be represented in the form of a vector of raw predictions having "logit" values (non-normalized), which for example may be provided into a softmax function to generate a vector of normalized probabilities that are used to establish a prediction. The neural network 102, through tuning, establishes a decision boundary through the logits as between different classifications in response to various inputs.

Depending on its structure, neural network 102 can be susceptible to being fooled by new input data that is intentionally or unintentionally close to a decision boundary, and accordingly, neural network 102 may generate incorrect classifications. Neural networks are especially vulnerable where an attacker knows how the neural network is configured (e.g., how the hidden layers are configured), and/or the values of the weights of the interconnections as between interconnected nodes. An attacker may be able to approximate or learn the structure of the neural network through observing the classifications and errors thereof generated by the neural network.

Accordingly, as described in various embodiments below, an improved approach is described wherein the system 100 generates a data set representing an adversarial example in respect of a neural network, which is an improved adversarial example relative to other approaches as the margin (the distance from the data point to a decision boundary) is improved (in some embodiments, maximized) through first, generating an initial adversarial example, and generating one or more subsequent adversarial examples along the direction (e.g., using a binary search). These one or more subsequent adversarial examples are then used for re-training the neural network such that it becomes less vulnerable to attack using adversarial examples. Not all embodiments are limited to using binary searches and other approaches are possible.

A data receiver 112 is provided that receives one or more data sets including at least one data set representing a benign training example (x).

An adversarial generator engine 106 is provided that is configured to generate, using the neural network 102, a first adversarial example ($Adv_1$) having a perturbation length $epsilon_1$ against x; conduct a search (e.g., a binary search) in a direction ($Adv_1$-x) using the neural network; and to generate, using the neural network 102, a second adversarial example ($Adv_2$) having a perturbation length $epsilon_2$ based at least on an output of the search in the direction ($Adv_1$-x).

The perturbation lengths may be stored on a perturbation dictionary data storage 104 for later retrieval and usage (e.g., initialization of hyperparameters).

In some embodiments, a prediction engine 110 is utilized to assess whether to conduct this approach.

The prediction includes checking a logit loss where logit loss >0, prediction is wrong, when logit loss <0, prediction is correct. If the prediction is wrong, standard clean training may be conducted on the example, and if the prediction is correct, the prediction engine 110 may continue with the process of finding an improved suitable adversarial example and training the neural network 102 on the improved suitable adversarial example.

Figure 2:
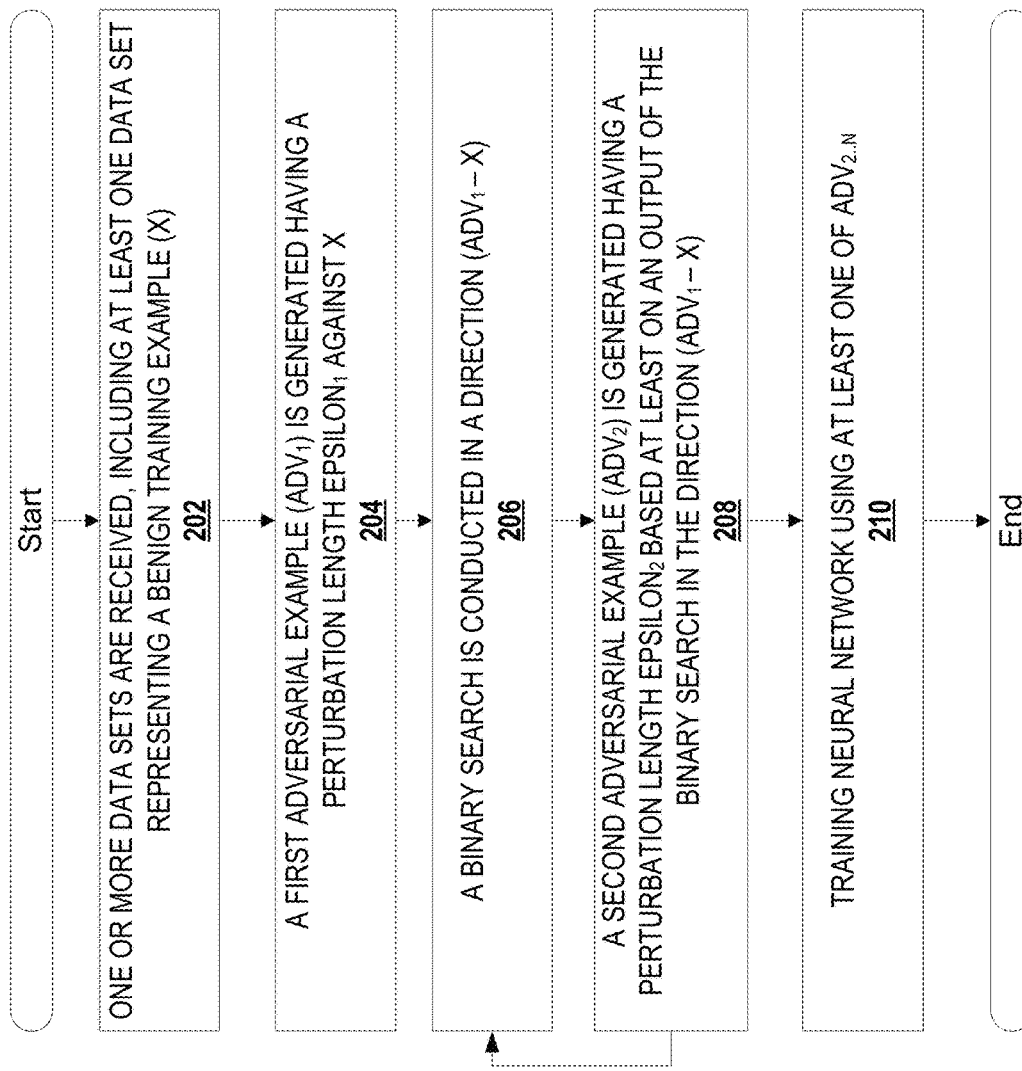
FIG. 2 is an example method for generating adversarial examples having an improved margin, according to some embodiments.

FIG. 2 is an example method for generating adversarial examples having an improved margin, according to some embodiments. The method 200 is shown as an example, and other steps are possible, and the steps may be conducted in various orders and permutations and combinations.

At 202, one or more data sets are received, including at least one data set representing a benign training example (x).

At 204, a first adversarial example ($Adv_1$) is generated having a perturbation length $epsilon_1$ against x. An optional prediction may be conducted as described above. To find the suitable adversarial example of x, the method includes performing a PGD attack (with perturbation length $epsilon_1$ as obtained from the data storage 104 against the training sample x.

At 206, a binary search is conducted in a direction ($Adv_1$-x). Not all embodiments are limited to binary searches.

At 208, a second adversarial example ($Adv_2$) is generated having a perturbation length $epsilon_2$ based at least on an output of the binary search in the direction ($Adv_1$-x). This value can be stored in data storage 104 for later usage. The steps 206 and 208 may be repeated, in accordance with some embodiments, to establish additional, closer adversarial examples ($Adv_n$).

At 210, a selected suitable adversarial example $Adv_{2...n}$ can be utilized for training the neural network 102. The more repetitions of 206 and 208 are conducted, performance can be improved at the cost of computational resources. In a specific embodiment, $Adv_3$ is utilized in training the neural network 102.

Applicant notes that the PGD attack described in various embodiments is norm constrained, and thus the attack applies to any $l_p$ norm and $l_\infty$, where $p \geq 1$.

Figure 3:
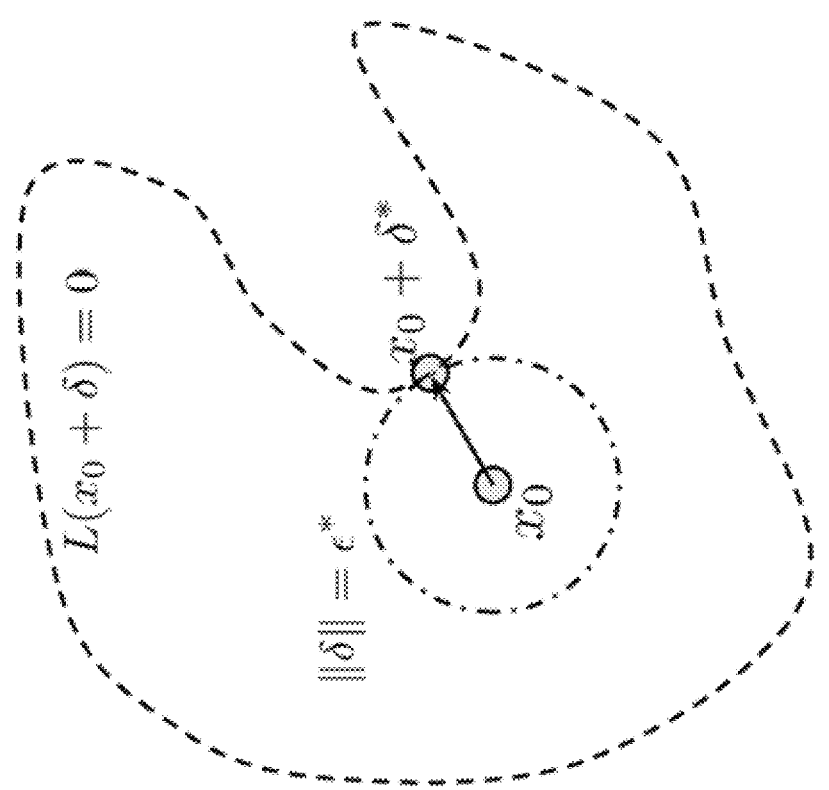
FIG. 3 is an illustration of a model $f$ and a data pair (x, y) that is correctly classified by $f$, according to some embodiments.

FIG. 3 is an example illustration of an adversarial example generated using MMA training.

The disclosure herein improves adversarial robustness by maximizing the average margin of the data distribution D by optimizing the following objective:

$$\min_\theta \left\{ \sum_{i \in S_\theta^+} \max\{0, d_{max} - d_\theta(x_i, y_i)\} + \beta \sum_{j \in S_\theta^-} \mathcal{J}_\theta(x_j, y_j) \right\},$$

where $S_\theta^+ = \{i : L_\theta^{LM}(x_i, y_i) < 0\}$ is the set of correctly classified examples, $S_\theta^- = \{i : L_\theta^{LM}(x_i, y_i) \geq 0\}$ is the set of wrongly classified examples, $\mathcal{J}(\cdot)$ is a regular classification loss function, e.g. cross-entropy loss, $d_\theta(x_i, y_i)$ is the margin for correctly classified samples, and is $\beta$ is the coefficient for balancing correct classification and margin maximization.

Note that the margin $d_\theta(x_i, y_i)$ is inside the hinge loss with threshold $d_{max}$ (a hyperparameter), which forces the learning to focus on the margins that are smaller than $d_{max}$.

Intuitively, MMA training simultaneously minimizes classification loss on wrongly classified points in $S_\theta^-$ and maximizes the margins of correctly classified points in $d_\theta(x_i, y_i)$ until it reaches $d_{max}$. Note that margins on wrongly classified examples are not maximized. Minimizing the objective turns out to be a technical challenge. While $\nabla_\theta \mathcal{J}(x_i, y_i)$ can be easily computed by standard back-propagation, computing the gradient of $d_\theta(x_i, y_i)$ needs some technical developments.

As shown in some embodiments herein, maximization can still be achieved by minimizing a classification loss w.r.t. model parameters, at the "shortest successful perturbation".

For smooth functions, a stronger result exists: the gradient of the margin w.r.t. model parameters can be analytically calculated, as a scaled gradient of the loss. Such results make gradient descent viable for margin maximization, despite the fact that model parameters are entangled in the constraints.

Given the samples $\{z_1, \ldots, z_n\} \in \mathcal{Z} = \text{x} \times \text{y})^2$ where $z_i = (x_i, y_i)$ is a pair of data and its label, in an embodiment, an assumption is made of the number of classes $y = 1, 2, \ldots, K$. A scoring function $f$, where given input data, x, $f(x) = f_1(x), \ldots, \theta_K(x))$ gives scores of x being each class. The predicted label is then decided by $\arg\max_i f_i(x)$.

For the purposes of some embodiments described herein, an assumption is made that $f$ is parameterized by $\theta$. An assumption is made that $f(x; \theta)$ is $C^2$ jointly in x and $\theta$ almost everywhere.

Given a model $f$ and a data pair (x, y) that is correctly classified by $f$ as shown in FIG. 3, one can compute the distance of (x, y) to its surrounding decision boundary by:

$$\min_\delta \|\delta\| \text{ s.t. } L(\delta, \theta; z) \geq 0, \quad (1)$$

where $$L(\delta, \theta; z) = \max_{j \neq y} f_j(x + \delta) - f_y(x + \delta).$$

In this specification, z may be omitted in the notation of L if it is clear in its context. One can verify that $L(\delta, \theta)$ is a $C^2$ function jointly in $\delta$ and $\theta$ almost everywhere.

Equation 1 is in fact also compatible with a misclassified sample, as for (x, y) that is misclassified by $f$, the optimal $\delta$ would be 0. Therefore, an approach would tend to learn a model $f$ that maximizes the following objective:

$$\max_\theta F(\theta) = \max_\theta \sum_{i=1}^n \min_{\delta_i \in \Delta_i(\theta)} \|\delta_i\|,$$

where $\Delta_i(\theta) = \{\delta_i : L(\delta_i, \theta; z_i) \geq 0\}$ with $\theta$ as its argument emphasizing its dependence on $\theta$.

To solve the optimization via SGD, the approach computes its gradient (subgradient) in $\theta$, denoted in a LaGrangian form described by $\mathcal{L}(\delta, \lambda)$ where $$\mathcal{L}(\delta, \lambda) = \|\delta\| + \lambda L(\delta, \theta).$$

For a fixed $\theta$, the optimizers of $\delta$ and $\lambda$, are denoted by $\delta^*$ and $\lambda^*$.

The following relation provides an efficient way of determining the gradient of $F(\theta)$.

Theorem 1.1: Assume that $\in(\delta) = \|\delta\|$ and $L(\delta, \theta)$ are C2 functions almost everywhere. Also assume that the matrix is full rank almost anywhere, where:

$$M = \begin{pmatrix} \dfrac{\partial^2 \epsilon(\delta^*)}{\partial \delta^2} + \lambda^* \dfrac{\partial^2 L(\delta^*, \theta)}{\tau \partial \delta^2} & \dfrac{\partial L(\delta^*, \theta)}{\partial \delta} \\ \dfrac{\partial L(\delta^*, \theta)}{\partial \delta} & 0 \end{pmatrix}$$

Then, $$\nabla_\theta F(\theta) \propto \dfrac{\partial L(\delta^*, \theta)}{\partial \delta}.$$

Remark 1.1. The condition on the matrix M is serving as a technical condition to guarantee that the implicit function theorem is applicable and thus the gradient can be computed. Similar conditions are implicitly assumed in other approaches for adversarial training as well.

Remark 1.2: Note that although the exact calculation of $\nabla_\theta F(\theta)$ requires solving both $\lambda^*$ and $\delta^*$, Theorem 1.1 shows that to perform one step of gradient descent, knowing $\delta^*$ is enough as one can tune its step size.

Proof. The gradient for $F(\theta)$ is developed in its general form. Consider the following optimization problem:

$$F(\theta) = \min_{\delta \in \Delta(\theta)} \epsilon(\delta),$$

where $\Delta(\theta) = \{\delta : g(\theta, \delta) = 0\}$, $\in$ and g are both $C^2$ functions. Note that a simple application of Danskin's theorem would not be valid as the constraint set $\Delta(\theta)$ depends on the parameter $\theta$. The Lagrangian form is denoted by $\mathcal{L}(\delta, \lambda)$ where $\mathcal{L}(\delta, \lambda) = \in(\delta) + \lambda g(\theta, \delta)$. For a fixed $\theta$, the optimizer $\delta^*$ and $\lambda^*$ must satisfy the first order conditions (FOC):

$$\dfrac{\partial \epsilon(\delta)}{\partial \delta} + \lambda \dfrac{\partial g(\theta, \delta)}{\partial \delta} \bigg|_{\delta = \delta^*, \lambda = \lambda^*} = 0, \quad (3)$$

$$g(\theta, \delta) \bigg|_{\delta = \delta^*} = 0.$$

Place the FOC equations in a vector form:

$$G((\delta, \lambda), \theta) = \begin{pmatrix} \dfrac{\partial \epsilon(\delta)}{\partial \delta} + \lambda \dfrac{\partial g(\theta, \delta)}{\partial \delta} \\ g(\theta, \delta) \end{pmatrix} \bigg|_{\delta = \delta^*, \lambda = \lambda^*} = 0.$$

Note that G is $C^1$ continuously differentiable since $\epsilon$ and g are $C^2$ functions. Furthermore, the Jacobian matrix of G with respect to $(\delta, \lambda)$, $$\nabla_{(\delta,\lambda)} G((\delta^*, \lambda^*), \theta) = \begin{pmatrix} \frac{\partial^2 \epsilon(\delta^*)}{\partial \delta^2} + \lambda * \frac{\partial^2 g(\theta, \delta^*)}{\partial \delta^2} & \frac{\partial g(\theta, \delta^*)}{\partial \delta} \\ \frac{\partial g(\theta, \delta^*)^\top}{\partial \delta} & 0 \end{pmatrix}$$

which by assumption is in full rank. Therefore, by the implicit function relation, $\delta^*$ and $\lambda^*$ can be expressed as a function of $\theta$, denoted by $\delta^*(\theta)$ and $\lambda^*(\theta)$.

To further compute $\nabla_\theta F(\theta)$, note that $F(\theta)=\epsilon(\delta^*, \theta))$. Thus, $$\nabla_\theta F(\theta) = \frac{\partial \epsilon(\delta^*)}{\partial \delta} \frac{\partial \delta^*(\theta)}{\partial \theta} = -\lambda * \frac{\partial g(\theta, \delta^*)}{\partial \delta} \frac{\partial \delta^*(\theta)}{\partial \theta}, \quad (4)$$

where the second equality is by Equation 3. The implicit function relation also provides a way in computing $$\frac{\partial \delta^*(\theta)}{\partial \theta}$$

which is complicated involving taking inverse of the matrix $\nabla_{(\delta, \lambda)} G((\delta^*, \lambda^*), \theta)$. Here, a relatively simple way to compute this gradient is presented. Note that:

$g(\theta, \delta^*(\theta))=0$.

Taking gradient with both sides with respect to $\theta$, $$\frac{\partial g(\theta, \delta^*)}{\partial \theta} + \frac{\partial g(\theta, \delta^*)}{\partial \delta} \frac{\partial \delta^*(\theta)}{\partial \theta} = 0. \quad (5)$$

Combining Equation 4 and Equation 5, $$\nabla_\theta F(\theta) = \lambda^*(\theta) \frac{\partial g(\theta, \delta^*)}{\partial \theta}. \quad (6)$$

Margin Maximization:
Recall that $d_\theta(x,y)=\|\delta^*\|=\min\|\delta\|$ s.t. $\delta:L_\theta^{LM}(x+\delta,y) \geq 0$.

Note that the constraint of the above optimization problem depends on model parameters, thus margin maximization is a max-min nested optimization problem with a parameter-dependent constraint in its inner minimization.

Computing such gradients for a linear model is easy due to the existence of its closed-form solution, e.g., SVM, but it is not so for functions such as neural networks.

The next theorem provides a viable way to increase $d_\theta(x, y)$.

Theorem 2.1. Gradient descent on $L_\theta^{LM}(X+\delta^*, y)$ w.r.t. $\theta$ with a proper step size increases $d_\theta(x, y)$ where $\delta^*=\arg\min_{L_\theta^{LM}(x+\delta,y) \geq 0} \|\delta\|$ is the shortest successful perturbation given the current $\theta$.

Theorem 2.1 summarizes the theoretical results, where Applicants show separately later
1) how to calculate the gradient of the margin under some smoothness assumptions;
2) without smoothness, margin maximization can still be achieved by minimizing the loss at the shortest successful perturbation.

Calculating gradients of margins for smooth loss and norm: Denote $L_\theta^{LM}(x+\delta, y)$ by $L(\theta, \delta)$ for brevity. It is easy to see that for a wrongly classified example $(x, y)$, $\delta^*$ is achieved at 0 and thus $\nabla_\theta d_\theta(x, y)=0$.

Therefore the approach focuses on correctly classified examples.

Denote the LaGrangian as $\mathcal{L}_\theta(\delta, \lambda)=\|\delta\|+\lambda L(\delta, \theta.)$ For a fixed $\theta$ denote the optimizers of $\mathcal{L}_\theta(\delta, \lambda)$ by $\delta^*$ and $\lambda^*$.

The following theorem shows how to compute $\nabla_\theta d_\theta(x, y)$.

Proposition 2.1. Let $\epsilon(\delta) = \|\delta\|$.

Given a fixed $\theta$, assume that $\delta^*$ is unique, $\epsilon(\delta)$ and $L(\delta, \theta)$ are $C^2$ functions in a neighborhood of $(\theta, \delta^*)$, and the matrix $$\begin{pmatrix} \frac{\partial^2 \epsilon(\delta^*)}{\partial \delta^2} + \lambda * \frac{\partial^2 L(\delta^*, \theta)}{\partial \delta^2} & \frac{\partial L(\delta^*, \theta)}{\partial \delta} \\ \frac{\partial L(\delta^*, \theta)^\top}{\partial \delta} & 0 \end{pmatrix}$$

is full rank, then $$\nabla_\theta d_\theta(x, y) = C(\theta, x, y) \frac{\partial L(\delta^*, \theta)}{\partial \theta}, \text{ where}$$

$$C(\theta, x, y) = \frac{\left\langle \frac{\partial \epsilon(\delta^*)}{\partial \delta}, \frac{\partial L(\delta^*, \theta)}{\partial \delta} \right\rangle}{\left\| \frac{\partial L(\delta^*, \theta)}{\partial \delta} \right\|_2^2} \text{ is a scalar.}$$

Remark 2.1. By Proposition 2.1, the margin's gradient w.r.t. to the model parameter $\theta$ is proportional to the loss' gradient w.r.t. $\theta$ at $\delta^*$, the shortest successful perturbation. Therefore to perform gradient ascent on margin, the approach just needs to find $\delta^*$ and perform gradient descent on the loss.

Margin maximization for non-smooth loss and norm: Proposition 2.1 requires the loss function and the norm to be $C^2$ at $\delta^*$. This might not be the case for many functions used in practice, e.g. ReLU networks and the $l_\infty$ norm. The next result shows that under a weaker condition of directional differentiability (instead of $C^2$), learning $\theta$ to maximize the margin can still be done by decreasing $L(\theta, \delta^*)$ w.r.t. $\theta$, at $\theta=\theta_0$. Due to space limitations, there is only presented an informal statement here. Rigorous statements can be found in the Appendix.

Proposition 2.2. Let $\delta^*$ be unique and $L(\delta, \theta)$ be the loss of a deep ReLU network. There exists some direction $\vec{v}$ in the parameter space, such that the loss $L(\delta, \theta)|_{\delta=\delta^*}$ can be reduced in the direction of $\vec{v}$. Furthermore, by reducing $L(\delta, \theta)|_{\delta=\delta^*}$, the margin is also guaranteed to be increased.

Stabilizing the Learning with Cross Entropy Surrogate Loss

In practice, it is found that gradients of the "logit margin loss" $L_\theta^{LM}$ are unstable. The piecewise nature of the LM loss can lead to discontinuity of its gradient, causing large fluctuations on the boundary between the pieces. It also does not fully utilize information provide by all the logits.

In the MMA algorithm, the approach instead uses the "soft logit margin loss" (SLM)

$$L_\theta^{SLM}(x, y) = \log \sum_{j \neq y} \exp(f_\theta^j(x)) - f_\theta^y(x),$$  (3)

which serves as a surrogate loss to the "logit margin loss" $L_\theta^{LM}(x, y)$ by replacing the max function by the LogSum-Exp (sometimes also called softmax) function. One immediate property is that the SLM loss is smooth and convex (w.r.t. logits). The next proposition shows that SLM loss is a good approximation to the LM loss.

Proposition 2.3.

$$L_\theta^{SLM}(x,y) - \log(K-1) \leq L_\theta^{LM}(x,y) \leq L_\theta^{SLM}(x,y),$$  (4)

where K denote the number of classes.

Remark 2.2. By using the soft logit margin loss, MMA maximizes a lower bound of the margin, the SLM-margin, $d_\theta^{SLM}(x, y)$.

$$d_\theta^{SLM}(x,y) = \|\delta^*\| = \min \|\delta\| \text{ s.t. } \delta: L_\theta^{LM}(x+\delta,y) \geq 0,$$

To see that, note by Proposition 2.3, $L_\theta^{LM}(x, y)$ upper bounds $L_\theta^{LM}(x, y)$. So one has $\{\delta: L_\theta^{LM}(x+\delta, y) \leq 0\} \subseteq \{\delta: L_\theta^{SLM}(x+\delta, y) \leq 0\}$. Therefore, $d_\theta^{SLM}(x, y) \leq d_\theta(x, y)$, i.e. the SLM-marin is a lower bound of the margin.

The next proposition shows that the gradient of the SLM loss is proportional to the gradient of the cross entropy loss, thus minimizing $L_\theta^{CE}(x+\delta^*, y)$ w.r.t. $\theta$ "is" minimizing $L_\theta^{SLM}(x+\delta^*, y)$.

Proposition 2.4. For a Fixed $(x, y)$ and $\theta$, $$\nabla_\theta L_\theta^{CE}(x, y) = r(\theta, x, y) \nabla_\theta L_\theta^{SLM}(x, y), \text{ and}$$
$$\nabla_x L_\theta^{CE}(x, y) = r(\theta, x, y) \nabla_x L_\theta^{SLM}(x, y)$$  (5)

-continued $$\text{where the scalar } r(\theta, x, y) = \frac{\sum_{i \neq y} \exp(f_\theta^i(x))}{\sum_i \exp(f_\theta^i(x))}.$$  (6)

Therefore, to simplify the learning algorithm, gradient descent is performed on model parameters using $L_\theta^{CE}(x+\delta^*, y)$. As such, the approach uses $L_\theta^{CE}$ on both clean and adversarial examples, which in practice stabilizes training:

$$\min_\theta L_\theta^{MMA}(S), \text{ where}$$  (7)

$$L_\theta^{MMA}(S) = \sum_{i \in S_\theta^+ \cap \mathcal{H}_\theta} L_\theta^{CE}(x_i + \delta^*, y_i) + \sum_{j \in S_\theta^-} L_\theta^{CE}(x_j, y_j),$$

where $$\delta^* = \text{argmin}_{L_\theta^{SLM}(x+\delta, y) \geq 0} \|\delta\|$$

is found with the SLM loss, and $\mathcal{H}_\theta = \{i: d_\theta(x_i, y_i) < d_{max}\}$ is the set of examples that have margins smaller than the hinge threshold.

Finding the Optimal Perturbation $\delta^*$

To implement MMA, one still needs to find the $\delta^*$, which is intractable in general settings. An adaptation of the projected gradient descent (PGD) (Madry et al., 2017) attack is proposed in this description to give an approximate solution of $\delta^*$, the Adaptive Norm Projective Gradient Descent Attack (AN-PGD).

In AN-PGD, Applicants apply PGD on a initial perturbation magnitude $\in_{init}$ to find a norm-constrained perturbation $\delta_1$, then Applicants search along the direction of $\delta_1$ to find a scaled perturbation that gives L=0, Applicants then use this scaled perturbation to approximate $\in^*$. Note that AN-PGD here only serves as an algorithm to give an approximate solution of $\delta^*$, and it can be decoupled from the remaining parts of MMA training. Other attacks that can serve a similar purpose can also fit into the MMA training framework, e.g. the Decoupled Direction and Norm (DDN) attack (Rony et al., 2018). Algorithm 1 describes the Adaptive Norm PGD Attack (AN-PGD) algorithm.

---

Algorithm 1 Adaptive Norm PGD Attack for approximately solving $\delta^*$.

Inputs: (x, y) is the data example. $\epsilon_{init}$ is the initial norm constraint used in the first PGD attack.
Outputs: $\delta^*$, approximate shortest successful perturbation. Parameters: $\epsilon_{max}$ is the maximum perturbation length. PGD (x, y, $\epsilon$) represents PGD perturbation $\delta$ with magnitude $\epsilon$.
1:     Adversarial example $\delta_1$ = PGD (x, y, $\epsilon_{init}$)

2:     Unit perturbation $\delta_u = \dfrac{\delta_1}{\|\delta_1\|}$

3:     if prediction on x + $\delta_1$ is correct then
4:         Binary search to find $\epsilon'$, the zero-crossing of L(x + $\eta\delta_u$, y) w.r.t. $\eta$, $\eta \in [\|\delta_1\|, \epsilon_{max}]$
5:     else
6:         Binary search to find $\epsilon'$, the zero-crossing of L(x + $\eta\delta_u$, y) w.r.t. $\eta$, $\eta \in [0, \|\delta_1\|)$
7:     end if
8:     $\delta^* = \epsilon'\delta_u$

---

Remark 2.3. Finding the $\delta^*$ in Proposition 2.2 and Proposition 2.1 requires solving a non-convex optimization problem, where the optimality cannot be guaranteed in practice. Previous adversarial training methods, e.g. Madry et al. (2017), suffer the same problem. Nevertheless, as shown later in FIG. 10, the proposed MMA training algorithm does achieve the desired behavior of maximizing the margin of each individual example in practice.

Additional Clean Loss During Training

Figure 10:
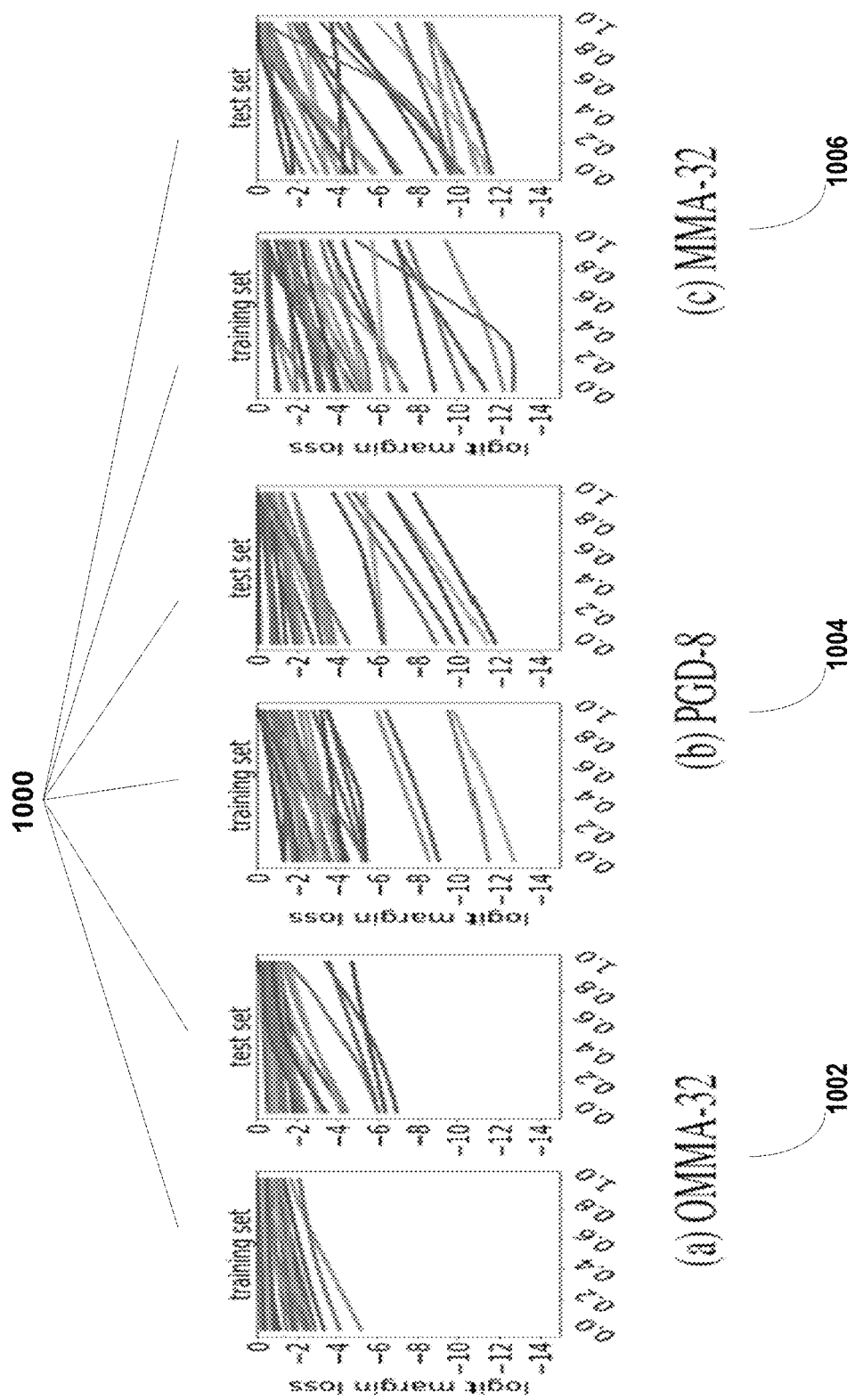
FIG. 10 is a visualization of a loss landscape in the input space for MMA and PGD trained models, according to some embodiments.

In practice, Applicants observe that when the model is only trained with the objective function in Eq. (7), the input space loss landscape is very flat, which makes PGD less efficient in finding δ* for training, as shown in FIG. 10. Here Applicants choose 50 examples from both training and test sets respectively, then perform PGD attack with ∈=8/255 and keep those failed perturbations. For each, Applicants linearly interpolate 9 more points between the original example and the perturbed, and plot their logit margin losses. In each sub-figure, the horizontal axis is the relative position of the interpolated example: e.g. 0.0 represents the original example, 1.0 represents the perturbed example with ∈=8/255, 0.5 represents the average of them. The vertical axis is the logit margin loss. Recall that when $L_\theta^{LM}(x+\delta, y)<0$, the perturbation δ fails.

OMMA-32 in FIG. 10(a) represents model trained with only $L_\theta^{MMA}$ in Eq. (7) with $d_{max}=8$. PGD-8 FIG. 10(b) represents model trained with PGD training (Madry et al., 2017) with ∈=8. As one can see, OMMA-32 has "flatter" loss curves compared to PGD-8. This could potentially weaken the adversary during training, which leads to poor approximation of δ* and hampers training.

To alleviate this issue, Applicants add an additional clean loss term to the MMA objective in Eq. (7) to lower the loss on clean examples, so that the input space loss landscape is steeper. Specifically, Applicants use this combined loss $$L_\theta^{CB}(S) = \frac{1}{3}\sum_{j \in S} L_\theta^{CE}(x_j, y_j) + \frac{2}{3}L_\theta^{MMA}(S). \tag{8}$$

The model trained with this combined loss and $d_{max}=32$ is the MMA-32 shown in FIG. 10 (c). Adding the clean loss is indeed effective. Most of the loss curves are more tilted, and the losses of perturbed examples are lower. Applicants use $L_\theta^{CB}$ for MMA training in the rest of the paper due to its higher performance. A more detailed comparison between $L_\theta^{CB}$ and $L_\theta^{MMA}$ is described in the Appendix.

Understanding Adversarial Training Through Margin Maximization

Through the development of MMA training in the last section, Applicants have shown that margin maximization is closely related to adversarial training with the optimal perturbation length ||δ*||. In this section, Applicants further investigate the behavior of adversarial training in the perspective of margin maximization. Adversarial training (Huang et al., 2015; Madry et al., 2017) minimizes the "worst-case" loss under a fixed perturbation magnitude ∈, as follows.

$$\min_\theta \mathbb{E}_{x,y \sim \mathcal{D}} \max_{||\delta|| \le \epsilon} L_\theta(x+\delta, y). \tag{9}$$

Figure 9:
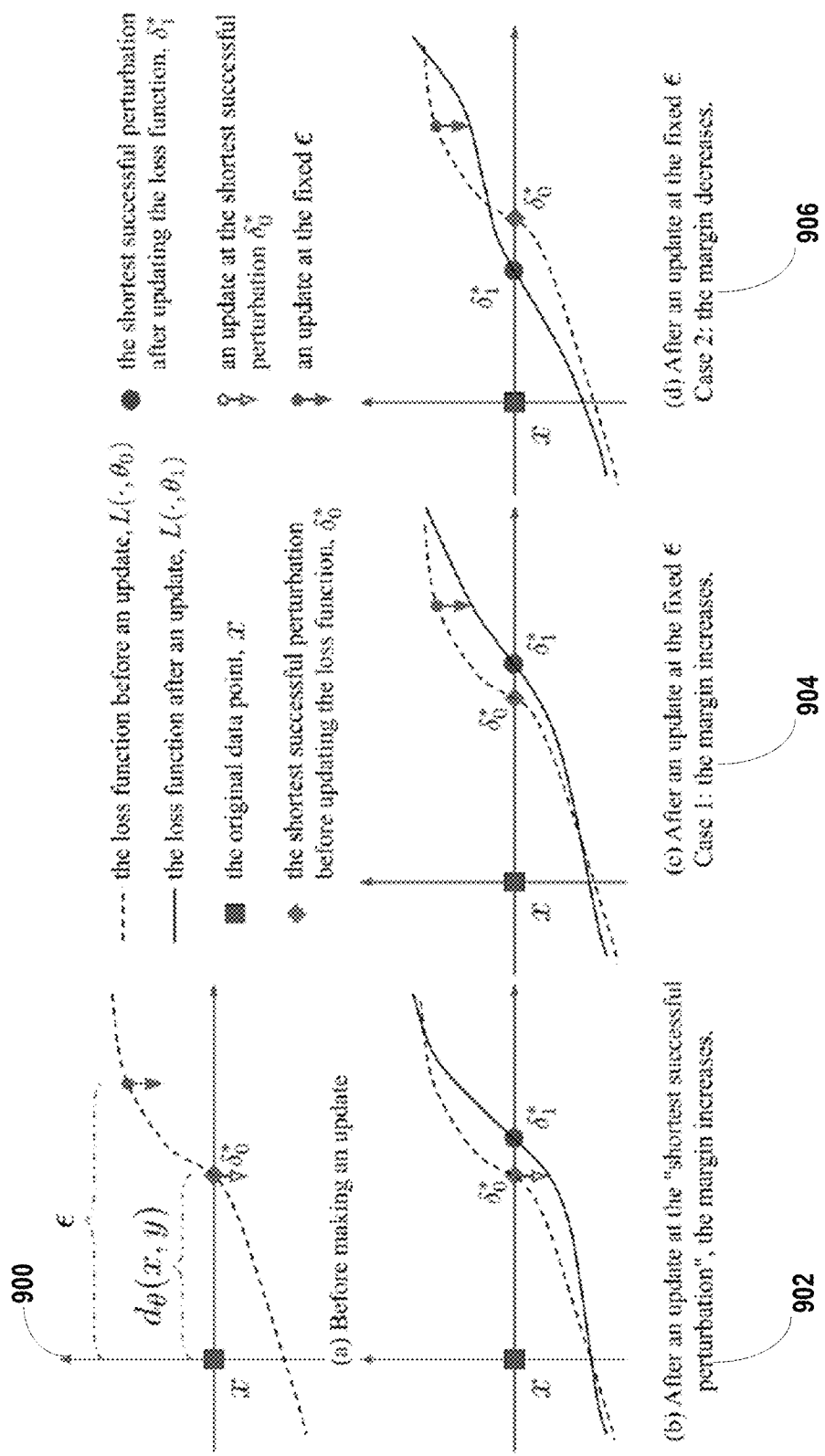
FIG. 9 is a 1-D example of how margin is affected by decreasing the loss at different locations, according to some embodiments.

Looking again at FIG. 9, Applicants can see that an adversarial training update step does not necessarily increase the margin. In particular, as Applicants perform an update to reduce the value of loss at the fixed perturbation E, the parameter is updated from $\theta_0$ to $\theta_1$. After this update, Applicants imagine two different scenarios of the updated loss functions $L_{\theta_1}(\bullet)$ (the solid curve) in FIGS. 9 (c) and (d). In both (c) and (d), $L_{\theta_1}(\in)$ is decreased by the same amount. However, the margin is increased in (c) with $\delta^*_1 > \delta^*_0$ but decreased in (d) with $\delta^*_1 < \delta^*_0$. s Formalizing the intuitive analysis, Applicants have presented theorems connecting adversarial training and margin maximization. For brevity, fixing {(x, y)}, let $L(\theta, \delta) = L_\theta^{LM}(x+\delta, y)$, $d_\theta = d_\theta(x, y)$, and $\in^*_\theta(\rho) = \min_{\delta: L(\delta, \theta) \ge \rho} ||\delta||$.

Theorem 3.1. Assuming an update from adversarial training changes $\theta_0$ to $\theta_1$ such that $p^* = \max_{||\delta|| \le \in} L(\theta_0, \delta) > \max_{||\delta|| \le \in} L(\theta_1, \delta)$, then

ALGORITHM 2

Max-Margin Adversarial Training.
Inputs: The training set {($x_i$, $y_i$)}. Outputs: the trained model $f_\theta(\bullet)$ Parameters: ∈ contains perturbation lengths of training data. $\epsilon_{min}$ is the minimum perturbation length. $\epsilon_{max}$ is the maximum perturbation length. $\mathcal{A}$ (x, y, $\epsilon_{init}$) represents the approximate shortest successful perturbation returned by an algorithm $\mathcal{A}$ (e.g. AN-PGD) on the data example (x, y) and at the initial norm $\epsilon_{init}$.

1: Randomly initialize the parameter θ of model f, and initialize every element of ∈ as $\epsilon_{min}$
2: repeat
3:    Read minibatch B = {($x_1$, $y_1$), ..., ($x_m$, $y_m$)}
4:    Make predictions on B and into two: wrongly predicted $B_0$ and correctly predicted $B_1$
5:    Initialize an empty batch $B_1^{adv}$
6:    for ($x_i$, $y_i$) in $B_1$ do
7:      Retrieve perturbation length $\epsilon_i$ from ∈
8:      $\delta_i^* = \mathcal{A}(x_i, y_i, \epsilon_i)$
9:      Update the $\epsilon_i$ in ∈ as $||\delta_i^*||$. If $||\delta_i^*|| < d_{max}$ then put ($x_i + \delta_i^*$, $y_i$) into $B_1^{adv}$
10:   end for
11:   Calculate gradients of $\sum_{j \in B^0} L_\theta^{CE}(x_j, y_j) + \frac{1}{3}\sum_{j \in B^1} L_\theta^{CE}(x_j, y_j) + \frac{2}{3}\sum_{j \in B_1^{adv}} L_\theta^{CE}(x_j, y_j)$, the combined loss on $B_0$, $B_1$, and $B_1^{adv}$, w.r.t. θ, according to Eqs. (7) and (8)
12:   Perform one step gradient step update on θ
13: until meet training stopping criterion Example Proposed MMA Training Algorithm Algorithm 2 summarizes the practical MMA training algorithm. During training for each minibatch, Applicants 1) separate it into 2 batches based on if the current prediction is correct; 2) find δ* for each example in the "correct batch"; 3) calculate of the gradient of θ based on to Eqs. (7) and (8).

1) if $\in = d_{\theta_0}$, then $\rho^* = 0$, $\in^*_{\theta_1}(\rho^*) = d_{\theta_1} \ge d_{\theta_0} = \in^*_{\theta_0}(\rho^*)$;

2) if $\in \le d_{\theta_0}$, then $\rho^* \le 0$, $\in^*_{\theta_0}(\rho^*) \le d_{\theta_0}$, $\in^*_{\theta_1}(\rho^*) \le d_{\theta_1}$, and $\in^*_{\theta_1}(\rho^*) \ge \in^*_{\theta_0}(\rho^*)$;

3) if $\in \ge d_{\theta_0}$, then $\rho^* \ge 0$, $\in^*_{\theta_0}(\rho^*) \ge d_{\theta_0}$, $\in^*_{\theta_1}(\rho^*) \ge d_{\theta_1}$, and $\in^*_{\theta_1}(\rho^*) \ge \in^*_{\theta_0}(\rho^*)$;

Remark 3.1. In other words, adversarial training, with the logit margin loss and a fixed perturbation length $\in$ 1) exactly maximizes the margin, if $\in$ is equal to the margin;

2) maximizes a lower bound of the Margin, if $\in$ is smaller than the margin;

3) maximizes an upper bound of the margin, if $\in$ is larger, than the margin.

Next Applicants look at adversarial training with the cross-entropy loss (Madry et al., 2017) through the connection between cross-entropy and the soft logit margin loss from Proposition 2.4. Applicants first look at adversarial training on the SLM loss. Fixing $\{(x, y)\}$, let $$d_\theta^{SLM} = d_\theta^{SLM}(x, y), \text{ and } \epsilon_{SLM,\theta}^*(\rho) = \min_{L_\theta^{SLM}(x+\delta,y) \geq \rho} \|\delta\|.$$

Corollary 3.1. Assuming an update from adversarial training changes $\theta_0$ to $\theta_1$, such that $\max_{\|\delta\|\leq \in} L_{\theta_0}^{SLM}(x+\delta, y) > \max_{\|\delta\|\leq \in} L_{\theta_1}^{SLM}(x+\delta, y)$, if $\in \leq d_{\theta_0}^{SLM}$, then $\rho^* = \max_{\|\delta\|\leq \in} L_{\theta_0}^{SLM}(x+\delta, y) \leq 0$, $\epsilon_{SLM,\theta_0}^*(\rho^*) \leq d_{\theta_0}$, $\epsilon_{SLM,\theta_1}^*(\rho^*) \leq d_{\theta_1}$, and $\epsilon_{SLM,\theta_1}^*(\rho^*) \geq \epsilon_{SLM,\theta_0}^*(\rho^*)$.

Remark 3.2. In other words, if $\in$ is smaller than or equal to the SLM-margin, adversarial training, with the SLM loss and a fixed perturbation length $\in$, maximizes a lower bound of the SLM-margin, thus a lower bound of the margin.

Recall Proposition 2.4 shows that $L_\theta^{CE}$ and $L_\theta^{SLM}$ have the same gradient direction w.r.t. both the model parameter and the input. In adversarial training (Madry et al., 2017), the PGD attack only uses the gradient direction w.r.t. the input, but not the gradient magnitude. Therefore, in the inner maximization loop, using the SLM and CE loss will result in the same approximate $\delta^*$. Furthermore, $\nabla_\theta L_\theta^{CE}(x+\delta^*, y)$ and $\nabla_\theta L_\theta^{SLM}(x+\delta^*, y)$ have the same direction. If the step size is chosen appropriately, then a gradient update that reduces $L_\theta^{CE}(x+\delta^*, y)$ will also reduce $L_\theta^{SLM}(x+\delta^*, y)$. Combined with Remark 3.2, these suggest:

Adversarial training with cross entropy loss (Madry et al., 2017) approximately maximizes a lower bound of the margin, if $\in$ is smaller than or equal to the SLM-margin.

Remark 3.3. From the analysis above, Applicants recognize that when E equals to (or smaller than) the margin, adversarial training maximizes the margin (or the lower bound of it). On the other hand, when $\in$ is larger then the margin, they do not have such relation. Applicants could anticipate that when $\in$ is too large, adversarial training might not necessarily increase the margin. For adversarial training with a large $\in$, starting with a smaller $\in$ then gradually increasing it could help, since the lower bound of margin is maximized at the start of training. Results in the earlier Sections corroborate this theoretical prediction.

FIG. 4 is an example pseudocode provided in accordance with an embodiment and is provided as an illustrative, non-limiting example.

An example description of the implementation of the approach is provided as a non-limiting example below. A neural network is provided that models the scoring function where each logit (e.g., output of the network without softmax function) represents the score of each class.

From Theorem 1.1, it is known that performing regular gradient descent on $x+\delta^*$, namely the closest point to x on the decision boundary, then the approach is performing gradient descent on the margin.

Therefore, it is useful is to find $\delta^*$ or a perturbation as close to possible to $\delta^*$.

If one knows the margin $\epsilon^*$ of a data point x, PGD perturbed x with length $\epsilon^*$ can be applied, PGD (x, $\epsilon^*$), as an approximation of $x+\delta^*$, assuming that PGD attack maximizes the loss reasonably well.

The margin $\epsilon^*$ is estimated using PGD attack followed by a binary search for the zero-crossing of loss L. Specifically, the approach includes performing a PGD attack on x with a fixed perturbation length $\epsilon_0$ to obtain $x_{adv}$, and then searching along the direction of xadv-x to find a scaled perturbation that gives L=0. The norm of this scaled on-decision boundary perturbation is used as the margin estimate.

In this section, an example embodiment is shown to be a stronger requirement than adversarial training.

Recall that in adversarial training, a model $f$ is learned by minimizing the adversarial loss, $$\min_\theta G(\theta) = \min_\theta \max_{\|\delta\|\leq \in} L(\theta, x+\delta, y).$$

Consideration should be made in relation to: $\epsilon^* = \min_{L(\theta, x+\delta, y) \geq l} \|\delta\|$ and $1^* = \max_{\|\delta\|\leq \in} L(\theta, x+\delta, y)$.

Theorem 1.2. Let $L(\theta, x, y)$ be a $C^1$ differentiable function with respect to the input $x$. Assume $l^*$ is a regular value for $L(\theta, x, y)$. Then for any $l^* \in \text{Range}(L(\theta, x, y))$:

$$\epsilon^* = \min_{L(\theta, x+\delta, y) \geq l^*} \|\delta\| \implies \max_{\|\delta\|\leq \epsilon^*} L(\theta, x+\delta, y) = l^* \quad (7)$$

The zero-crossing binary search is denoted as arg $\min_\eta |L(\eta)|$ for brevity.

For any $\delta^*$:

$$\max_{\|\delta\|\leq \epsilon^*} L(\theta, x+\delta, y) = l^* \implies \min_{L(\theta, x+\delta, y) \geq l^*} \|\delta\| \leq \epsilon^* \quad (8)$$

Proof left$\Rightarrow$right Let $1^* \in \text{Range}(L(\theta, x, y))$ be given, Since $L(\theta, x, y)$ is defined on a compact set $[0, 1]^d$ and $L(\theta, x+\delta, y) \geq 1^*$ is a closed set, and $\|\delta\|$ is a continuous function, the minimum $\epsilon^* = \|\delta^*\|$ is achieved by $\delta^*$. Note that $$\epsilon^* = \min_{L(\theta, x+\delta, y) \geq l^*} \|\delta\| \quad (9)$$

$$= \inf_{x+\delta \in \{x+\delta: L(\theta, x+\delta, y) \geq l^*\}} \|x+\delta - x\| \quad (10)$$

$$= d(z, \{z: L(\theta, z, y) \geq l^*\}) \quad (11)$$

$$= d(z, \{z: L(\theta, z, y) = l^*\}) \quad (12)$$

The first three equalities are reformulations of the definitions. The last equality follows because $l^*$ is a regular value for $L(\theta, x, y)$ by Sard's theorem and implicit function theorem, $\{z: L(\theta, z, y) = L^*\}$ is a $C^1$ manifold which is the boundary for $\{z: L(\theta, z, y) \geq 1^*\}$. Then the minimization is achieved on the boundary instead of the interior, by a perturbation argument leading to contradiction. Moreover, observe no $\delta$ such that $\|\delta\| < \|\delta^*\|$ can reach the minimum, due to the monotonicity of the norm function with respect to radius. Together, this means $\epsilon^* = \|\delta^*\|$ is achieved at $\{z: L(\theta, z, y) = L^*\}$. Therefore, $$\max_{\|\delta\|\leq\epsilon^*} L(\theta, x+\delta, y) = \min_{\|\delta\|=\epsilon^*} L(\theta, x+\delta, y) = l^*$$

right⇒left. The argument is almost identical to the above except that we longer have monotonicity of the lass $L(\theta, x+\delta, y)$ with respect to any parameterization in the input $\delta$, due to the lack of strict convexity of L. Therefore, there is a gap when going from the right to the left.

When we have $\delta^\# = \arg\max_{\|\delta\|\leq\epsilon^\#} L(\theta, X+\delta, y)$ and $l^\# = L(\theta, x\delta^\#, y)$ and then perform gradient descent using $\equiv_\theta L(\theta, x+\delta^\#, y)$, it is equivalent (up to a scaling factor) to perform gradient ascent on, $\epsilon^\#$, where $\epsilon^\# = \min_{L(\theta, x+\delta, y)\geq l^\#} \|\delta\|$ Additionally we leave the following corollary Corollary 1.1. Given $\star_0 = \min_{L(\theta, x+\delta, y)\geq l_0} \|\delta\|$ and $\epsilon_1 = \min_{L(\theta, x+\delta, y)\geq l_1} \|\delta\|$, then $l_1 > l_0 \Rightarrow \epsilon_1 \geq \epsilon_0$.

Based on Proposition 1.1, we can see that if $l^\# > 0$, then $\epsilon^\#$ is a upper bound of the margin, if $l^\# < 0$, then $\epsilon^\#$ is a lower bound of the margin.

Therefore, minimizing "adversarial loss" with fixed norm ball is maximizing the lower bound of the margin on robust examples, and maximizing the upper bound of the margin on non-robust examples.

There will be no doubt that some $\delta$ will lead a change the label of $x_0+\delta$ such that the loss is positive, unless the network outputs the same label on the entire domain.

Therefore, there will always be a feasible region for $\delta$.

Depends on the value of $L_{x_0}(\theta, 0)$, there are 3 situations (for each case, Applicants analyze where the optimal is obtained, value of margin, gradient of margin):

1. When $L_{x_0}(\theta, 0) < 0$, it means that $x_0$ is correctly classified. So the margin will be obtained on the boundary of the constraint, the equality constraint $L_{x_0}(\theta, 0) = 0$. The margin will be positive, i.e. $\epsilon^* > 0$. Infinitesimal changes of will change the level set $L_{x_0} = (\theta, 0)$. So $\epsilon^*$ has non-zero gradient with respect to $\theta$.

2. When $L_{x_0}(\theta, 0) > 0$, it means the example is already wrongly classified, and therefore the margin will be zero, $\epsilon^* = 0$. Infinitesimal changes of $\theta$ will not lead to changes of the margin's value. So e has zero gradient with respect to a $\theta$ For this situation, the only hope is to minimize the loss to negative, in order to get a positive margin. This observation is related to "warm start" and how to automatically adjust regularization coefficients, say by introducing concepts like "FG(S)M-margin".

3. For the measure zero case of $L_{x_0}(\theta, 0) = 0$, $\epsilon^*$ is obtained both on the original point and the constraint boundary. $L_{x_0}(\theta, 0) = 0$. So $\epsilon^*$ has non-zero gradient with respect to $\theta$.

Figure 5:
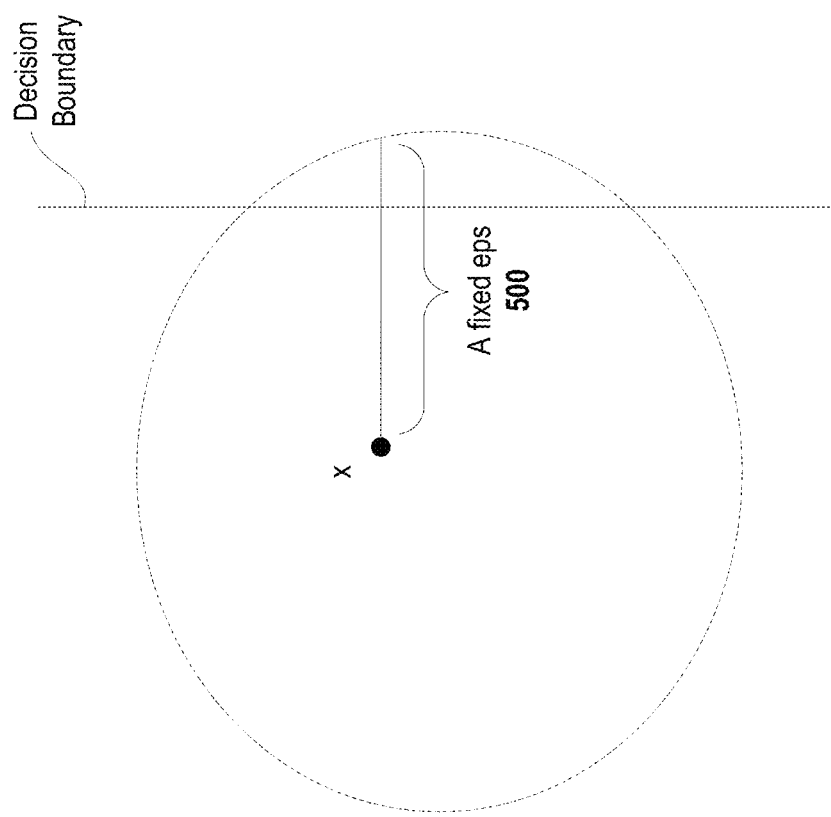
FIG. 5 is an example illustration of an adversarial example generated using a nave approach where a fixed perturbation length is used, according to some embodiments.

FIG. 5 is an example illustration of an adversarial example generated using a nave approach where a fixed perturbation length is used.

As shown in this figure, traditional approaches to adversarial training suffer from inherent limitations in that a fixed perturbation length 500 is used through the training process. In general, the fixed perturbation length 500 seems to be set arbitrarily. Moreover, different data points may have different intrinsic robustness, and fixing one perturbation length for all the data points across the entire training procedure is suboptimal.

Adversarial training with fixed perturbation length $\in$ 500 is inferior to MMA training because it maximizes a lower (or upper) bound of the margin if the fixed perturbation length $\in$ 500 is smaller (or larger) than the margin of that training point. As such, MMA training improves adversarial training in the sense that it enables adaptive selection of the "correct" perturbation length $\in$ as the margin individually for each data point.

Figure 6:
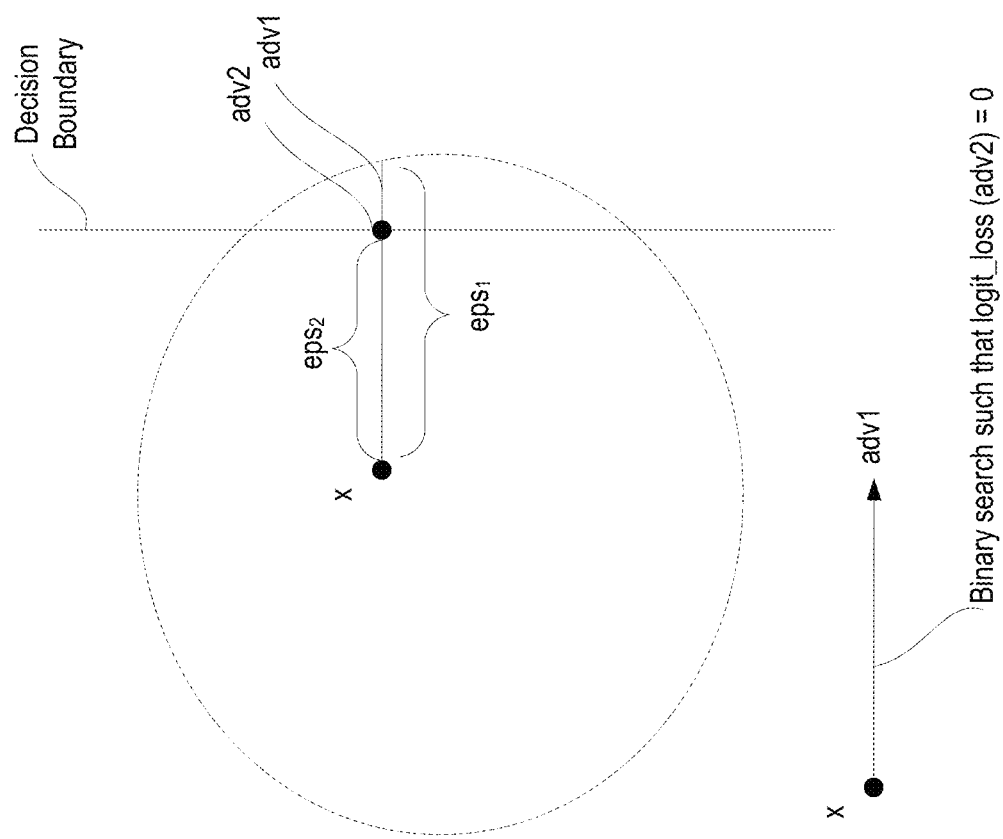
FIG. 6 is an example illustration of an adversarial example generated in accordance with some embodiments, where $adv_2$ is generated based on a binary search of $adv_1$.

FIG. 6 is an example illustration of an adversarial example generated in accordance with some embodiments where $adv_2$ is generated based on a binary search of $adv_1$.

Figure 7B:
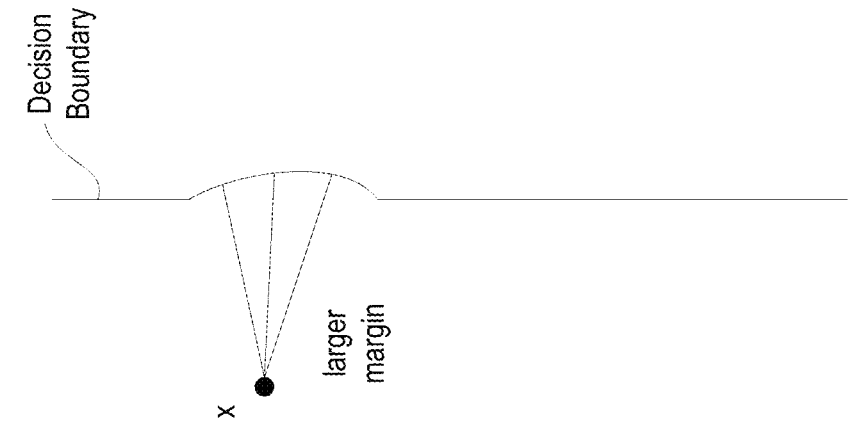
FIG. 7A and FIG. 7B are illustrations of a margin pre-training with an improved adversarial example and post-training with an improved adversarial example, according to some embodiments.
Figure 7A:
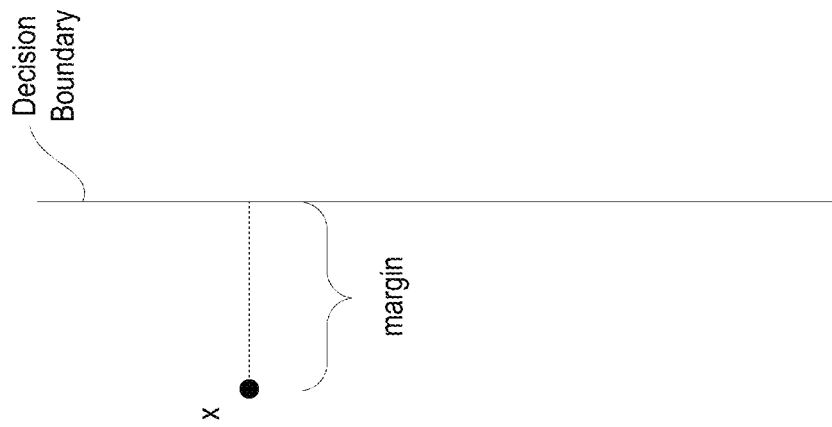

FIG. 7A and FIG. 7B are illustrations of a margin pre-training with an improved adversarial example and post-training with an improved adversarial example. In FIG. 7B, a larger margin is provided in respect of a decision boundary.

Figure 8:
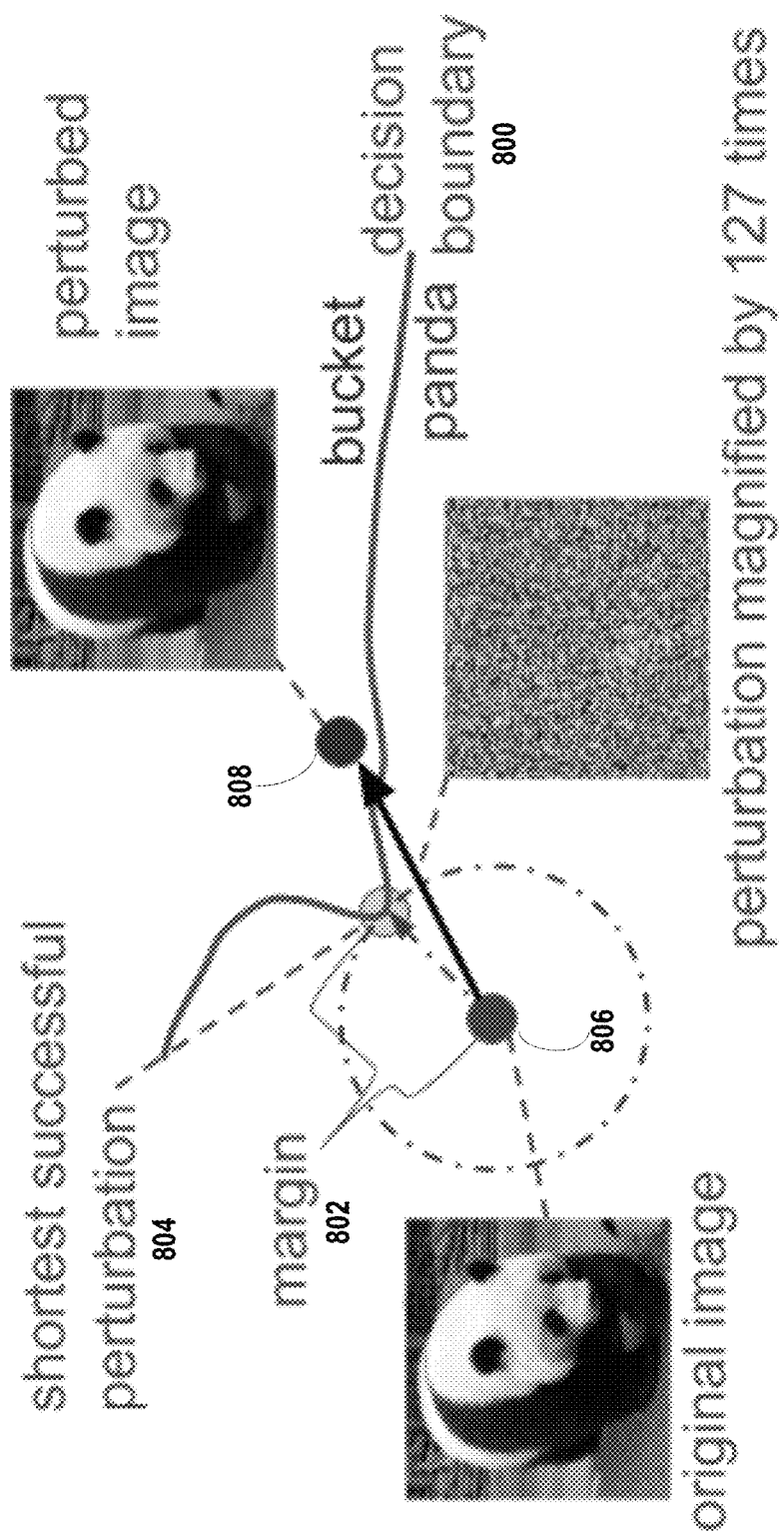
FIG. 8 is an illustration of decision boundary, margin, and shortest successful perturbation on application of an adversarial perturbation, according to some embodiments.

FIG. 8 is an illustration of decision boundary 800, margin 802, and shortest successful perturbation 804 on application of an adversarial perturbation.

FIG. 8 is an example where the classifier changes its prediction from panda to bucket when the input is perturbed from sample point A 806 to sample point B 808. A neural network may be trained to correctly classify an input image as that of a panda bear. However, adding small changes to this benign example by applying a perturbative noise to the input may cause a shift of classification such that the same image of a panda bear is incorrectly classified by the system as a bucket. The use of such perturbative noises provides a tool with a high probability of success in fooling the neural network as part of an adversarial attack.

This example also shows the natural connection between adversarial robustness and the margins of the data points, where the margin 802 is defined as the distance from a data point to the classifier's decision boundary 800. Intuitively, the margin 802 of a data point is the minimum distance needed to perturb x and make the prediction go wrong. Thus, the larger the margin 802, the farther the distance from the input to the decision boundary 800 of a classifier, and the more robust the classifier is with respect to this input.

FIG. 9 is a 1-D example of how margin is affected by decreasing the loss at different locations, according to some embodiments. A 1-D example is shown to explain the principle and mechanism of operation, but in practical implementations, an N-dimensional approach is more likely, as N may be the number of potential variables or aspects being tracked in the machine learning data model (e.g., neural network).

For example, there may be a 2-D example, a 3-D example, a 4-D example, and so forth, and what is important to note is the perturbation distance.

The margin of a data point is the minimum distance that x has to be perturbed to change a classifier's prediction. Thus, the larger the margin, the farther the distance from the input to the decision boundary of the classifier, and the more robust the classifier is with respect to this input.

As explained below, the use of MMA training is shown to directly maximize margins calculated for each data point at 902. 902 illustrates the principle of some embodiments described herein.

The perturbation shown is improved relative to the nave approaches of 904 and 906, which show a fixed perturbation length approach.

In contrast, the use of a fixed arbitrary perturbation length may lead to either margin increases at 904, or margin decreases at 906, depending on whether the perturbation length is set too small, such that the resulting models lack robustness, or too large, such that the resulting models lack accuracy.

Figure 11:
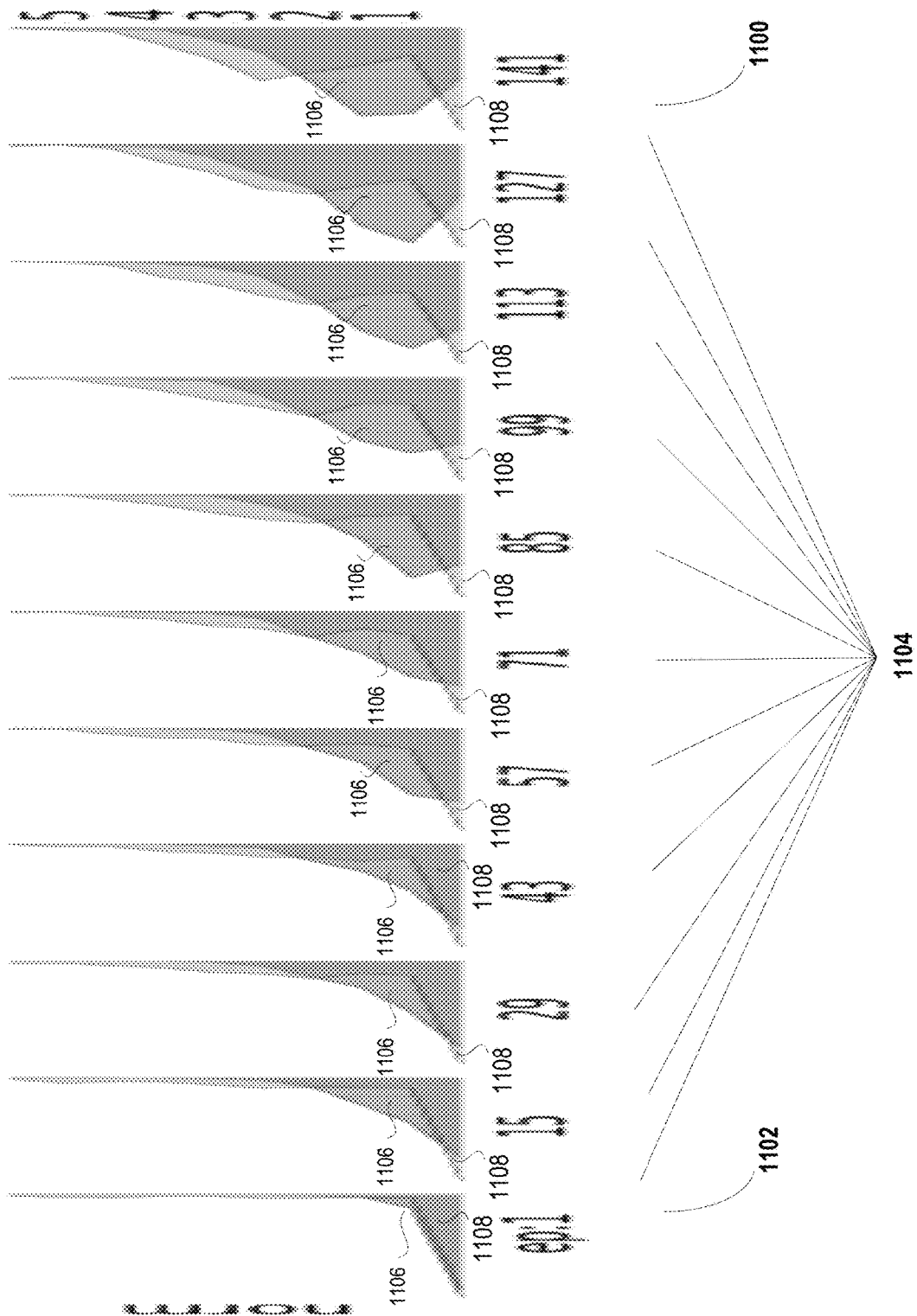
FIG. 11 is an example diagram of margin distributions during training, according to some embodiments.

FIG. 9 should be contemplated in view of FIG. 11, which shows sample histograms whereby a comparison is drawn between the two approaches, which becomes more apparent as the number of epochs increase.

As shown in FIG. 11, the histogram generated in relation to the fixed approaches starts to have two peaks, one at the origin and one at a further distance. These two peaks are indicative of examples generated that are either "too hard" (too close to the origin), or "too easy" (too far from the origin).

On the other hand, the MMA approach of some embodiments yields improved outcomes that has a peak in the "Goldilocks" range whereby the examples are useful for training (being neither too hard nor too easy). This is evident in the histograms of FIG. 11.

In technical terms, FIG. 9 illustrates the relationship between the margin and the adversarial loss with an example.

Consider a 1-D example at 900, where the input example x is a scalar. Consider also perturbing x in the positive direction with perturbation $\delta$, fixing (x, y), and overloading $L(\delta, \theta) = L_\theta^{LM}(x+\delta, y)$, which is monotonically increasing on $\delta$, namely larger perturbation results in higher loss. Let $L(\bullet, \theta_0)$ (the dashed curve) denote the original function before an updated step, and $\delta^*_0 = \arg\min_{L(\delta,\theta_0) \geq 0} \|\delta\|$ denote the corresponding margin (same as shortest successful perturbation in 1D).

As shown at 902, as the parameter is updated to $\theta_1$ such that $L(\delta^*_0, \theta_1)$ is reduced, the new margin $\delta^*_1 = \arg\min_{L(\delta,\theta_1) \geq 0} \|\delta\|$ is enlarged. Intuitively, a reduced value of the loss at the shortest successful perturbation leads to an increase in margin.

FIG. 9 further shows that an adversarial training update step does not necessarily increase the margin. In particular, as an update is performed to reduce the value of loss at the fixed perturbation $\in$, the parameter is updated from $\theta_0$ to $\theta_1$.

This update gives rise to two different scenarios of the updated loss functions $L_{\theta_1}(\bullet)$ (the solid curve) at 904 and 906.

At both 904 and 906, $L_{\theta_1}(\in)$ is decreased by the same amount. However, the margin is increased at 904 with $\delta^*_1 > \delta^*_0$ but decreased at 906 with $\delta^*_1 < \delta^*_0$.

Formalizing the intuitive analysis, two theorems are presented connecting adversarial training and margin maximization. For brevity, fixing $\{(x, y)\}$, let $L(\theta, \delta) = L_\theta^{LM}(x+\delta, y)$, $d_\theta = d_\theta(x, y)$, and $\in^*_\theta(\rho) = \min_{\delta: L(\delta, \theta) \geq \rho} \|\delta\|$.

Applicants empirically examine several hypotheses and compare MMA training with different adversarial training algorithms on the MNIST and CIFAR10 datasets under $l_\infty/l_2$ norm constrained perturbations. Due to space limitations, Applicants mainly present results on CIFAR10-$l_\infty$ for representative models in Table 1. Full results are in Table 2 to 13 in the Appendix. Implementation details are also left to the Appendix, including neural network model, training and attacking hyperparameters.

The results confirm the theory and show that MMA training is stable to its hyperparameter $d_{max}$, and balances better among various attack lengths compared to adversarial training with fixed perturbation magnitude. This suggests that MMA training is a better choice for defense when the perturbation length is unknown, which is often the case in practice.

Measuring Adversarial Robustness: Applicants use the robust accuracy under multiple projected gradient descent (PGD) attacks (Madry et al., 2017) as the robust measure. Specifically, given an example, each model is attacked by both repeated randomly initialized whitebox PGD attacks and numerous transfer attacks, generated from whitebox PGD attacking other models. If any one of these attack succeeds, then the model is considered "not robust under attack" on this example. For each dataset-norm setting and for each example, under a particular magnitude $\in$, Applicants first perform N randomly initialized whitebox PGD attacks on each individual model, then use N·(m−1) PGD attacks from all the other models to perform transfer attacks, where m is the total number of model considered under each setting. In the experiments, Applicants use N=10 for models trained on CIFAR10, thus the total number of the "combined" (whitebox and transfer) set of attacks is 320 for CIFAR10-$l_\infty$ (m=32).[3]

Applicants use ClnAcc for clean accuracy, AvgAcc for the average over both clean accuracy and robust accuracies at different $\in$'s, AvgRobAcc for the average over only robust accuracies under attack.

Effectiveness of Margin Maximization During Training

As discussed in an earlier section, MMA training enlarges margins of all training points, while PGD training, by minimizing the adversarial loss with a fixed $\in$, might fail to enlarge margins for points with initial margins smaller than $\in$.

This is because when $d_\theta(x, y) < \in$, PGD training is maximizing an upper bound of $d_\theta(x, y)$, which may not necessarily increase the margin. To verify this, Applicants track how the margin distribution changes during training processes in 2 models under the CIFAR10-$l_{2^4}$ case, MMA-3.0 vs PGD-2.5. Applicants use MMA-$d_{max}$ to denote the MMA

TABLE 1

Accuracies of representative models trained on CIFAR10 with $\ell_\infty$-norm constrained attacks. These robust accuracies are calculated under combined (whitebox + transfer) PGD attacks. AvgAcc averages over clean and all robust accuracies; AvgRobAcc averages over all robust accuracies.

| CIFAR10 Model | Cln Acc | AvgAcc | AvgRobAcc | RobAcc under different ϵ, combined (whitebox + transfer) attacks |  |  |  |  |  |  |  |
|---|---|---|---|---|---|---|---|---|---|---|---|
|  |  |  |  | 4 | 8 | 12 | 16 | 20 | 24 | 28 | 32 |
| PGD-8 | 85.14 | 27.27 | 20.03 | 67.73 | 46.47 | 26.63 | 12.33 | 4.69 | 1.56 | 0.62 | 0.22 |
| PGD-16 | 68.86 | 28.28 | 23.21 | 57.99 | 46.09 | 33.64 | 22.73 | 13.37 | 7.01 | 3.32 | 1.54 |
| PGD-24 | 10.90 | 9.95 | 9.83 | 10.60 | 10.34 | 10.11 | 10.00 | 9.89 | 9.69 | 9.34 | 8.68 |
| PGDLS-8 | 85.63 | 27.20 | 19.90 | 67.96 | 46.19 | 26.19 | 12.22 | 4.51 | 1.48 | 0.44 | 0.21 |
| PGSLS-16 | 70.68 | 28.44 | 23.16 | 59.43 | 47.00 | 33.64 | 21.72 | 12.66 | 6.54 | 2.98 | 1.31 |
| PGDLS-24 | 58.36 | 26.53 | 22.55 | 49.05 | 41.13 | 32.10 | 23.76 | 15.70 | 9.66 | 5.86 | 3.11 |
| MMA-12 | 88.59 | 26.87 | 19.15 | 67.96 | 43.42 | 24.07 | 11.45 | 4.27 | 1.43 | 0.45 | 0.16 |
| MMA-20 | 86.56 | 28.86 | 21.65 | 66.92 | 46.89 | 29.83 | 16.55 | 8.14 | 3.25 | 1.17 | 0.43 |
| MMA-32 | 84.36 | 29.39 | 22.51 | 64.82 | 47.18 | 31.49 | 18.91 | 10.16 | 4.77 | 1.97 | 0.81 |
| PGD-ens | 87.38 | 28.10 | 20.69 | 64.59 | 46.95 | 28.88 | 15.10 | 6.35 | 2.35 | 0.91 | 0.39 |
| PGDLS-ens | 76.73 | 29.52 | 23.62 | 60.52 | 48.21 | 35.06 | 22.14 | 12.28 | 6.17 | 3.14 | 1.43 | trained model with the combined loss in Eq. (8) and hinge threshold $d_{max}$, and PGD-$\in$ to represent the PGD trained (Madry et al., 2017) model with fixed perturbation magnitude $\in$.

Specifically, Applicants randomly select 500 training points, and measure their margins at the checkpoint saved after each training epoch. Applicants use the norm of the perturbation, generated by the 1000-step DDN attack (Rony et al., 2018), to approximate the margin. The results are shown in FIG. 11, where each subplot is a histogram (rotated by 90°) of margin values. For the convenience of comparing across epochs, Applicants use the vertical axis to indicate margin value, and the horizontal axis for counts in the histogram. The number below each subplot is the corresponding training epoch. Margins mostly concentrate near 0 for both models at the beginning. As training progresses, both enlarge margins on average. However, in PGD training, a portion of margins stay close to 0 across the training process. At the same time, it also pushes some margins to be even higher than 2.5, probably because PGD training keeps maximizing lower bounds of these margins, as Applicants discussed earlier. the $\in$ value that the PGD-2.5 model is trained for. MMA training, on the other hand, does not "give up" on those data points with small margins. At the end of training, 37.8% of the data points for PGD-2.5 have margins smaller than 0.05, while the same number for MMA-3.0 is 20.4%. As such, PGD training enlarges the margins of "easy data" which are already robust enough, but "gives up" on "hard data" with small margins. Instead, MMA training pushes the margin of every data point, by finding the proper $\in$. In general, when the attack magnitude is unknown, MMA training would be able to achieve a better balance between small margins and large margins, and thus achieves a better balance among adversarial attacks with various $\in$.

Gradually Increasing $\in$ Helps PGD Training when $\in$ is Large

The previous analysis in an earlier section suggests that when the fixed perturbation magnitude $\in$ is small, PGD training increases the lower bound of the margin. On the other hand, when $\in$ is larger than the margin, PGD training does not necessarily increase the margin. This is indeed confirmed by the experiments. PGD training fails at larger $\in$, in particular $\in$=24/255 for the CIFAR10-$l_\infty$ as shown in Table 1. Applicants can see that PGD-24's accuracies at all test $\in$'s are around 10%.

Aiming to improve PGD training, Applicants propose a variant of PGD training, named PGD with Linear Scaling (PGDLS). The difference is that Applicants grow the perturbation magnitude from 0 to the fixed magnitude linearly in 50 epochs. According to the theory, a gradually increasing perturbation magnitude could avoid picking a $\in$ that is larger than the margin, thus manages to maximizing the lower bound of the margin rather than its upper bound, which is more sensible. It can also be seen as a "global magnitude scheduling" shared by all data points, which is to be contrasted to MMA training that gives magnitude scheduling for each individual example.

Applicants use PGDLS-$\in$ to represent these models and show their performances also in Table 1. Applicants can see that PGDLS-24 is trained successfully, whereas PGD-24 fails. At $\in$=8 or 16, PGDLS also performs similar or better than PGD training, confirming the benefit of training with small perturbation at the beginning.

Comparing MMA Training with PGD Training

From the first 3 columns in Table 1, Applicants can see that MMA training is very stable to its hinge hyperparameter $d_{max}$. When $d_{max}$ is set to smaller values such as 12 and 20, MMA models attain good robust accuracies across different attacking magnitudes, with the best clean accuracies in the table. When $d_{max}$ is large, MMA training can still learn a reasonable model that is both accurate and robust. For MMA-32, although $d_{max}$ is set to a "impossible-to-be-robust" level at 32/255, it still achieves 84.36% clean accuracy and 47.18% robust accuracy at 8/255, and automatically "ignores" the demand to be robust at larger $\in$'s, including 20, 24, 28 and 32, as it might be infeasible due to the intrinsic difficulty of the problem. In contrast, PGD trained models are more sensitive to their fixed perturbation magnitude. In terms of the overall performance, Applicants notice that MMA training with a large $d_{max}$, e.g. 20 or 32, achieves high AvgAcc values, e.g. 28.86% or 29.39%. However, for PGD training to achieve a similar performance, $\in$ needs to be carefully picked (PGD-16 and PGDLS-16) and their clean accuracies suffer a significant drop.

Applicants also compare MMA models with ensemble of PGD trained models. PGD-ens/PGDLS-ens represents the ensemble of PGD/PGDLS trained models with different $\in$'s. The ensemble makes prediction by majority voting on label predictions, and uses softmax scores as the tie breaker.

MMA training achieves similar performance compared to the ensemble PGD models. PGD-ens maintains a good clean accuracy, but it is still marginally outperformed by MMA-32 w.r.t. robustness at varies $\in$'s. Further note that 1) the ensemble models require significantly higher computation costs both at training and test times; 2) Attacking an ensemble model is still relatively unexplored in the literature, thus the whitebox PGD attacks on the ensembles may not be sufficiently effective; and 3) as shown in the Appendix, for MNIST-$l_\infty/l_2$, MMA trained models significantly outperform the PGD ensemble models.

Testing on gradient free attacks: As a sanity check for gradient obfuscating (Athalye et al., 2018), Applicants also performed the SPSA attack (Uesato et al., 2018), to all the $l_\infty$-MMA trained models on the first 100 test examples. Applicants find that, in all cases, SPSA attack does not find any new adversarial examples in addition to whitebox only PGD attacks.

In this description, Applicants proposed to directly maximizes the margins to achieve adversarial robustness. Applicants developed the MMA training algorithm that optimizes the margins via adversarial training with "optimal" perturbation magnitude. Applicants further rigorously analyzed the relation between adversarial training and margin maximization. The experiments on CIFAR10 and MNIST confirmed the theory and demonstrated that MMA training outperformed adversarial training in terms of both adversarial robustness and its "robustness in training" w.r.t to the maximum perturbation magnitude considered.

FIG. 10 is a visualization of a loss landscape in the input space for MMA and PGD trained models showing that when the model is only trained with an objective function such as $$\min_\theta L_\theta^{MMA}(S), \text{ where}$$

$$L_\theta^{MMA}(S) = \sum_{i \in S_\theta^+ \cap \mathcal{H}_\theta} L_\theta^{CE}(x_i + \delta^*, y_i) + \sum_{j \in S_\theta^-} L_\theta^{CE}(x_j, y_j),$$

where $\delta^* = \arg\min_{L_\theta^{SLM}(x+\delta,y) \leq 0} \|\delta\|$ is found with the SLM loss, and $\mathcal{H}_\theta = \{i: d_\theta(x_i, y_i) < d_{max}\}$ is the set of examples that have margins smaller than the hinge threshold, the input space loss landscape is very flat, which makes PGD less efficient in finding δ* for training.

The example in FIG. 10 follows an experiment in which 50 examples from both training and test sets respectively were chosen and PGD attacks were performed with ∈=8/255 and keeping the failed perturbations.

For each, 9 more points were linearly interpolated between the original example and the perturbed, and the associated logit margin losses were plotted. In each sub-FIG. 1000, the horizontal axis is the relative position of the interpolated example: e.g. 0.0 represents the original example, 1.0 represents the perturbed example with ∈=8/255, 0.5 represents the average of them. The vertical axis is the logit margin loss. Recall that when $L_\theta^{LM}(x+\delta, y)<0$, the perturbation fails.

OMMA-32 at 1002 represents model trained with only $L_\theta^{MMA}$ in the objective function with dmax=8. PGD-8 at 1004 represents model trained with PGD training with ∈=8. The results show that OMMA-32 at 1002 has "flatter" loss curves compared to PGD-8 at 1004. This could potentially weaken the adversary during training, which leads to poor approximation of δ* and hampers training.

To alleviate this issue, an additional clean loss term was added to the MMA objective in the objective function to lower the loss on clean examples, so that the input space loss landscape is steeper. Specifically, the following combined loss is used:

$$L_\theta^{CB}(S) = \frac{1}{3}\sum_{j \in S} L_\theta^{CE}(x_j, y_j) + \frac{2}{3}L_\theta^{MMA}(S).$$

The model trained with this combined loss and dmax=32 is the MMA-32 shown at 1006. Adding the clean loss is effective. Most of the loss curves are more tilted, and the losses of perturbed examples are lower.

FIG. 11 is an example diagram of margin distributions during training.

As shown at 1100, the MMA training algorithm disclosed herein achieves the desired behavior of maximizing the margin of each individual example.

Specifically, FIG. 11 shows eleven epochs of randomly selected 500 training points and measuring the margins of said points at the checkpoint saved after each training epoch.

A norm of the perturbation, generated by the 1000-step DDN attack, was used to approximate the margin.

Each subplot 1104 is a histogram (rotated by 90°) of margin values. For the convenience of comparing across epochs, vertical axis were used to indicate margin value, and the horizontal axis for counts in the histogram. The number below each subplot 1104 is the corresponding training epoch.

At 1102, margins are shown to mostly concentrate near 0 for both models at the beginning. As training progresses between epoch 1 at 1102 and epoch 141 at 1100, both margins are observed to enlarge on average. As shown in FIG. 11, there are two histograms, 1106 and 1108 at different epochs. It is important to note that the distinctions between the peaks.

For 1106 (MMA training), the peak is at a range that is useful for training. Conversely, for 1108 (PGD training), the first peak is around a margin and there is also a second peak at around 2.9. In PGD training, several margins stay close to 0 across the training process and some margins are pushed to be even higher than 2.5, probably because PGD training keeps maximizing the lower bounds of these margins. MMA training shown at 1106, on the other hand, does not "give up" on those data points with small margins. At the end of training, 37.8% of the data points for PGD-2.5 have margins smaller than 0.05, while the same number for MMA-3.0 is 20.4%.

As such, PGD training 1108 enlarges the margins of "easy data" which are already robust enough, but "gives up" on "hard data" with small margins. Instead, MMA training 1106 pushes the margin of every data point, by finding the proper ∈. In general, when the attack magnitude is unknown, MMA training would be able to achieve a better balance between small margins and large margins, and thus achieves a better balance among adversarial attacks with various ∈.

Overall, as shown in Table 1 below, MMA training is stable to its hyperparameter $d_{max}$, and balances better among various attack lengths compared to adversarial training with fixed perturbation magnitude. This suggests that MMA training is a better choice for defense when the perturbation length is unknown, which is often the case in practice.

TABLE 1

Accuracies of representative models trained on CIFAR10 with $\ell_\infty$-norm constrained attacks. These robust accuracies are calculated under combined (whitebox + transfer) PGD attacks. AvgAcc averages over clean and all robust accuracies; AvgRobAcc averages over all robust accuracies.

| CIFAR10 | | | | RobAcc under different ϵ, combined (whitebox + transfer) attacks | | | | | | | |
|---|---|---|---|---|---|---|---|---|---|---|---|
| Model | Cln Acc | AvgAcc | AvgRobAcc | 4 | 8 | 12 | 16 | 20 | 24 | 28 | 32 |
| PGD-8 | 85.14 | 27.27 | 20.03 | 67.73 | 46.47 | 26.63 | 12.33 | 4.69 | 1.56 | 0.62 | 0.22 |
| PGD-16 | 68.86 | 28.28 | 23.21 | 57.99 | 46.09 | 33.64 | 22.73 | 13.37 | 7.01 | 3.32 | 1.54 |
| PGD-24 | 10.90 | 9.95 | 9.83 | 10.60 | 10.34 | 10.11 | 10.00 | 9.89 | 9.69 | 9.34 | 8.68 |
| PGDLS-8 | 85.63 | 27.20 | 19.90 | 67.96 | 46.19 | 26.19 | 12.22 | 4.51 | 1.48 | 0.44 | 0.21 |
| PGSLS-16 | 70.68 | 28.44 | 23.16 | 59.43 | 47.00 | 33.64 | 21.72 | 12.66 | 6.54 | 2.98 | 1.31 |
| PGDLS-24 | 58.36 | 26.53 | 22.55 | 49.05 | 41.13 | 32.10 | 23.76 | 15.70 | 9.66 | 5.86 | 3.11 |
| MMA-12 | 88.59 | 26.87 | 19.15 | 67.96 | 43.42 | 24.07 | 11.45 | 4.27 | 1.43 | 0.45 | 0.16 |
| MMA-20 | 86.56 | 28.86 | 21.65 | 66.92 | 46.89 | 29.83 | 16.55 | 8.14 | 3.25 | 1.17 | 0.43 |
| MMA-32 | 84.36 | 29.39 | 22.51 | 64.82 | 47.18 | 31.49 | 18.91 | 10.16 | 4.77 | 1.97 | 0.81 |
| PGD-ens | 87.38 | 28.10 | 20.69 | 64.59 | 46.95 | 28.88 | 15.10 | 6.35 | 2.35 | 0.91 | 0.39 |
| PGDLS-ens | 76.73 | 29.52 | 23.62 | 60.52 | 48.21 | 35.06 | 22.14 | 12.28 | 6.17 | 3.14 | 1.43 |

As discussed previously, when the fixed perturbation magnitude ∈ is small, PGD training increases the lower bound of the margin. On the other hand, when ∈ is larger than the margin, PGD training does not necessarily increase the margin.

This is indeed confirmed by experimental data presented in Table 1. PGD training fails at larger $\in$, in particular $\in=24/255$ for the CIFAR10-$l_\infty$ as shown in Table 1. PGD-24's accuracies at all test $\in$'s are around 10%.

Aiming to improve PGD training, a variant of PGD training, namely PGD with Linear Scaling (PGDLS), is proposed. In PGDLS, the perturbation magnitude is increased from 0 to the fixed magnitude linearly in 50 epochs.

A gradually increasing perturbation magnitude could avoid picking a $\in$ that is larger than the margin, thus maximizing the lower bound of the margin rather than its upper bound, which is more sensible. It can also be seen as a "global magnitude scheduling" shared by all data points, which is to be contrasted to MMA training that gives magnitude scheduling for each individual example.

PGDLS-E is used to represent these models and show their performances in Table 1. Table 1 shows that PGDLS-24 is trained successfully, whereas PGD-24 fails. At $\in=8$ or 16, PGDLS also performs similar or better than PGD training, confirming the benefit of training with small perturbation at the beginning.

The first 3 columns in Table 1, further show that MMA training is very stable to its hinge hyperparameter $d_{max}$.

When $d_{max}$ is set to smaller values such as 12 and 20, MMA models attain good robust accuracies across different attacking magnitudes, with the best clean accuracies in the table.

When $d_{max}$ is large, MMA training can still learn a reasonable model that is both accurate and robust. For MMA-32, although $d_{max}$ is set to a "impossible-to-be-robust" level at 32/255, it still achieves 84.36% clean accuracy and 47.18% robust accuracy at 8/255, and automatically "ignores" the demand to be robust at larger $\in$'s, including 20, 24, 28 and 32, as it might be infeasible due to the intrinsic difficulty of the problem.

In contrast, PGD trained models are more sensitive to their fixed perturbation magnitude. In terms of the overall performance, MMA training with a large $d_{max}$, e.g. 20 or 32 achieves high AvgAcc values, e.g. 28.86% or 29.39%. However, for PGD training to achieve a similar performance, $\in$ needs to be carefully picked (PGD-16 and PGDLS-16) and their clean accuracies suffer a significant drop.

MMA models were further compared with an ensemble of PGD trained models. PGD-ens/PGDLS-ens represents the ensemble of PGD/PGDLS trained models with different $\in$'s. The ensemble makes prediction by majority voting on label predictions, and uses softmax scores as the tie breaker.

MMA training achieves similar performance compared to the ensemble PGD models. PGD-ens maintains a good clean accuracy, but it is still marginally outperformed by MMA-32 with respect to robustness at different $\in$'s.

Further note that 1) the ensemble models require significantly higher computation costs both at training and test times; 2) Attacking an ensemble model is still relatively unexplored in the literature, thus whitebox PGD attacks on the ensembles may not be sufficiently effective; and 3) for MNIST-$l_\infty$/$l_2$, MMA trained models significantly outperform the PGD ensemble models.

As a sanity check for gradient obfuscating, an SPSA attack was also performed on all $l_\infty$-MMA trained models on the first 100 test examples.

In all cases, the SPSA attack does not find any new adversarial examples in addition to whitebox only PGD attacks.

Figure 12:
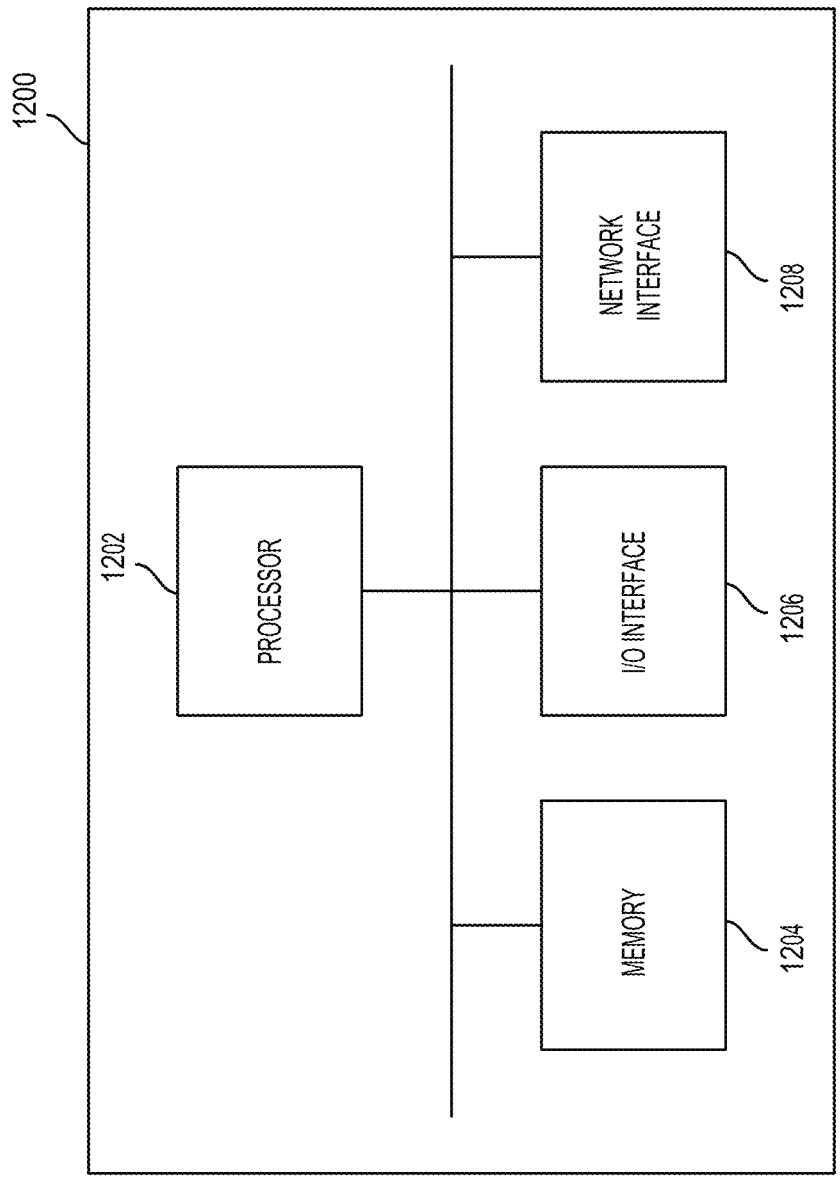
FIG. 12 is an example diagram of an example computing system, according to some embodiments.

FIG. 12 is an example diagram of an example computing system, according to some embodiments. FIG. 12 is a schematic diagram of a computing device 1200 such as a server. As depicted, the computing device includes at least one processor 1202, memory 1204, at least one I/O interface 1206, and at least one network interface 1208.

Processor 1202 may be an Intel or AMD x86 or x64, PowerPC, ARM processor, or the like. Memory 1204 may include a combination of computer memory that is located either internally or externally such as, for example, random-access memory (RAM), read-only memory (ROM), compact disc read-only memory (CDROM). Each I/O interface 1206 enables computing device 1200 to interconnect with one or more input devices, such as a keyboard, mouse, camera, touch screen and a microphone, or with one or more output devices such as a display screen and a speaker. I/O interfaces can include application programming interfaces.

Each network interface 1208 enables computing device 1200 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

APPENDIX

A. Proofs

A.1 Proof of Proposition 2.1

Proof. Recall $\in(\delta)=\|\delta\|$. Here Applicants compute the gradient for $d_\theta(x, y)$ in its general form. Consider the following optimization problem:

$$d_\theta(x, y) = \min_{\delta \in \Delta(\theta)} \epsilon(\delta),$$

where $\Delta(\theta)=\{\delta:L_\theta(x+\delta, y)=0\}$, $\in$ and $L(\delta, \theta)$ are both $C^2$ functions [6]. Denotes its Lagraingian by $\mathcal{L}(\delta, \lambda)$, where

[6]Note that a simple application of Danskin's Theorem would not be valid as the constraint set $\Delta(\theta)$ depends on the parameter $\theta$.

$$\mathcal{L}(\delta,\lambda)=\in(\delta)+\lambda L_\theta(x+\delta,y)$$

For a fixed $\theta$, the optimizer $\delta^*$ and $\lambda^*$ must satisfy the first-order conditions (FOC)

$$\frac{\partial \epsilon(\delta)}{\partial \delta}+\lambda \frac{\partial L_\theta(x+\delta, y)}{\partial \delta}\bigg|_{\delta=\delta^*,\lambda=\lambda^*}=0, \quad (10)$$

$$L_\theta(x+\delta, y)|_{\delta=\delta^*}=0.$$

Put the FOC equations in vector form, $$G((\delta, \lambda), \theta) = \begin{pmatrix} \frac{\partial \epsilon(\delta)}{\partial \delta}+\lambda\frac{\partial L_\theta(x+\delta, y)}{\partial \delta} \\ L_\theta(x+\delta, y) \end{pmatrix}\bigg|_{\delta=\delta^*,\lambda=\lambda^*}=0.$$

Note that G is $C^1$ continuously differentiable since $\in$ and $L(\delta, \theta)$ are $C^2$ functions. Furthermore, the Jacobian matrix of G w.r.t $(\delta, \lambda)$ is $$\nabla_{(\delta,\lambda)}G((\delta^*, \lambda^*), \theta) = \begin{pmatrix} \frac{\partial^2 \epsilon(\delta^*)}{\partial \delta^2}+\lambda^*\frac{\partial^2 L(\delta^*, L(\delta, \theta))}{\partial \delta^2} & \frac{\partial L(\delta^*, \theta)}{\partial \delta} \\ \frac{\partial L(\delta^*, \theta)}{\partial \delta}^\top & 0 \end{pmatrix}$$

which by assumption is full rank. Therefore, by the implicit function theorem, $\delta^*$ and $\lambda^*$ can be expressed as a function of $\theta$, denoted by $\delta^*(\theta)$ and $\lambda^*(\theta)$.

To further compute $\nabla_\theta d_\theta(x, y)$, note that $d_\theta(x, y)=\in(\delta^*(\theta))$. Thus, $$\nabla_\theta d_\theta(x, y) = \frac{\partial \epsilon(\delta^*)}{\partial \delta}\frac{\partial \delta^*(\theta)}{\partial \theta} = -\lambda^* \frac{\partial L(\delta^*, \theta)}{\partial \delta}\frac{\partial \delta^*(\theta)}{\partial \theta}, \quad (11)$$

where the second equality is by Eq. (10). The implicit function theorem also provides a way of computing $$\frac{\partial \delta^*(\theta)}{\partial \theta}$$

which is complicated involving taking inverse of the matrix $\equiv_{(\delta, \lambda)}G((\delta^*, \lambda^*), \theta)$. Here Applicants present a relatively simple way to compute this gradient. Note that by the definition of $\delta^*(\theta)$.

$$L(\delta^*(\theta)\theta)\equiv 0.$$

And $\delta^*(\theta)$ is a differentiable implicit function of $\theta$ restricted to this level set. Differentiate with w.r.t. $\theta$ on both sides:

$$\frac{\partial L(\delta^*, \theta)}{\partial \theta}+\frac{\partial L(\delta^*, \theta)}{\partial \delta}\frac{\partial \delta^*(\theta)}{\partial \theta}=0. \quad (12)$$

Combining Eq. (11) and Eq. (12), $$\nabla_\theta d_\theta(x, y) = \lambda^*(\theta)\frac{\partial L(\delta^*, \theta)}{\partial \theta}. \quad (13)$$

Lastly, note that $$\left\|\frac{\partial \epsilon(\delta)}{\partial \delta}+\lambda\frac{\partial L_\theta(x+\delta, y)}{\partial \delta}\bigg|_{\delta=\delta^*,\lambda=\lambda^*}\right\|_2=0.$$

Therefore, one way to calculate $\lambda^*(\theta)$ is by $$\lambda^*(\theta) = \frac{\frac{\partial \epsilon(\delta)}{\partial \delta}^\top \frac{\partial L_\theta(x+\delta, y)}{\partial \delta}}{\frac{\partial L_\theta(x+\delta, y)}{\partial \delta}^\top \frac{\partial L_\theta(x+\delta, y)}{\partial \delta}}\bigg|_{\delta=\delta^*} \quad \square$$

A.2 Proof of Proposition 2.2

Applicants provide more detailed and formal statements of Proposition 2.2.

For brevity, consider a K-layers fully-connected ReLU network, $f(\theta; x)=f_\theta(x)$ as a function of $\theta$.

$$f(\theta;x)=V^T D_K W_K D_{K-1} W_{K-1} \ldots D_1 W_K^T x$$

where the $D_k$ are diagonal matrices dependent on ReLU's activation pattern over the layers, and $W_k$'s and V are the weights (i.e. $\theta$). Note that $f(\theta; x)$ is a piecewise polynomial functions of $\theta$ with finitely many pieces. Applicants further define the directional derivative of a function g, along the direction of $\vec{v}$, to be:

$$g'(\theta; \vec{v}) := \lim_{t\downarrow 0}\frac{g(\theta+t\vec{v})-g(\theta)}{t}.$$

Note that for every direction $\vec{v}$, there exists $\alpha>0$ such that $f(\theta; x)$ is a polynomial restricted to a line segment $[\theta, \theta+\alpha \vec{v}]$. Thus the above limit exists and the directional derivative is well defined. Applicants first show the existence of $\vec{v}$ and t for $l(\theta_0+t\vec{v})$ given any $\in$. Let $l_{\theta_0,\vec{v},\in}(t):=\sup_{\|\delta\|\le \in} L(\delta, \theta_0+t\vec{v})$.

Proposition A.1. For $\in>0$, $t\in[0, 1]$, and $\theta_0\in\Theta$, there exists a direction $\vec{v}\in\Theta$, such that the derivative of $l_{\theta_0,\vec{v},\in}(t)$ exists and is negative. Moreover, it is given by $$l_{\theta_0,\vec{v},\in}(t)=L'(\delta^*,\theta_0;\vec{v}).$$

Proof. [Proof sketch] Since $\theta_0$ is not a local minimum, there exists a direction d, such that $$L'(\delta^*, \theta_0; \vec{v}) = \frac{\partial L(\delta^*, \theta_0+t\vec{v})}{\partial t}$$

is negative.

The Danskin theorem provides a way to compute the directional gradient along this direction $\vec{v}$. Applicants basically apply a version of Danskin theorem for directional absolutely continuous maps and semi-continuous maps (Yu, 2012). 1. the constraint set $\{\delta:\|\delta\|\le \in\}$ is compact; 2. $L(\theta_0+t$ $\vec{v}$; x+δ, y) is piecewise Lipschitz and hence absolutely continuous (an induction argument on the integral representation over the finite pieces). 3. $L(\theta_0+t\vec{v}; x+\delta, y)$ is continuous on both δ and along the direction $\vec{v}$ and hence upper semi continuous. Hence Applicants can apply Theorem 1 in Yu (2012).

Therefore, for any $\epsilon > 0$, if $\theta_0$ is not a local minimum, then there exits a direction d, such that for $\theta_1 = \theta_0 + t\vec{v}$ for a proper t, $$\sup_{\|\delta\| \le \epsilon} L(\delta, \theta_0 + t\vec{v}) < \sup_{\|\delta\| \le \epsilon} L(\delta, \theta_0). \tag{15}$$

The next proposition provides an alternative way to increase the margin of $f_0$.

Proposition A.2. Assume $f_{\theta_0}$ has a margin $\epsilon_0$, and $\theta_1$ such that $I_{\theta_0, \vec{v}, \epsilon_0}(t) \le I_{\theta_1, \vec{v}, \epsilon_0}(0)$, then $f_{\theta_1}$ has a larger margin than $\epsilon_0$.

Proof. Since $f_{\theta_1}$ has a margin $\epsilon_0$, thus $$\max_{\|\delta\| \le \epsilon_0} L(\theta_0; x+\delta, y) = 0$$

Further by $I_{\theta_0, \vec{v}, \epsilon_0}(t) \le I_{\theta_1, \vec{v}, \epsilon_0}(0)$ $$\sup_{\|\delta\| \le \epsilon} L(\delta, \theta_0 + t\vec{v}) \le \sup_{\|\delta\| \le \epsilon} L(\delta, \theta_0).$$

To see the equality (constraint not binding), Applicants use the following argument. The envelope function's continuity is passed from the continuity of $L(\theta_0; x+\delta, y)$. The inverse image of a closed set under continuous function is closed. If δ* lies in the interior of $\max_{\|\delta\| \le \epsilon_0} L_{\vec{v}, \epsilon}(\theta_0; x+\delta, y) \ge 0$, Applicants would have a contradiction. Therefore the constraint is not binding, due to the continuity of the envelope function. By Eq. (15), $\max_{\|\delta\| \le \epsilon_0} L(\theta_1; x+\delta, y) < 0$. So for the parameter $\theta_1$, $f_{\theta_1}$ has a margin $\epsilon_1 > \epsilon_0$.

Therefore, the update $\theta_1 \to \theta_0 = \theta_0 + t\vec{v}$ increases the margin of A.3 Proof of Proposition 2.3

Proof.

$$L_\theta^{LM}(x, y) = \left(\max_{j \ne y} f_\theta^j(x)\right) - f_\theta^y(x) \tag{16}$$

$$= \log\left(\exp\left(\max_{j \ne y} f_\theta^j(x)\right)\right) - f_\theta^y(x) \tag{17}$$

$$\le \log\left(\exp\left(\sum_{j \ne y} f_\theta^j(x)\right)\right) - f_\theta^y(x) \tag{18}$$

$$= L_\theta^{SLM}(x, y) \tag{19}$$

$$\le \log\left((K-1) \exp\left(\max_{j \ne y} f_\theta^j(x)\right)\right) - f_\theta^y(x) \tag{20}$$

$$= \log\left((K-1) + \left(\max_{j \ne y} f_\theta^j(x)\right)\right) - f_\theta^y(x) \tag{21}$$

$$= \log(K-1) + L_\theta^{LM}(x, y) \tag{22}$$

Therefore, $$L_\theta^{SLM}(x, y) - \log(K-1) \le L_\theta^{LM}(x, y) \le L_\theta^{SLM}(x, y).$$

A.4 A Lemma for Later Proofs

The following lemma helps relate the objective of adversarial training with that of the MMA training. Here, Applicants denote $L_\theta(x+\delta, y)$ as $L(\delta, \theta)$ for brevity.

Lemma A.1. Given (x, y) and θ, assume that $L(\delta, \theta)$ is continuous in δ, then for $\epsilon \ge 0$, and $\rho \ge L(0, \theta) \in$ Range ($L(\delta, \theta)$), it holds that $$\min_{L(\delta, \theta) \ge \rho} \|\delta\| = \epsilon \Rightarrow \max_{\|\delta\| \le \epsilon} L(\delta, \theta) = \rho; \tag{23}$$

$$\max_{\|\delta\| \le \epsilon} L(\delta, \theta) = \rho \Rightarrow \min_{L(\delta, \theta) \ge \rho} \|\delta\| \le \epsilon. \tag{24}$$

Proof Eq. (23). We prove this by contradiction. Suppose $\max_{\|\delta\| \le \epsilon} L(\delta, \theta) > \rho$. When $\epsilon = 0$, this violates our assumption $\rho \ge L(0, \theta)$ in the theorem. So assume $\epsilon > 0$. Since $L(\delta, \theta)$ is a continuous function defined on a compact set, the maximum is attained by $\bar{\delta}$ such that $\|\bar{\delta}\| \le \epsilon$ and $L(\bar{\delta}, \theta) > \rho$. Note that $L(\delta, \theta)$ is continuous and $\rho \ge L(0, \theta)$, then there exists $\tilde{\delta} \in (0, \bar{\delta})$ i.e. the line segment connecting 0 and $\bar{\delta}$, such that $\|\tilde{\delta}\| \le \epsilon$ and $L(\tilde{\delta}, \theta) = \rho$. This follows from the intermediate value theorem by restricting $L(\delta, \theta)$ onto $\langle \theta, \bar{\delta} \rangle$. This contradicts $\min_{L(\delta, \theta) \ge \rho} \|\delta\| = \epsilon$.

If $\max_{\|\delta\| \le \epsilon} L(\delta, \theta) < \rho$, then $\{\delta: \|\delta\| \le \epsilon\} \subseteq \{\delta: L(\delta, \theta) < \rho\}$. Every point $p \in \{\delta: \|\delta\| \le \epsilon\}$ is in the open set $\{\delta: L(\delta, \theta) < \rho\}$, there exists an open ball with some radius $r_p$ centered at p such that $B_{r_p} \subset \{\delta: L(\delta, \theta) < \rho\}$. This forms an open cover for $\{\delta: \|\delta\| \le \epsilon\}$. Since $\{\delta: \|\delta\| \le \epsilon\}$ is compact, there is an open finite subcover $\mathcal{U}_\epsilon$ such that: $\{\delta: \|\delta\| \le \epsilon\} \subset \mathcal{U}_\epsilon \subset \{\delta: L(\delta, \theta) < \rho\}$. Since $\mathcal{U}_\epsilon$ is finite, there exists h > 0 such that $\{\delta: \|\delta\| \le \epsilon + h\} \subset \{\delta: L(\delta, \theta) < \rho\}$. Thus $\{\delta: L(\delta, \theta) \ge \rho\} \subset \{\delta: \|\delta\| > \epsilon + h\}$, contradicting $\min_{L(\delta, \theta) \ge \rho} \|\delta\| = \epsilon$ again.

Eq. (24). Assume that $\min_{L(\delta, \theta) \ge \rho} \|\delta\| > \epsilon$, then $\{\delta: L(\delta, \theta) \ge \rho\} \subset \{\delta: \|\delta\| \ge \epsilon\}$. Taking complementary set of both sides, $\{\delta: \|\delta\| \le \epsilon\} \subset \{\delta: L(\delta, \theta) < \rho\}$. Therefore, by the compactness of $\{\delta: \|\delta\| \le \epsilon\}$, $\max_{\|\delta\| \le \epsilon} L(\delta, \theta) < \rho$, contradiction. □

A.5 Proof of Theorem 3.1

Proof Recall that $L(\theta, \delta) = L_\theta^{LM}(x+\delta, y)$, $d_\theta = (x, y)$, $\epsilon_\theta^*(\rho) = \min_{\delta: L(\delta, \theta) \ge \rho} \|\delta\|$, and $\rho^* = \max_{\|\delta\| \le \epsilon} L(\theta_0, \delta) > \max_{\|\delta\| \le \epsilon} L(\theta_1, \delta)$.

We first prove that $\forall \epsilon \in \epsilon_{\theta_1}^*(\rho^*) \ge \epsilon_{\theta_0}^*(\rho^*)$ by contradiction. We assume $\epsilon_{\theta_1}^*(\rho^*) < \epsilon_{\theta_0}^*(\rho^*)$. Let $\delta_\theta^*(\rho) = \arg\min_{\delta: L(\delta, \theta) \le \rho} \|\delta\|$, which is $\|\delta_{\theta_1}^*(\rho^*)\| < \|\delta_{\theta_0}^*(\rho^*)\|$. By Eq. (24), we have $\|\delta_{\theta_0}^*(\rho^*)\| \le \epsilon$. Therefore, $\|\delta_{\theta_1}^*(\rho^*)\| < \epsilon$. Then there exist a $\delta^\# \in \{\delta: \|\delta\| \le \epsilon\}$ such that $L(\theta_1, \delta^\#) \ge \rho^*$. This contradicts $\max_{\|\delta\| \le \epsilon} L(\theta_1, \delta) < \rho^*$. Therefore $\epsilon_{\theta_1}^*(\rho^*) \ge \epsilon_{\theta_0}^*(\rho^*)$.

For 1), $\epsilon = d_{\theta_0}$. By definition of margin in Eq. (1), we have $\rho^* = \max_{\|\delta\| \le d_{\theta_0}} L(\theta_0, \delta) = 0$. Also by definition of $\epsilon_\theta^*(\rho)$, $\epsilon_{\theta_0}^*(0) = d_{\theta_0}$, and $\epsilon_{\theta_1}^*(0) = d_{\theta_1}$.

For 2), $\epsilon < d_{\theta_0}$. We have $\rho^* = \max_{\|\delta\| \le \epsilon} L(\theta_0, \delta) \le \max_{\|\delta\| \le d_{\theta_0}} L(\theta_0, \delta) = 0$. Therefore $\epsilon_{\theta_0}^*(\rho^*) \le \epsilon_{\theta_0}^*(0) = d_{\theta_0}$ and $\epsilon_{\theta_1}^*(\rho^*) \le \epsilon_{\theta_1}^*(0) = d_{\theta_1}$.

For 3), $\epsilon > d_{\theta_0}$. We have $\rho^* = \max_{\|\delta\| \le \epsilon} L(\theta_0, \delta) \ge \max_{\|\delta\| \le d_{\theta_0}} L(\theta_0, \delta) = 0$. Therefore $\epsilon_{\theta_0}^*(\rho^*) \ge \epsilon_{\theta_0}^*(0) = d_{\theta_0}$ and $\epsilon_{\theta_1}^*(\rho^*) \ge \epsilon_{\theta_1}^*(0) = d_{\theta_1}$.

B More Related Works

Applicants next discuss a few related works in detail.

First-order Large Margin: Previous works (Elsayed et al., 2018; Sokolic et al., 2017; Matyasko & Chau, 2017) have attempted to use first-order approximation to estimate the input space margin. For first-order methods, the margin will be accurately estimated when the classification function is linear. MMA's margin estimation is exact when the shortest successful perturbation $\delta^*$ can be solved, which is not only satisfied by linear models, but also by a broader range of models, e.g. models that are convex w.r.t. input x. This relaxed condition could potentially enable more accurate margin estimation which improves MMA training's performance.

(Cross-)Lipschitz Regularization: Tsuzuku et al. (2018) enlarges their margin by controlling the global Lipschitz constant, which in return places a strong constraint on the model and harms its learning capabilities. Instead, the proposed method, alike adversarial training, uses adversarial attacks to estimate the margin to the decision boundary. With a strong method, the estimate is much more precise in the neighborhood around the data point, while being much more flexible due to not relying on a global Lipschitz constraint.

Hard-Margin SVM (Vapnik, 2013) in the separable case: Assuming that all the training examples are correctly classified and using the notations on general classifiers, the hard-margin SVM objective can be written as:

$$\max_\theta \left\{ \min_i d_\theta(z_i) \right\} \text{ s.t. } L_\theta(z_i) < 0, \forall i. \quad (25)$$

On the other hand, under the same "separable and correct" assumptions, MMA formulation in Eq. (3) can be written as $$\max_\theta \left\{ \sum_i d_\theta(z_i) \right\} \text{ s.t. } L_\theta(z_i) < 0, \forall i, \quad (26)$$

which is maximizing the average margin rather than the minimum margin in SVM. Note that the theorem on gradient calculation of the margin in an earlier section also applies to the SVM formulation of differentiable functions. Because of this, Applicants can also use SGD to solve the following "SVM-style" formulation:

$$\max_\theta \left\{ \max_{i \in S_\theta^+} d_\theta(z_i) - \sum_{j \in S_\theta^-} J_\theta(z_j) \right\}. \quad (27)$$

As the focus is using MMA to improve adversarial robustness which involves maximizing the average margin, Applicants delay the maximization of minimum margin to future work.

B.1 Detailed Comparison with Adversarial Training with DDN

For $l_2$ robustness, Applicants also compare to models adversarially trained on the "Decoupled Direction and Norm" (DDN) attack (Rony et al., 2018), which is concurrent to the work described in embodiments described herein. DDN attack aims to achieve successful perturbation with minimal $l_2$ norm, which makes DDN based adversarial training very similar to the MMA training. In fact, DDN attack could be a drop-in replacement for the AN-PGD attack for MMA training. Applicants performed evaluations on the downloaded[7] DDN trained models.

The DDN MNIST model is a larger ConvNet with similar structure to Applicants' LeNet5, and the CIFAR10 model is wideresnet-28-10, which is similar but larger than the wideresnet-28-4 that Applicants use.

DDN training is very similar to MMA training with a few differences. DDN training is "training on adversarial examples generated by the DDN attack". When DDN attack does not find a successful adversarial example, it returns the clean image, and the model will use it for training. In MMA, when a successful adversarial example cannot be found, it is treated as a perturbation with very large magnitude, Applicants will be ignored by the hinge loss when Applicants calculate gradient for this example. Also in DDN training, there exist a maximum norm of the perturbation. This maximum norm constraint does not exist for MMA training. When a perturbation is larger than the hinge threshold, it will be ignored by the hinge loss. There are also a few differences in training hyperparameters, which Applicants refer the reader to Rony et al. (2018) for details.

Despite these differences, in the experiments MMA training achieves similar performances under the $l_2$ cases. While DDN attack and training only focus on $l_2$ cases, Applicants also show that the MMA training framework provides significant improvements over PGD training in the $l_\infty$ case.

C Detailed Settings for Training

Applicants train LeNet5 models for the MNIST experiments and use wide residual networks (Zagoruyko & Komodakis, 2016) with depth 28 and widen factor 4 for all the CIFAR10 experiments. For all the experiments, Applicants monitor the average margin from AN-PGD on the validation set and choose the model with largest average margin from the sequence of checkpoints during training. The validation set contains first 5000 images of training set. It is only used to monitor training progress and not used in training. Here all the models are trained and tested under the same type of norm constraints, namely if trained on, then tested on $l_\infty$; if trained on $l_2$, then tested on $l_2$.

The LeNet5 is composed of 32-channel cony filter+ReLU+size 2 max pooling+64-channel cony filter+ReLU+size 2 max pooling+fc layer with 1024 units+ReLU+fc layer with 10 output classes. Applicants do not preprocess MNIST images before feeding into the model.

For training LeNet5 on all MNIST experiments, for both PGD and MMA training, Applicants use the Adam optimizer with an initial learning rate of 0.0001 and train for 100000 steps with batch size 50. In the initial experiments, Applicants tested different initial learning rate at 0.0001, 0.001, 0.01, and 0.1 and do not find noticeable differences.

Applicants use the WdeResNet-28-4 as described in Zagoruyko & Komodakis (2016) for the experiments, where 28 is the depth and 4 is the widen factor. Applicants use "per image standardization"[8] to preprocess CIFAR10 images, following Madry et al. (2017).

For training WdeResNet on CIFAR10 variants, Applicants use stochastic gradient descent with momentum 0.9 and weight decay 0.0002. Applicants train 50000 steps in total with batch size 128. The learning rate is set to 0.3 at step 0, 0.09 at step 20000, 0.03 at step 30000, and 0.009 at step 40000. This setting is the same for PGD and MMA training. In the initial experiments, Applicants tested different learning rate at 0.03, 0.1, 0.3, and 0.6, and kept using 0.3 for all the later experiments. Applicants also tested a longer training schedule, following Madry et al. (2017), where Applicants train 80000 steps with different learning rate schedules. Applicants did not observe improvement with this longer training, therefore kept using the 50000 steps training.

For models trained on MNIST, Applicants use 40-step PGD attack with the soft logit margin (SLM) loss defined in an earlier section, for CIFAR10 Applicants use 10 step-PGD, also with the SLM loss. For both MNIST and CIFAR10, the step size of PGD attack at training time is $$\frac{2.5\epsilon}{\text{number of steps}}.$$

In AN-PGD, Applicants always perform 10 step binary search after PGD, with the SLM loss. For AN-PGD, the maximum perturbation length is always 1.05 times the hinge threshold: $\epsilon_{max}=1.05d_{max}$. The initial perturbation length at the first epoch, $\epsilon_{init}$, have different values under different settings. $\epsilon_{init}=0.5$ MNIST $l_2$, $\epsilon_{init}=0.1$ for MNIST $l_\infty$, $\epsilon_{init}=0.5$ for CIFAR10 $l_2$, $\epsilon_{init}=0.05$ for CIFAR10 $l_2$. In epochs after the first, $\epsilon_{init}$ it will be set to the margin of the same example from last epoch.

Trained models: Various PGD/PGDLS models are trained with different perturbation magnitude $\epsilon$, denoted by PGD-$\epsilon$ or PGDLS-$\epsilon$. PGD-ens/PGDLS-ens represents the ensemble of PGD/PGDLS trained models with different $\epsilon$'s. The ensemble makes prediction by majority voting on label pre-dictions, and uses softmax scores as the tie breaker.

Applicants perform MMA training with different hinge thresholds $d_{max}$, also with/without the additional clean loss (see next section for details). Applicants use OMMA to MMA represent training with only $L_\theta^{MMA}$ in Eq. (7), and MMA to represent training with the combined loss in Eq. (8). When training for each $d_{max}$ value, Applicants train two models with different random seeds, which serves two purposes: 1) confirming the performance of MMA trained models are not significantly affected by random initialization; 2) to provide transfer attacks from an "identical" model. As such, MMA trained models are named as OMMA/MMA-dmax-seed. Models shown in the main body correspond to those with seed "sd0".

For MNIST-$l_\infty$, Applicants train PGD/PGDLS models with $\epsilon=0.1$, 0.2, 0.3, 0.4, 0.45, OMMA/MMA models with $d_{max}=0.45$. For MNIST-$l_2$, Applicants train PGD/PGDLS models with $\epsilon=1.0$, 2.0, 3.0, 4.0, OMMA/MMA models with $d_{max}=2.0$, 4.0, 6.0. For CIFAR10-$l_\infty$, Applicants train PGD/PGDLS models with $\epsilon=4$, 8, 12, 16, 20, 24, 28, 32, OMMA/MMA models with $d_{max}=12$, 20, 32. For CIFAR10-$l_2$, Applicants train PGD/PGDLS models with $\epsilon=0.5$, 1.0, 1.5, 2.0, 2.5, OMMA/MMA models with $d_{max}=1.0$, 2.0, 3.0.

With regard to ensemble models, for MNIST-$l_2$ PGD/PGDLS-ens, CIFAR10-$l_2$ PGD/PGDLS-ens, MNIST-$l_\infty$ PGDLS-ens, and CIFAR10-$l_\infty$ PGDLS-ens, they all use the PGD (or PGDLS) models trained at all testing (attacking) $\epsilon$'s. For CIFAR10-$l_\infty$ PGD-ens, PGD-24,28,32 are excluded for the same reason.

Detailed Settings of Attacks

For both $l_\infty$ and $l_2$ PGD attacks, Applicants use the implementation from the AdverTorch toolbox (Ding et al., 2019b). Regarding the loss function of PGD, Applicants use both the cross-entropy (CE) loss and the Carlini & Wagner (CW) loss.[9]

As previously stated, each model with have N whitebox PGD attacks on them, N/2 of them are CE-PGD attacks, and the other N/2 are CW-PGD attacks. Recall that N=50 for MNIST and N=10 for CIFAR10. At test time, all the PGD attack run 100 iterations. Applicants tune the step size parameter on a few MMA and PGD models and then fix them thereafter. The step size for MNIST-$l_\infty$ when $\epsilon=0.3$ is 0.0075, the step size for CIFAR10-$l_\infty$ when $\epsilon=8/255$ is 2/255, the step size for MNIST-$l_2$ when $\epsilon=1.0$ is 0.25, the step size for CIFAR10-$l_2$ when $\epsilon=1.0$ is 0.25. For other $\epsilon$ values, the step size are linearly scaled accordingly.

The ensemble model Applicants considered uses the majority vote for prediction, and uses softmax score as the tie breaker. So it is not obvious how to perform CW-PGD and CE-PGD directly on them. Here Applicants take 2 strategies. The first one is a naive strategy, where Applicants minimize the sum of losses of all the models used in the ensemble. Here, similar to attacking single models, Applicants CW and CE loss here and perform the same number attacks.

The second strategy is still a PGD attack with a customized loss towards attacking ensemble models. For the group of classifiers in the ensemble, at each PGD step, if less than half of the classifiers give wrong classification, when Applicants sum up the CW losses from correct classifiers as the loss for PGD attacking. If more than half of the classifier give wrong classification, then Applicants find the wrong prediction that appeared most frequently among classifiers, and denote it as label0, with its corresponding logit, logit0. For each classifier, Applicants then find the largest logit that is not logit0, denoted as logit1.

The loss Applicants maximize, in the PGD attack, is the sum of "logit1–logit0" from each classifier. Using this strategy, Applicants perform additional (compared to attacking single models) whitebox PGD attacks on ensemble models. For MNIST, Applicants perform 50 repeated attacks, for CIFAR10 Applicants perform 10. These are also 100-step PGD attacks.

For the SPSA attack (Uesato et al., 2018), Applicants run the attack for 100 iterations with perturbation size 0.01 (for gradient estimation), Adam learning rate 0.01, stopping threshold −5.0 and 2048 samples for each gradient estimate. For CIFAR10-$l_\infty$, Applicants use $\epsilon=8/255$. For MNIST-$l_\infty$, Applicants used $\epsilon=0.3$.

Effects of Adding Clean Loss in Addition to the MMA Loss

The approach further examines the effectiveness of adding a clean loss term to the MMA loss. Applicants represent MMA trained models with the MMA loss in Eq. (7) as MMA-$d_{max}$. Earlier in this description, MMAC-$d_{max}$ models were introduced to resolve MMA-$d_{max}$ model's problem of having flat input space loss land-scape and showed its effectiveness qualitatively. Here, it is demonstrated the quantitative benefit of adding the clean loss.

It is observed that models trained with the MMA loss in Eq. (7) have certain degrees of TransferGaps. The term TransferGaps represents the difference between robust accuracy under "combined (white-box+transfer) attacks" and under "only whitebox PGD attacks". In other words, it is the additional attack success rate that transfer attacks bring. For example, OMMA-32 achieves 53.70% under whitebox PGD attacks, but achieves a lower robust accuracy at 46.31% under combined (white-box+transfer) attacks, therefore it has a TransferGap of 7.39% (See Appendix for full results). After adding the clean loss, MMA-32 reduces its Transfer-Gap at $\epsilon=8/255$ to 3.02%. This corresponds to an observation earlier in this description that adding clean loss makes the loss landscape more tilted, such that whitebox PGD attacks can succeed more easily.

Recall that MMA trained models are robust to gradient free attacks, as described earlier. Therefore, robustness of MMA trained models and the TransferGaps are likely not due to gradient masking.

Applicants also note that TransferGaps for both MNIST-$l_\infty$ and $l_2$ cases are almost zero for the MMA trained models, indicating that TransferGaps, observed on CIFAR10 cases, are not solely due to the MMA algorithm, data distributions (MNIST vs CIFAR10) also play an important role.

Another interesting observation is that, for MMA trained models trained on CIFAR10, adding additional clean loss results in a decrease in clean accuracy and an increase in the average robust accuracy, e.g., OMMA-32 has ClnAcc 86.11%, and AvgRobAcc 28.36%, whereas MMA-32 has ClnAcc 84.36%, and AvgRobAcc 29.39%.

The fact that "adding additional clean loss results in a model with lower accuracy and more robustness" seems counter-intuitive. However, it actually confirms the motivation of the approaches described herein and reasoning of the additional clean loss: it makes the input space loss landscape steeper, which leads to stronger adversaries at training time, which in turn poses more emphasis on "robustness training", instead of clean accuracy training.

Full Results and Tables

Empirical results are presented in Table 2 to 13. Specifically, the results show model performances under combined (whitebox+transfer) attacks in Tables 2 to 5. This is a proxy for true robustness measure. As noted below, model performances are shown under only whitebox PGD attacks in Tables 6 to 9. As noted below, this description shows TransferGaps in Tables 10 to 13.

In these tables, PGD-Madry et al. models are the "secret" models downloaded from https://github.com/MadryLab/mnist_challenge and https://github.com/MadryLab/cifar10_challenge/. DDN-Rony et al. models are downloaded from https://github.com/jeromerony/fast_adversarial/.

For MNIST PGD-Madry et al. models, the whitebox attacks brings the robust accuracy at $\in$=0.3 down to 89.79%, which is at the same level with the reported 89.62% on the website, also with 50 repeated random initialized PGD attacks. For CIFAR10 PGD-Madry et al. models, the whitebox attacks brings the robust accuracy at $\in$=8/255 down to 44.70%, which is stronger than the reported 45.21% on the website, with 10 repeated random initialized 20-step PGD attacks. As the PGD attacks are 100-step, this is not surprising.

As mentioned previously, DDN training can be seen as a specific instantiation of the MMA training approach, and the DDN-Rony et al. models indeed performs very similar to MMA trained models when $d_{max}$ is set relatively low. Therefore, Applicants do not discuss the performance of DDN-Rony et al. separately.

As described herein, different phenomena are noted under the case of CIFAR10-$l_\infty$.

For CIFAR10-$l_2$, the approach shows very similar patterns in Tables 5, 9 and 13. These include:

MMA training is fairly stable to $d_{max}$, and achieves good robustness-accuracy trade-offs. On the other hand, to achieve good AvgRobAcc, PGD/PGDLS trained models need to have large sacrifices on clean accuracies.

Adding additional clean loss increases the robustness of the model, reduce TransferGap, at a cost of slightly reducing clean accuracy.

As a simpler datasets, different adversarial training algorithms, including MMA training, have very different behaviors on MNIST as compared to CIFAR10.

MNIST-$l_\infty$ is first considered. Similar to CIFAR10 cases, PGD training is incompetent on large c's, e.g. PGD-0.4 has significant drop on clean accuracy (to 96.64%) and PGD-0.45 fails to train. PGDLS training, on the other hand, is able to handle large $\in$'s training very well on MNIST-$l_\infty$, and MMA training does not bring extra benefit on top of PGDLS.

It is suspected that this is due to the "easiness" of this specific task on MNIST, where finding proper $\in$ for each individual example is not necessary, and a global scheduling of t is enough. Applicants note that this phenomenon confirms the understanding of adversarial training from the margin maximization perspective as described earlier.

Under the case of MNIST-$l_2$, it is noticed that MMA training almost does not need to sacrifice clean accuracy in order to get higher robustness. All the models with $d_{max} \geq 4.0$ behaves similarly w.r.t. both clean and robust accuracies. Achieving 40% robust accuracy at $\in$=3.0 seems to be the robustness limit of MMA trained models. On the other hand, PGD/PGDLS models are able to get higher robustness at $\in$=3.0 with robust accuracy of 44.5%, although with some sacrifices to clean accuracy. This is similar to what Applicants have observed in the case of CIFAR10.

It is noticed that on both MNIST-$l_\infty$ and MNIST-$l_2$, unlike CIFAR10 cases, PGD(LS)-ens model performs poorly in terms of robustness. This is likely due to that PGD trained models on MNIST usually have a very sharp robustness drop when the $\in$ used for attacking is larger than the $\in$ used for training.

Another significant differences between MNIST cases and CIFAR10 cases is that TransferGaps are very small for OMMA/MMA trained models on MNIST cases. This again is likely due to that MNIST is an "easier" dataset. It also indicates that the TransferGap is not purely due to the MMA training algorithm, it is also largely affected by the property of datasets. Although previous literature (Ding et al., 2019a; Zhang et al., 2019c) also discusses related topics on the difference between MNIST and CIFAR10 w.r.t. adversarial robustness, they do not directly explain the observed phenomena here.

TABLE 2

Accuracies of models trained on MNIST with $\ell\infty$-norm constrained attacks. These robust accuracies are calculated under both combined (whitebox + transfer) PGD attacks. sd0 and sd1 indicate 2 different random seeds

| MNIST Model | Cln Acc | AvgAcc | AvgRobAcc | RobAcc under different $\epsilon$, combined (whitebox + transfer) attacks | | | |
|---|---|---|---|---|---|---|---|
| | | | | 0.1 | 0.2 | 0.3 | 0.4 |
| STD | 99.21 | 35.02 | 18.97 | 73.58 | 2.31 | 0.00 | 0.00 |
| PGD-0.1 | 99.40 | 48.85 | 36.22 | 96.35 | 48.51 | 0.01 | 0.00 |
| PGD-0.2 | 99.22 | 57.92 | 47.60 | 97.44 | 92.12 | 0.84 | 0.00 |
| PGD-0.3 | 98.96 | 76.97 | 71.47 | 97.90 | 96.00 | 91.76 | 0.22 |

TABLE 2-continued

Accuracies of models trained on MNIST with $\ell\infty$-norm constrained attacks.
These robust accuracies are calculated under both combined (whitebox + transfer) PGD
attacks. sd0 and sd1 indicate 2 different random seeds

| MNIST | | | | RobAcc under different $\epsilon$, combined (whitebox + transfer) attacks | | | |
|---|---|---|---|---|---|---|---|
| Model | Cln Acc | AvgAcc | AvgRobAcc | 0.1 | 0.2 | 0.3 | 0.4 |
| PGD-0.4 | 96.64 | 89.37 | 87.55 | 94.69 | 91.57 | 86.49 | 77.47 |
| PGD-0.45 | 11.35 | 11.35 | 11.35 | 11.35 | 11.35 | 11.35 | 11.35 |
| PGDLS-0.1 | 99.43 | 46.85 | 33.71 | 95.41 | 39.42 | 0.00 | 0.00 |
| PGDLS-0.2 | 99.38 | 58.36 | 48.10 | 97.38 | 89.49 | 5.53 | 0.00 |
| PGDLS-0.3 | 99.10 | 76.56 | 70.93 | 97.97 | 95.66 | 90.09 | 0.00 |
| PGDLS-0.4 | 98.98 | 93.07 | 91.59 | 98.12 | 96.29 | 93.01 | 78.96 |
| PGDLS-0.45 | 98.89 | 94.74 | 93.70 | 97.91 | 96.34 | 93.29 | 87.28 |
| MMA-0.45-sd0 | 98.95 | 94.13 | 92.93 | 97.87 | 96.01 | 92.59 | 85.24 |
| MMA-0.45-sd1 | 98.90 | 94.04 | 92.82 | 97.82 | 96.00 | 92.63 | 84.83 |
| OMMA-0.45-sd0 | 98.98 | 93.94 | 92.68 | 97.90 | 96.05 | 92.35 | 84.41 |
| OMMA-0.45-sd1 | 99.02 | 94.03 | 92.78 | 97.93 | 96.02 | 92.44 | 84.73 |
| PGD-ens | 99.28 | 57.98 | 47.65 | 97.25 | 89.99 | 3.37 | 0.00 |
| PGDLS-ens | 99.34 | 59.04 | 48.96 | 97.48 | 90.40 | 7.96 | 0.00 |
| PGD-Madry et al. | 98.53 | 76.04 | 70.41 | 97.08 | 94.83 | 89.64 | 0.11 |

TABLE 3

Accuracies of models trained on CIFAR10 with $\ell\infty$-norm constrained attacks.
These robust accuracies are calculated under both combined (whitebox + transfer) PGD
attacks. sd0 and sd1 indicate 2 different random seeds

| CIFAR10 | | | | RobAcc under different $\epsilon$, combined (whitebox + transfer) attacks | | | | | | | |
|---|---|---|---|---|---|---|---|---|---|---|---|
| Model | Cln Acc | AvgAcc | AvgRobAcc | 4 | 8 | 12 | 16 | 20 | 24 | 28 | 32 |
| STD | 94.92 | 10.55 | 0.00 | 0.00 | 0.00 | 0.00 | 0.00 | 0.00 | 0.00 | 0.00 | 0.00 |
| PGD-4 | 90.44 | 22.95 | 14.51 | 66.31 | 33.49 | 12.22 | 3.01 | 0.75 | 0.24 | 0.06 | 0.01 |
| PGD-8 | 85.14 | 27.27 | 20.03 | 67.73 | 46.47 | 26.63 | 12.33 | 4.69 | 1.56 | 0.62 | 0.22 |
| PGD-12 | 77.86 | 28.51 | 22.34 | 63.88 | 48.72 | 32.13 | 18.67 | 9.48 | 4.05 | 1.56 | 0.70 |
| PGD-16 | 68.86 | 28.28 | 23.21 | 57.99 | 46.09 | 33.64 | 22.73 | 13.37 | 7.01 | 3.32 | 1.54 |
| PGD-20 | 61.06 | 27.34 | 23.12 | 51.72 | 43.13 | 33.73 | 24.55 | 15.66 | 9.05 | 4.74 | 2.42 |
| PGD-24 | 10.90 | 9.95 | 9.83 | 10.60 | 10.34 | 10.11 | 10.00 | 9.89 | 9.69 | 9.34 | 8.68 |
| PGD-28 | 10.00 | 10.00 | 10.00 | 10.00 | 10.00 | 10.00 | 10.00 | 10.00 | 10.00 | 10.00 | 10.00 |
| PGD-32 | 10.00 | 10.00 | 10.00 | 10.00 | 10.00 | 10.00 | 10.00 | 10.00 | 10.00 | 10.00 | 10.00 |
| PGDLS-4 | 89.87 | 22.39 | 13.96 | 63.98 | 31.92 | 11.47 | 3.32 | 0.68 | 0.16 | 0.08 | 0.05 |
| PGDLS-8 | 85.63 | 27.20 | 19.90 | 67.96 | 46.19 | 26.19 | 12.22 | 4.51 | 1.48 | 0.44 | 0.21 |
| PGDLS-12 | 79.39 | 28.45 | 22.08 | 64.62 | 48.08 | 31.34 | 17.86 | 8.69 | 3.95 | 1.48 | 0.65 |
| PGDLS-16 | 70.68 | 28.44 | 23.16 | 59.43 | 47.00 | 33.64 | 21.72 | 12.66 | 6.54 | 2.98 | 1.31 |
| PGDLS-20 | 65.81 | 27.60 | 22.83 | 54.96 | 44.39 | 33.13 | 22.53 | 13.80 | 7.79 | 4.08 | 1.95 |
| PGDLS-24 | 58.36 | 26.53 | 22.55 | 49.05 | 41.13 | 32.10 | 23.76 | 15.70 | 9.66 | 5.86 | 3.11 |
| PGDLS- 28 | 50.07 | 24.20 | 20.97 | 40.71 | 34.61 | 29.00 | 22.77 | 16.83 | 11.49 | 7.62 | 4.73 |
| PGDLS-32 | 38.80 | 19.88 | 17.52 | 26.16 | 24.96 | 23.22 | 19.96 | 16.22 | 12.92 | 9.82 | 6.88 |
| MMA-12-sd0 | 88.59 | 26.87 | 19.15 | 67.96 | 43.42 | 24.07 | 11.45 | 4.27 | 1.43 | 0.45 | 0.16 |
| MMA-12-sd1 | 88.91 | 26.23 | 18.39 | 67.08 | 42.97 | 22.57 | 9.76 | 3.37 | 0.92 | 0.35 | 0.12 |
| MMA-20-sd0 | 86.56 | 28.86 | 21.65 | 66.92 | 46.89 | 29.83 | 16.55 | 8.14 | 3.25 | 1.17 | 0.43 |
| MMA-20-sd1 | 85.87 | 28.72 | 21.57 | 65.44 | 46.11 | 29.96 | 17.30 | 8.27 | 3.60 | 1.33 | 0.56 |
| MMA-32-sd0 | 84.36 | 29.39 | 22.51 | 64.82 | 47.18 | 31.49 | 18.91 | 10.16 | 4.77 | 1.97 | 0.81 |
| MMA-32-sd1 | 84.76 | 29.08 | 22.11 | 64.41 | 45.95 | 30.36 | 18.24 | 9.85 | 4.99 | 2.20 | 0.92 |
| OMMA-12-sd0 | 88.52 | 26.31 | 18.54 | 66.96 | 42.58 | 23.22 | 10.29 | 3.43 | 1.24 | 0.46 | 0.13 |
| OMMA-12-sd1 | 87.82 | 26.24 | 18.54 | 66.23 | 43.10 | 23.57 | 10.32 | 3.56 | 1.04 | 0.38 | 0.14 |
| OMMA-20-sd0 | 87.06 | 27.41 | 19.95 | 66.54 | 45.39 | 26.29 | 13.09 | 5.32 | 1.96 | 0.79 | 0.23 |
| OMMA-20-sd1 | 87.44 | 27.77 | 20.31 | 66.28 | 45.60 | 27.33 | 14.00 | 6.04 | 2.23 | 0.74 | 0.25 |
| OMMA-32-sd0 | 86.11 | 28.36 | 21.14 | 66.02 | 46.31 | 15.98 | 7.44 | 2.94 | 1.12 | 0.45 |
| OMMA-32-sd2 | 86.36 | 28.75 | 21.55 | 66.86 | 47.12 | 29.63 | 16.09 | 7.56 | 3.38 | 1.31 | 0.47 |
| PGD-ens | 87.38 | 28.10 | 20.69 | 64.59 | 46.95 | 28.88 | 15.10 | 6.35 | 2.35 | 0.91 | 0.39 |
| PGDLS-ens | 76.73 | 29.52 | 23.62 | 60.52 | 48.21 | 35.06 | 22.14 | 12.28 | 6.17 | 3.14 | 1.43 |
| PGD-Madry et al. | 87.14 | 27.22 | 19.73 | 68.01 | 44.68 | 25.03 | 12.15 | 5.18 | 1.95 | 0.64 | 0.23 |

TABLE 4

Accuracies of models trained on MNIST with ℓ 2-norm constrained attacks. These robust accuracies are calculated under both combined (whitebox + transfer) PGD attacks. sd0 and sd1 indicate 2 different random seeds

| MNIST Model | Cln Acc | AvgAcc | AvgRobAcc | RobAcc under different $\epsilon$, combined (whitebox + transfer) attacks |  |  |  |
|---|---|---|---|---|---|---|---|
| | | | | 1.0 | 2.0 | 3.0 | 4.0 |
| STD | 99.21 | 41.84 | 27.49 | 86.61 | 22.78 | 0.59 | 0.00 |
| PGD-1.0 | 99.30 | 48.78 | 36.15 | 95.06 | 46.84 | 2.71 | 0.00 |
| PGD-2.0 | 98.76 | 56.14 | 45.48 | 94.82 | 72.70 | 14.20 | 0.21 |
| PGD-3.0 | 97.14 | 60.36 | 51.17 | 90.01 | 71.03 | 38.93 | 4.71 |
| PGD-4.0 | 93.41 | 59.52 | 51.05 | 82.34 | 66.25 | 43.44 | 12.18 |
| PGDLS-1.0 | 99.39 | 47.61 | 34.66 | 94.33 | 42.44 | 1.89 | 0.00 |
| PGDLS-2.0 | 99.09 | 54.73 | 43.64 | 95.22 | 69.33 | 10.01 | 0.01 |
| PGDLS-3.0 | 97.52 | 60.13 | 50.78 | 90.86 | 71.91 | 36.80 | 3.56 |
| PGDLS-4.0 | 93.68 | 59.49 | 50.95 | 82.67 | 67.21 | 43.68 | 10.23 |
| MMA-2.0-sd0 | 99.27 | 53.85 | 42.50 | 95.59 | 68.37 | 6.03 | 0.01 |
| MMA-2.0-sd1 | 99.28 | 54.34 | 43.10 | 95.78 | 68.18 | 8.45 | 0.00 |
| MMA-4.0-sd0 | 98.71 | 62.25 | 53.13 | 93.93 | 74.01 | 39.34 | 5.24 |
| MMA-4.0-sd1 | 98.81 | 61.88 | 52.64 | 93.98 | 73.70 | 37.78 | 5.11 |
| MMA-6.0-sd0 | 98.32 | 62.32 | 53.31 | 93.16 | 72.63 | 38.78 | 8.69 |
| MMA-6.0-sd1 | 98.50 | 62.49 | 53.48 | 93.48 | 73.50 | 38.63 | 8.32 |
| OMMA-2.0-sd0 | 99.26 | 54.01 | 42.69 | 95.94 | 67.78 | 7.03 | 0.03 |
| OMMA-2.0-sd1 | 99.21 | 54.04 | 42.74 | 95.72 | 68.83 | 6.42 | 0.00 |
| OMMA-4.0-sd0 | 98.61 | 62.17 | 53.06 | 94.06 | 73.51 | 39.66 | 5.02 |
| OMMA-4.0-sd1 | 98.61 | 62.01 | 52.86 | 93.72 | 73.18 | 38.98 | 5.58 |
| OMMA-6.0-sd0 | 98.16 | 62.45 | 53.52 | 92.90 | 72.59 | 39.68 | 8.93 |
| OMMA-6.0-sd1 | 98.45 | 62.24 | 53.19 | 93.37 | 72.93 | 37.63 | 8.83 |
| PGD-ens | 98.87 | 56.13 | 45.44 | 94.37 | 70.16 | 16.79 | 0.46 |
| PGDLS-ens | 99.14 | 54.71 | 43.60 | 94.52 | 67.45 | 12.33 | 0.11 |
| DDN-Rony et al. | 99.02 | 59.93 | 50.15 | 95.65 | 77.65 | 25.44 | 1.87 |

TABLE 5

Accuracies of models trained on CIFAR10 with ℓ 2-norm constrained attacks. These robust accuracies are calculated under both combined (whitebox + transfer) PGD attacks. sd0 and sd1 indicate 2 different random seeds

| CIFAR10 Model | Cln Acc | AvgAcc | AvgRobAcc | RobAcc under different $\epsilon$, combined (whitebox + transfer) attacks |  |  |  |  |
|---|---|---|---|---|---|---|---|---|
| | | | | 0.5 | 1.0 | 1.5 | 2.0 | 2.5 |
| STD | 94.92 | 15.82 | 0.00 | 0.01 | 0.00 | 0.00 | 0.00 | 0.00 |
| PGD-0.5 | 89.10 | 33.63 | 22.53 | 65.61 | 33.21 | 11.25 | 2.31 | 0.28 |
| PGD-1.0 | 83.25 | 39.70 | 30.99 | 66.69 | 46.08 | 26.05 | 11.92 | 4.21 |
| PGD-1.5 | 75.80 | 41.75 | 34.94 | 62.70 | 48.32 | 33.72 | 20.07 | 9.91 |
| PGD-2.0 | 71.05 | 41.78 | 35.92 | 59.76 | 47.85 | 35.29 | 23.15 | 13.56 |
| PGD-2.5 | 65.17 | 40.93 | 36.08 | 55.60 | 45.76 | 35.76 | 26.00 | 17.27 |
| PGDLS-0.5 | 89.43 | 33.41 | 22.21 | 65.49 | 32.40 | 10.73 | 2.09 | 0.33 |
| PGDLS-1.0 | 83.62 | 39.46 | 30.63 | 67.29 | 45.30 | 25.43 | 11.08 | 4.03 |
| PGDLS-1.5 | 77.03 | 41.74 | 34.68 | 63.76 | 48.43 | 33.04 | 19.00 | 9.17 |
| PGDLS-2.0 | 72.14 | 42.15 | 36.16 | 60.90 | 48.22 | 35.21 | 23.19 | 13.26 |
| PGDLS-2.5 | 66.21 | 41.21 | 36.21 | 56.45 | 46.66 | 35.93 | 25.51 | 16.51 |
| MMA-1.0-sd0 | 88.02 | 35.55 | 25.06 | 66.18 | 37.75 | 15.58 | 4.74 | 1.03 |
| MMA-1.0-sd1 | 88.92 | 35.69 | 25.05 | 66.81 | 37.16 | 15.71 | 4.49 | 1.07 |
| MMA-2.0-sd0 | 84.22 | 40.48 | 31.73 | 65.91 | 45.66 | 27.40 | 14.18 | 5.50 |
| MMA-2.0-sd1 | 85.16 | 39.81 | 30.75 | 65.36 | 44.44 | 26.42 | 12.63 | 4.88 |
| MMA-3.0-sd0 | 82.11 | 41.59 | 33.49 | 64.22 | 46.41 | 30.23 | 17.85 | 8.73 |
| MMA-3.0-sd1 | 81.79 | 41.16 | 33.03 | 63.58 | 45.59 | 29.77 | 17.52 | 8.69 |
| OMMA-1.0-sd0 | 89.02 | 35.18 | 24.41 | 65.43 | 36.89 | 14.77 | 4.18 | 0.79 |
| OMMA-1.0-sd1 | 89.97 | 35.20 | 24.25 | 66.16 | 36.10 | 14.04 | 4.17 | 0.79 |
| OMMA-2.0-sd0 | 86.06 | 39.32 | 29.97 | 65.28 | 43.82 | 24.85 | 11.53 | 4.36 |
| OMMA-2.0-sd1 | 85.04 | 39.68 | 30.61 | 64.69 | 44.36 | 25.89 | 12.92 | 5.19 |
| OMMA-3.0-sd0 | 83.86 | 40.62 | 31.97 | 64.14 | 45.61 | 28.12 | 15.00 | 6.97 |
| OMMA-3.0-sd1 | 84.00 | 40.66 | 32.00 | 63.81 | 45.22 | 28.47 | 15.41 | 7.08 |
| PGD-ens | 85.63 | 40.39 | 31.34 | 62.98 | 45.87 | 27.91 | 14.23 | 5.72 |
| PGDLS-ens | 86.11 | 40.38 | 31.23 | 63.74 | 46.21 | 27.58 | 13.32 | 5.31 |
| DDN-Rony et al. | 89.05 | 36.23 | 25.67 | 66.51 | 39.02 | 16.60 | 5.02 | 1.20 |

TABLE 6

Accuracies of models trained on MNIST with $\ell\infty$-norm constrained attacks.
These robust accuracies are calculated under only whitebox PGD
attacks. sd0 and sd1 indicate 2 different random seeds

| MNIST | | | | RobAcc under different $\epsilon$, whitebox only | | | |
|---|---|---|---|---|---|---|---|
| Model | Cln Acc | AvgAcc | AvgRobAcc | 1.0 | 2.0 | 3.0 | 4.0 |
| STD | 99.21 | 35.02 | 18.97 | 73.59 | 2.31 | 0.00 | 0.00 |
| PGD-0.1 | 99.40 | 48.91 | 36.29 | 96.35 | 48.71 | 0.09 | 0.00 |
| PGD-0.2 | 99.22 | 57.93 | 47.60 | 97.44 | 92.12 | 0.86 | 0.00 |
| PGD-0.3 | 98.96 | 77.35 | 71.95 | 97.90 | 96.00 | 91.86 | 2.03 |
| PCD-0.4 | 96.64 | 91.51 | 90.22 | 94.79 | 92.27 | 88.82 | 85.02 |
| PGD-0.45 | 11.35 | 11.35 | 11.35 | 11.35 | 11.35 | 11.35 | 11.35 |
| PGDLS-0.1 | 99.43 | 46.94 | 33.82 | 95.41 | 39.85 | 0.02 | 0.00 |
| PGDLS-0.2 | 99.38 | 58.44 | 48.20 | 97.38 | 89.49 | 5.95 | 0.00 |
| PGDLS-0.3 | 99.10 | 76.85 | 71.29 | 97.98 | 95.66 | 90.63 | 0.90 |
| PGDLS-0.4 | 98.98 | 95.49 | 94.61 | 98.13 | 96.42 | 94.02 | 89.89 |
| PGDLS-0.45 | 98.89 | 95.72 | 94.92 | 97.91 | 96.64 | 94.54 | 90.60 |
| MMA-0.45-d0 | 98.95 | 94.97 | 93.97 | 97.89 | 96.26 | 93.57 | 88.16 |
| MMA-0.45-sd1 | 98.90 | 94.83 | 93.81 | 97.83 | 96.18 | 93.34 | 87.91 |
| OMMA-0.45-sd0 | 98.98 | 95.06 | 94.07 | 97.91 | 96.22 | 93.63 | 88.54 |
| OMMA-0.45-sd1 | 99.02 | 95.45 | 94.55 | 97.96 | 96.30 | 94.16 | 89.80 |
| PGD-ens | 99.28 | 58.02 | 47.70 | 97.31 | 90.11 | 3.38 | 0.00 |
| PGDLS-ens | 99.34 | 59.09 | 49.02 | 97.50 | 90.56 | 8.03 | 0.00 |
| PGD-Madry et al. | 98.53 | 76.08 | 70.47 | 97.08 | 94.87 | 89.79 | 0.13 |

TABLE 7

Accuracies of models trained on CIFAR10 with $\ell\infty$-norm constrained attacks.
These robust accuracies are calculated under only whitebox PGD
attacks. sd0 and sd1 indicate 2 different random seeds

| CIFAR10 | | | | RobAcc under different $\epsilon$, whitebox only | | | | | | | |
|---|---|---|---|---|---|---|---|---|---|---|---|
| Model | Cln Acc | AvgAcc | AvgRobAcc | 4 | 8 | 12 | 16 | 20 | 24 | 28 | 32 |
| STD | 94.92 | 10.55 | 0.00 | 0.00 | 0.00 | 000 | 0.00 | 0.00 | 0.00 | 0.00 | 0.00 |
| PGD-4 | 90.44 | 22.97 | 14.53 | 66.33 | 33.51 | 12.27 | 3.03 | 0.77 | 0.25 | 0.07 | 0.02 |
| PGD-8 | 85.14 | 27.28 | 20.05 | 67.73 | 46.49 | 26.69 | 12.37 | 4.71 | 1.58 | 0.62 | 0.23 |
| PGD-12 | 77.86 | 28.55 | 22.39 | 63.90 | 48.25 | 32.19 | 18.78 | 9.58 | 4.12 | 1.59 | 0.72 |
| PGD-16 | 68.86 | 28.42 | 23.36 | 58.07 | 46.17 | 33.84 | 22.99 | 13.65 | 7.19 | 3.43 | 1.57 |
| PGD-20 | 61.06 | 27.73 | 23.57 | 51.75 | 43.32 | 34.22 | 25.19 | 16.36 | 9.65 | 5.33 | 2.73 |
| PGD-24 | 10.90 | 9.98 | 9.86 | 10.60 | 10.34 | 10.11 | 10.01 | 9.91 | 9.74 | 9.39 | 8.81 |
| PGD-28 | 10.00 | 10.00 | 10.00 | 10.00 | 10.00 | 10.00 | 10.00 | 10.00 | 10.00 | 10.00 | 10.00 |
| PGD-32 | 10.00 | 10.00 | 10.00 | 10.00 | 10.00 | 10.00 | 10.00 | 10.00 | 10.00 | 10.00 | 10.00 |
| PGDLS-4 | 89.87 | 22.43 | 14.00 | 63.98 | 31.93 | 11.57 | 3.43 | 0.77 | 0.18 | 0.09 | 0.05 |
| PGDLS-8 | 85.63 | 27.22 | 19.92 | 67.96 | 46.19 | 26.24 | 12.28 | 4.54 | 1.52 | 0.45 | 0.21 |
| PGDLS-12 | 79.39 | 28.50 | 22.14 | 64.63 | 48.10 | 31.40 | 17.99 | 8.80 | 4.01 | 1.51 | 0.67 |
| PGDLS-16 | 70.68 | 28.53 | 23.26 | 59.44 | 47.04 | 33.78 | 21.94 | 12.79 | 6.66 | 3.07 | 1.34 |
| PGDLS-20 | 65.81 | 27.82 | 23.07 | 54.96 | 44.46 | 33.41 | 22.94 | 14.27 | 8.07 | 4.37 | 2.08 |
| PGDLS-24 | 58.36 | 27.25 | 23.36 | 49.09 | 41.47 | 32.90 | 24.84 | 16.93 | 10.88 | 7.04 | 3.76 |
| PGDLS-28 | 50.07 | 25.68 | 22.63 | 40.77 | 35.07 | 30.18 | 24.76 | 19.40 | 14.22 | 9.96 | 6.65 |
| PGDLS-32 | 38.80 | 22.79 | 20.79 | 26.19 | 25.34 | 24.72 | 23.21 | 20.98 | 18.13 | 15.12 | 12.66 |
| MMA-12-sd0 | 88.59 | 27.54 | 19.91 | 67.99 | 43.62 | 24.79 | 12.74 | 5.85 | 2.68 | 1.09 | 0.51 |
| MMA-12-sd1 | 88.91 | 26.68 | 18.90 | 67.17 | 43.63 | 23.62 | 10.80 | 4.07 | 1.20 | 0.50 | 0.18 |
| MMA-20-sd0 | 86.56 | 31.72 | 24.87 | 67.07 | 48.74 | 34.06 | 21.97 | 13.37 | 7.56 | 4.06 | 2.11 |
| MMA-20-sd1 | 85.87 | 33.07 | 26.47 | 65.63 | 48.11 | 34.70 | 24.73 | 16.45 | 10.97 | 7.00 | 4.14 |
| MMA-32-sd0 | 84.36 | 36.58 | 30.60 | 65.25 | 50.20 | 38.78 | 30.01 | 22.57 | 16.66 | 12.30 | 9.07 |
| MMA-32-sd1 | 84.76 | 33.49 | 27.08 | 64.66 | 48.23 | 35.65 | 25.74 | 17.86 | 11.86 | 7.79 | 4.88 |
| OMMA-12-sd0 | 88.52 | 29.34 | 21.94 | 67.49 | 46.11 | 29.22 | 16.65 | 8.62 | 4.36 | 2.05 | 1.03 |
| OMMA-12-sd1 | 87.82 | 30.30 | 23.11 | 66.77 | 46.77 | 31.19 | 19.40 | 10.93 | 5.72 | 2.84 | 1.29 |
| OMMA-20-sd0 | 87.06 | 36.00 | 29.61 | 68.00 | 52.98 | 40.13 | 28.92 | 19.78 | 13.04 | 8.47 | 5.60 |
| OMMA-20-sd1 | 87.44 | 34.49 | 27.87 | 67.40 | 51.55 | 37.94 | 26.48 | 17.76 | 11.31 | 6.74 | 3.76 |
| OMMA-32-sd0 | 86.11 | 38.87 | 32.97 | 67.57 | 53.70 | 42.56 | 32.88 | 24.91 | 18.57 | 13.79 | 9.76 |
| OMMA-32-sd1 | 86.36 | 39.13 | 33.23 | 68.80 | 56.02 | 44.62 | 33.97 | 24.71 | 17.37 | 11.94 | 8.39 |
| PGD-ens | 87.38 | 28.83 | 21.51 | 64.85 | 47.67 | 30.37 | 16.63 | 7.79 | 3.01 | 1.25 | 0.52 |
| PGDLS-ens | 76.73 | 30.60 | 24.83 | 61.16 | 49.46 | 36.63 | 23.90 | 13.92 | 7.62 | 3.91 | 2.05 |
| PGD-Madry et al. | 87.14 | 27.36 | 19.89 | 68.01 | 44.70 | 25.15 | 12.52 | 5.50 | 2.25 | 0.73 | 0.27 |

TABLE 8

Accuracies of models trained on MNIST with $\ell$2-norm constrained attacks.
These robust accuracies are calculated under only whitebox PGD
attacks. sd0 and sd1 indicate 2 different random seeds

| MNIST | | | | RobAcc under different $\epsilon$, whitebox only | | | |
|---|---|---|---|---|---|---|---|
| Model | Cln Acc | AvgAcc | AvgRobAcc | 1.0 | 2.0 | 3.0 | 4.0 |
| STD | 99.21 | 41.90 | 27.57 | 86.61 | 23.02 | 0.64 | 0.00 |
| PGD-1.0 | 99.30 | 49.55 | 37.11 | 95.07 | 48.99 | 4.36 | 0.01 |
| PGD-2.0 | 98.76 | 56.38 | 45.79 | 94.82 | 72.94 | 15.08 | 0.31 |
| PGD-3.0 | 97.14 | 60.94 | 51.89 | 90.02 | 71.53 | 40.72 | 5.28 |
| PGD-4.0 | 93.41 | 59.93 | 51.56 | 82.41 | 66.49 | 44.36 | 12.99 |
| PGDLS-1.0 | 99.39 | 48.17 | 35.36 | 94.35 | 43.96 | 2.97 | 0.16 |
| PGDLS-2.0 | 99.09 | 55.17 | 44.19 | 95.22 | 69.73 | 11.80 | 0.03 |
| PGDLS-3.0 | 97.52 | 60.60 | 51.37 | 90.87 | 72.24 | 38.39 | 3.99 |
| PGDLS-4.0 | 93.68 | 59.89 | 51.44 | 82.73 | 67.37 | 44.59 | 11.07 |
| MMA-2.0-sd0 | 99.27 | 53.97 | 42.64 | 95.59 | 68.66 | 6.32 | 0.01 |
| MMA-2.0-sd1 | 99.28 | 54.46 | 43.26 | 95.79 | 68.45 | 8.79 | 0.01 |
| MMA-4.0-sd0 | 98.71 | 62.51 | 53.45 | 93.93 | 74.06 | 40.02 | 5.81 |
| MMA-4.0-sd1 | 98.81 | 62.22 | 53.07 | 93.98 | 73.81 | 38.76 | 5.75 |
| MMA-6.0-sd0 | 98.32 | 62.60 | 53.67 | 93.16 | 72.72 | 39.47 | 9.35 |
| MMA-6.0-sd1 | 98.50 | 62.73 | 53.79 | 93.48 | 73.57 | 39.25 | 8.86 |
| OMMA-2.0-sd0 | 99.26 | 54.12 | 42.83 | 95.94 | 68.08 | 7.27 | 0.03 |
| OMMA-2.0-sd1 | 99.21 | 54.12 | 42.85 | 95.72 | 68.96 | 6.72 | 0.00 |
| OMMA-4.0-sd0 | 98.61 | 62.44 | 53.40 | 94.06 | 73.60 | 40.29 | 5.66 |
| OMMA-4.0-sd1 | 98.61 | 62.22 | 53.13 | 93.72 | 73.23 | 39.53 | 6.03 |
| OMMA-6.0-sd0 | 98.16 | 62.67 | 53.79 | 92.90 | 72.71 | 40.28 | 9.29 |
| OMMA-6.0-sd1 | 98.45 | 62.52 | 53.54 | 93.37 | 73.02 | 38.49 | 9.28 |
| PGD-ens | 98.87 | 56.57 | 45.99 | 94.73 | 70.98 | 17.76 | 0.51 |
| PGDLS-ens | 99.14 | 54.98 | 43.93 | 94.86 | 68.08 | 12.68 | 0.12 |
| DDN-Rony et al. | 99.02 | 60.34 | 50.67 | 95.65 | 77.79 | 26.59 | 2.64 |

TABLE 9

Accuracies of models trained on CIFAR10 with $\ell$2-norm constrained attacks.
These robust accuracies are calculated under only whitebox PGD
attacks. sd0 and sd1 indicate 2 different random seeds

| CIFAR10 | | | | RobAcc under different $\epsilon$, whitebox only | | | | |
|---|---|---|---|---|---|---|---|---|
| Model | Cln Acc | AvgAcc | AvgRobAcc | 0.5 | 1.0 | 1.5 | 2.0 | 2.5 |
| STD | 94.92 | 15.82 | 0.00 | 0.01 | 0.00 | 0.00 | 0.00 | 0.00 |
| PGD-0.5 | 89.10 | 33.64 | 22.55 | 65.61 | 33.23 | 11.29 | 2.34 | 0.29 |
| PGD-1.0 | 83.25 | 39.74 | 31.04 | 66.69 | 46.11 | 26.16 | 12.00 | 4.26 |
| PGD-1.5 | 75.80 | 41.81 | 35.02 | 62.74 | 48.35 | 33.80 | 20.17 | 10.03 |
| PGD-2.0 | 71.05 | 41.88 | 36.05 | 59.80 | 47.92 | 35.39 | 23.34 | 13.81 |
| PGD-2.5 | 65.17 | 41.03 | 36.20 | 55.66 | 45.82 | 35.90 | 26.14 | 17.49 |
| PGDLS-0.5 | 89.43 | 33.44 | 22.25 | 65.50 | 32.42 | 10.78 | 2.17 | 0.36 |
| PGDLS-1.0 | 83.62 | 39.50 | 30.68 | 67.30 | 45.35 | 25.49 | 11.19 | 4.08 |
| PGDLS-1.5 | 77.03 | 41.80 | 34.75 | 63.76 | 48.46 | 33.11 | 19.12 | 9.32 |
| PGDLS-2.0 | 72.14 | 42.24 | 36.27 | 60.96 | 48.28 | 35.32 | 23.38 | 13.39 |
| PGDLS-2.5 | 66.21 | 41.34 | 36.36 | 56.49 | 46.72 | 36.13 | 25.73 | 16.75 |
| MMA-1.0-sd0 | 88.02 | 35.58 | 25.09 | 66.19 | 37.80 | 15.61 | 4.79 | 1.06 |
| MMA-1.0-sd1 | 88.92 | 35.74 | 25.10 | 66.81 | 37.22 | 15.78 | 4.57 | 1.14 |
| MMA-2.0-sd0 | 84.22 | 41.22 | 32.62 | 65.98 | 46.11 | 28.56 | 15.60 | 6.86 |
| MMA-2.0-sd1 | 85.16 | 40.60 | 31.69 | 65.45 | 45.27 | 28.07 | 13.99 | 5.67 |
| MMA-3.0-sd0 | 82.11 | 43.67 | 35.98 | 64.25 | 47.61 | 33.48 | 22.07 | 12.50 |
| MMA-3.0-sd1 | 81.79 | 43.75 | 36.14 | 63.82 | 47.33 | 33.79 | 22.36 | 13.40 |
| OMMA-1.0-sd0 | 89.02 | 35.49 | 24.79 | 65.46 | 37.38 | 15.34 | 4.76 | 1.00 |
| OMMA-1.0-sd1 | 89.97 | 35.41 | 24.49 | 66.24 | 36.47 | 14.44 | 4.43 | 0.89 |
| OMMA-2.0-sd0 | 86.06 | 42.80 | 34.14 | 65.55 | 46.29 | 30.60 | 18.23 | 10.05 |
| OMMA-2.0-sd1 | 85.04 | 42.96 | 34.55 | 65.23 | 46.32 | 31.07 | 19.36 | 10.75 |
| OMMA-3.0-sd0 | 83.86 | 46.46 | 38.99 | 64.67 | 49.34 | 36.40 | 26.50 | 18.02 |
| OMMA-3.0-sd1 | 84.00 | 45.59 | 37.91 | 64.31 | 48.50 | 35.92 | 24.81 | 16.03 |
| PGD-ens | 85.63 | 41.32 | 32.46 | 63.27 | 46.66 | 29.35 | 15.95 | 7.09 |
| PGDLS-ens | 86.11 | 41.39 | 32.45 | 64.04 | 46.99 | 29.11 | 15.51 | 6.59 |
| DDN-Rony et al. | 89.05 | 36.25 | 25.69 | 66.51 | 39.02 | 16.63 | 5.05 | 1.24 |

TABLE 10

The TransferGap of models trained on MNIST with $\ell$ 2-norm constrained attacks.
TransferGap indicates the gap between robust accuracy under only whitebox PGD
attacks and under combined (whitebox + transfer) PGD attacks. sd0 and sd1 indicate 2 different random seeds

| MNIST | | | | TransferGap: RobAcc drop after adding transfer attacks | | | |
| --- | --- | --- | --- | --- | --- | --- | --- |
| Model | Cln Acc | AvgAcc | AvgRobAcc | 0.1 | 0.2 | 0.3 | 0.4 |
| STD | — | 0.00 | 0.00 | 0.01 | 0.00 | 0.00 | 0.00 |
| PGD-0.1 | — | 0.06 | 0.07 | 0.00 | 0.20 | 0.08 | 0.00 |
| PGD-0.2 | — | 0.00 | 0.00 | 0.00 | 0.00 | 0.02 | 0.00 |
| PGD-0.3 | — | 0.38 | 0.48 | 0.00 | 0.00 | 0.10 | 1.81 |
| PGD-0.4 | — | 2.14 | 2.67 | 0.10 | 0.70 | 2.33 | 7.55 |
| PGD-0.45 | — | 0.00 | 0.00 | 0.00 | 0.00 | 0.00 | 0.00 |
| PGDLS-0.1 | — | 0.09 | 0.11 | 0.00 | 0.43 | 0.02 | 0.00 |
| PGDLS-0.2 | — | 0.08 | 0.11 | 0.00 | 0.00 | 0.42 | 0.00 |
| PGDLS-0.3 | — | 0.29 | 0.36 | 0.01 | 0.00 | 0.54 | 0.90 |
| PGDLS-0.4 | — | 2.42 | 3.02 | 0.01 | 0.13 | 1.01 | 10.93 |
| PGDLS-0.45 | — | 0.97 | 1.22 | 0.00 | 0.30 | 1.25 | 3.32 |
| MMA-0.45-sd0 | — | 0.83 | 1.04 | 0.02 | 0.25 | 0.98 | 2.92 |
| MMA-0.45-sd1 | — | 0.80 | 0.99 | 0.01 | 0.18 | 0.71 | 3.08 |
| OMMA-0.45-sd0 | — | 1.12 | 1.40 | 0.01 | 0.17 | 1.28 | 4.13 |
| OMMA-0.45-sd1 | — | 1.42 | 1.78 | 0.03 | 0.28 | 1.72 | 5.07 |
| PGD-ens | — | 0.04 | 0.05 | 0.06 | 0.12 | 0.01 | 0.00 |
| PGDLS-ens | — | 0.05 | 0.06 | 0.02 | 0.16 | 0.07 | 0.00 |
| PGD-Madry et al. | — | 0.04 | 0.05 | 0.00 | 0.04 | 0.15 | 0.02 |

TABLE 11

The TransferGap of models trained on CIFAR10 with $\ell$ ∞-norm constrained attacks.
TransferGap indicates the gap between robust accuracy under only whitebox PGD
attacks and under combined (whitebox + transfer) PGD attacks. sd0 and sd1 indicate 2 different random seeds

| CIFAR10 | | | | TransferGap: RobAcc drop after adding transfer attacks | | | | | | | |
| --- | --- | --- | --- | --- | --- | --- | --- | --- | --- | --- | --- |
| Model | Cln Acc | AvgAcc | AvgRobAcc | 4 | 8 | 12 | 16 | 20 | 24 | 28 | 32 |
| STD | — | 0.00 | 0.00 | 0.00 | 0.00 | 0.00 | 0.00 | 0.00 | 0.00 | 0.00 | 0.00 |
| PGD-4 | — | 0.02 | 0.02 | 0.02 | 0.02 | 0.05 | 0.02 | 0.02 | 0.01 | 0.01 | 0.01 |
| PGD-8 | — | 0.02 | 0.02 | 0.00 | 0.02 | 0.06 | 0.04 | 0.02 | 0.02 | 0.00 | 0.01 |
| PGD-12 | — | 0.05 | 0.05 | 0.02 | 0.03 | 0.06 | 0.11 | 0.10 | 0.07 | 0.03 | 0.02 |
| PGD-16 | — | 0.14 | 0.15 | 0.08 | 0.08 | 0.20 | 0.26 | 0.28 | 0.18 | 0.11 | 0.03 |
| PGD-20 | — | 0.39 | 0.44 | 0.03 | 0.19 | 0.49 | 0.64 | 0.70 | 0.60 | 0.59 | 0.31 |
| PGD-24 | — | 0.03 | 0.03 | 0.00 | 0.00 | 0.00 | 0.01 | 0.02 | 0.05 | 0.05 | 0.13 |
| PGD-28 | — | 0.00 | 0.00 | 0.00 | 0.00 | 0.00 | 0.00 | 0.00 | 0.00 | 0.00 | 0.00 |
| PGD-32 | — | 0.00 | 0.00 | 0.00 | 0.00 | 0.00 | 0.00 | 0.00 | 0.00 | 0.00 | 0.00 |
| PGDLS-4 | — | 0.04 | 0.04 | 0.00 | 0.01 | 0.10 | 0.11 | 0.09 | 0.02 | 0.01 | 0.00 |
| PGDLS-8 | — | 0.02 | 0.02 | 0.00 | 0.00 | 0.05 | 0.06 | 0.03 | 0.04 | 0.01 | 0.00 |
| PGDLS-12 | — | 0.05 | 0.05 | 0.01 | 0.02 | 0.06 | 0.13 | 0.11 | 0.06 | 0.03 | 0.02 |
| PGDLS-16 | — | 0.09 | 0.10 | 0.01 | 0.04 | 0.14 | 0.22 | 0.13 | 0.12 | 0.09 | 0.03 |
| PGDLS-20 | — | 0.21 | 0.24 | 0.00 | 0.07 | 0.28 | 0.41 | 0.47 | 0.28 | 0.29 | 0.13 |
| PGDLS-24 | — | 0.73 | 0.82 | 0.04 | 0.34 | 0.80 | 1.08 | 1.23 | 1.22 | 1.18 | 0.65 |
| PGDLS-28 | — | 1.47 | 1.66 | 0.06 | 0.46 | 1.18 | 1.99 | 2.57 | 2.73 | 2.34 | 1.92 |
| PGDLS-32 | — | 2.91 | 3.28 | 0.03 | 0.38 | 1.50 | 3.25 | 4.76 | 5.21 | 5.30 | 5.78 |
| MMA-12-sd0 | — | 0.67 | 0.76 | 0.03 | 0.20 | 0.72 | 1.29 | 1.58 | 1.25 | 0.64 | 0.35 |
| MMA-12-sd1 | — | 0.45 | 0.50 | 0.09 | 0.66 | 1.05 | 1.04 | 0.70 | 0.28 | 0.15 | 0.06 |
| MMA-20-sd0 | — | 2.86 | 3.22 | 0.15 | 1.85 | 4.23 | 5.42 | 5.23 | 4.31 | 2.89 | 1.68 |
| MMA-20-sd1 | — | 4.35 | 4.90 | 0.19 | 2.00 | 4.74 | 7.43 | 8.18 | 7.37 | 5.67 | 3.58 |
| MMA-32-sd0 | — | 7.19 | 8.09 | o.43 | 3.02 | 7.29 | 11.10 | 12.41 | 11.89 | 10.33 | 8.26 |
| MMA-32-sd1 | — | 4.42 | 4.97 | 0.25 | 2.28 | 5.29 | 7.50 | 8.01 | 6.87 | 5.59 | 3.96 |
| OMMA-12-sd0 | — | 3.02 | 3.40 | 0.53 | 3.53 | 6.00 | 6.36 | 5.19 | 3.12 | 1.59 | 0.90 |
| OMMA-12-sd1 | — | 4.06 | 4.57 | 0.54 | 3.67 | 7.62 | 9.08 | 7.37 | 4.68 | 2.46 | 1.15 |
| OMMA-20-sd0 | — | 8.59 | 9.66 | 1.46 | 7.59 | 13.84 | 15.83 | 14.46 | 11.08 | 7.68 | 5.37 |
| OMMA-20-sd1 | — | 6.72 | 7.56 | 1.12 | 5.95 | 10.61 | 12.48 | 11.72 | 9.08 | 6.00 | 3.51 |
| OMMA-32-sd0 | — | 10.51 | 11.83 | 1.55 | 7.39 | 13.68 | 16.90 | 17.47 | 15.63 | 12.67 | 9.31 |
| OMMA-32-sd1 | — | 10.38 | 11.67 | 1.94 | 8.90 | 14.99 | 17.88 | 17.15 | 13.99 | 10.63 | 7.92 |
| PGD-ens | — | 0.73 | 0.82 | 0.26 | 0.72 | 1.49 | 1.53 | 1.44 | 0.66 | 0.34 | 0.13 |
| PGDLS-ens | — | 1.08 | 1.21 | 0.64 | 1.25 | 1.57 | 1.76 | 1.64 | 1.45 | 0.77 | 0.62 |
| PGD-Madry et al. | — | 0.14 | 0.16 | 0.00 | 0.02 | 0.12 | 0.37 | 0.32 | 0.30 | 0.09 | 0.04 |

TABLE 12

The TransferGap of models trained on MNIST with ℓ 2-norm constrained attacks.
TransferGap indicates the gap between robust accuracy under only whitebox PGD
attacks and under combined (whitebox + transfer) PGD attacks. sd0 and sd1 indicate 2 different random seeds

| MNIST | | | | TransferGap: RobAcc drop after adding transfer attacks | | | |
|---|---|---|---|---|---|---|---|
| Model | Cln Acc | AvgAcc | AvgRobAcc | 1.0 | 2.0 | 3.0 | 4.0 |
| STD | — | 0.06 | 0.07 | 0.00 | 0.24 | 0.05 | 0.00 |
| PGD-1.0 | — | 0.76 | 0.96 | 0.01 | 2.15 | 1.65 | 0.01 |
| PGD-2.0 | — | 0.24 | 0.30 | 0.00 | 0.24 | 0.88 | 0.10 |
| PGD-3.0 | — | 0.57 | 0.72 | 0.01 | 0.50 | 1.79 | 0.57 |
| PGD-4.0 | — | 0.41 | 0.51 | 0.07 | 0.24 | 0.92 | 0.81 |
| PGDLS-1.0 | — | 0.56 | 0.70 | 0.02 | 1.52 | 1.08 | 0.16 |
| PGDLS-2.0 | — | 0.44 | 0.55 | 0.00 | 0.40 | 1.79 | 0.02 |
| PGDLS-3.0 | — | 0.47 | 0.59 | 0.01 | 0.33 | 1.59 | 0.43 |
| PGDLS-4.0 | — | 0.39 | 0.49 | 0.05 | 0.16 | 0.91 | 0.84 |
| MMA-2.0-sd0 | — | 0.12 | 0.15 | 0.00 | 0.29 | 0.29 | 0.00 |
| MMA-2.0-sd1 | — | 0.13 | 0.16 | 0.01 | 0.27 | 0.34 | 0.01 |
| MMA-4.0-sd0 | — | 0.26 | 0.33 | 0.00 | 0.05 | 0.68 | 0.57 |
| MMA-4.0-sd1 | — | 0.35 | 0.43 | 0.00 | 0.11 | 0.98 | 0.64 |
| MMA-6.0-sd0 | — | 0.29 | 0.36 | 0.00 | 0.09 | 0.69 | 0.66 |
| MMA-6.0-sd1 | — | 0.25 | 0.31 | 0.00 | 0.07 | 0.62 | 0.54 |
| OMMA-2.0-sd0 | — | 0.11 | 0.13 | 0.00 | 0.30 | 0.24 | 0.00 |
| OMMA-2.0-sd1 | — | 0.09 | 0.11 | 0.00 | 0.13 | 0.30 | 0.00 |
| OMMA-4.0-sd0 | — | 0.27 | 0.34 | 0.00 | 0.09 | 0.63 | 0.64 |
| OMMA-4.0-sd1 | — | 0.21 | 0.26 | 0.00 | 0.05 | 0.55 | 0.45 |
| OMMA-6.0-sd0 | — | 0.22 | 0.27 | 0.00 | 0.12 | 0.60 | 0.36 |
| OMMA-6.0-sd1 | — | 0.28 | 0.35 | 0.00 | 0.09 | 0.86 | 0.45 |
| PGD-ens | — | 0.44 | 0.55 | 0.36 | 0.82 | 0.97 | 0.05 |
| PGDLS-ens | — | 0.27 | 0.33 | 0.34 | 0.63 | 0.35 | 0.01 |
| DDN-Rony et al. | — | 0.41 | 0.51 | 0.00 | 0.14 | 1.15 | 0.77 |

TABLE 13

The TransferGap of models trained on CIFAR10 with ℓ 2-norm constrained attacks.
TransferGap indicates the gap between robust accuracy under only whitebox PGD
attacks and under combined (whitebox + transfer) PGD attacks. sd0 and sd1 indicate 2 different random seeds

| CIFAR10 | | | | TransferGap: RobAcc drop after adding transfer attacks | | | | |
|---|---|---|---|---|---|---|---|---|
| Model | Cln Acc | AvgAcc | AvgRobAcc | 0.5 | 1.0 | 1.5 | 2.0 | 2.5 |
| STD | — | 0.00 | 0.00 | 0.00 | 0.00 | 0.00 | 0.00 | 0.00 |
| PGD-0.5 | — | 0.02 | 0.02 | 0.00 | 0.02 | 0.04 | 0.03 | 0.01 |
| PGD-1.0 | — | 0.04 | 0.05 | 0.00 | 0.03 | 0.11 | 0.08 | 0.05 |
| PGD-1.5 | — | 0.06 | 0.07 | 0.04 | 0.03 | 0.08 | 0.10 | 0.12 |
| PGD-2.0 | — | 0.11 | 0.13 | 0.04 | 0.07 | 0.10 | 0.19 | 0.25 |
| PGD-2.5 | — | 0.10 | 0.12 | 0.06 | 0.06 | 0.14 | 0.14 | 0.22 |
| PGDLS-0.5 | — | 0.03 | 0.04 | 0.01 | 0.02 | 0.05 | 0.08 | 0.03 |
| PGDLS-1.0 | — | 0.05 | 0.06 | 0.01 | 0.05 | 0.06 | 0.11 | 0.05 |
| PGDLS-1.5 | — | 0.06 | 0.07 | 0.00 | 0.03 | 0.07 | 0.12 | 0.15 |
| PGDLS-2.0 | — | 0.09 | 0.11 | 0.06 | 0.06 | 0.11 | 0.19 | 0.13 |
| PGDLS-2.5 | — | 0.13 | 0.15 | 0.04 | 0.06 | 0.20 | 0.22 | 0.24 |
| MMA-1.0-sd0 | — | 0.03 | 0.03 | 0.01 | 0.05 | 0.03 | 0.05 | 0.03 |
| MMA-1.0-sd1 | — | 0.05 | 0.06 | 0.00 | 0.06 | 0.07 | 0.08 | 0.07 |
| MMA-2.0-sd0 | — | 0.74 | 0.89 | 0.07 | 0.45 | 1.16 | 1.42 | 1.36 |
| MMA-2.0-sd1 | — | 0.79 | 0.94 | 0.09 | 0.83 | 1.65 | 1.36 | 0.79 |
| MMA-3.0-sd0 | — | 2.08 | 2.49 | 0.03 | 1.20 | 3.25 | 4.22 | 3.77 |
| MMA-3.0-sd1 | — | 2.59 | 3.11 | 0.24 | 1.74 | 4.02 | 4.84 | 4.71 |
| OMMA-1.0-sd0 | — | 0.31 | 0.38 | 0.03 | 0.49 | 0.57 | 0.58 | 0.21 |
| OMMA-1.0-sd1 | — | 0.20 | 0.24 | 0.08 | 0.37 | 0.40 | 0.26 | 0.10 |
| OMMA-2.0-sd0 | — | 3.48 | 4.18 | 0.27 | 2.47 | 5.75 | 6.70 | 5.69 |
| OMMA-2.0-sd1 | — | 3.28 | 3.94 | 0.54 | 1.96 | 5.18 | 6.44 | 5.56 |
| OMMA-3.0-sd0 | — | 5.85 | 7.02 | 0.53 | 3.73 | 8.28 | 11.50 | 11.05 |
| OMMA-3.0-sd1 | — | 4.93 | 5.92 | 0.50 | 3.28 | 7.45 | 9.40 | 8.95 |
| PGD-ens | — | 0.94 | 1.12 | 0.29 | 0.79 | 1.44 | 1.72 | 1.37 |
| PGDLS-ens | — | 1.01 | 1.22 | 0.30 | 0.78 | 1.53 | 2.19 | 1.28 |
| DDN-Rony et al. | — | 0.02 | 0.02 | 0.00 | 0.00 | 0.03 | 0.03 | 0.04 |

What is claimed is:

1. A system for generating an output data set representing an adversarial example adapted for training a neural network, the system comprising:
   a data receiver configured to receive one or more data sets including at least one data set representing a benign training example (x);
   an adversarial generator engine configured to:
      dynamically generate, using the neural network, a first adversarial example ($Adv_1$) having a perturbation length ($epsilon_1$) against benign training example (x);
      conduct a search in a direction ($Adv_1$-x) using the neural network;
      dynamically generate, using the neural network, a second adversarial example ($Adv_2$) having a perturbation length ($epsilon_2$) based at least on an output of the search in the direction ($Adv_1$-x).

2. The system of claim 1, wherein a neural network training processor is configured to train the neural network against the adversarial example using $Adv_2$, and wherein the dynamic generation of the second adversarial example includes maximizing an average margin of a data distribution (D) of the one or more data sets by optimizing an objective function $$\min_\theta \left\{ \sum_{i \in S_\theta^+} \max\{0, d_{max} - d_\theta(x_i, y_i)\} + \beta \sum_{j \in S_\theta^-} \mathcal{J}_\theta(x_j, y_j) \right\},$$

where $S_\theta^+ = \{i : L_\theta^{LM}(x_i, y_i) < 0\}$ is a set of correctly classified examples, $S_\theta^- = \{i : L_\theta^{LM}(x_i, y_i) \geq 0\}$ is a set of wrongly classified examples, $\mathcal{J}(\bullet)$ is a regular classification loss function, $d_\theta(\bullet)(x_i, y_i)$ is a margin for correctly classified samples, and $\beta$ is a coefficient for balancing correct classification and margin maximization.

3. The system of claim 1, wherein the adversarial generator engine is configured to conduct a search in a direction ($Adv_2$-x); and to generate a third adversarial example ($Adv_3$) having a perturbation length ($epsilon_3$) based at least on an output of the search in the direction ($Adv_2$-x).

4. The system of claim 3, wherein a neural network training processor is configured to train the neural network against the adversarial example using $Adv_3$.

5. The system of claim 1, wherein the search includes at least determining a point near the benign training example and along a search direction such that a logit loss is approximately zero at the point.

6. The system of claim 1, wherein the perturbation lengths are stored in a dictionary data structure of a data storage device.

7. The system of claim 6, wherein when the neural network encounters a new training example, a stored perturbation length is used by the neural network training processor to initialize a hyperparameter representing a minimum perturbation length.

8. The system of claim 2, wherein the training includes labelling the adversarial examples as negative training examples.

9. The system of claim 3, further comprising determining a level of available computational resources, and upon determining that the level of available computational resources is below a pre-defined threshold, training the neural network against adversarial examples using $Adv_2$.

10. The system of claim 1, further comprising generating a prediction based at least upon a logit loss of a perturbation, and wherein the prediction indicates that the logit loss >0, training the neural network against adversarial examples using $Adv_2$.

11. A method for generating a data set representing an adversarial example adapted for training a neural network, the method comprising:
    receiving one or more data sets including at least one data set representing a benign training example (x);
    dynamically generating a first adversarial example ($Adv_1$) having a perturbation length ($epsilon_1$) against benign training example (x);
    conducting a search in a direction ($Adv_1$-x);
    dynamically generating a second adversarial example ($Adv_2$) having a perturbation length ($epsilon_2$) based at least on an output of the search in the direction ($Adv_1$-x).

12. The method of claim 11, comprising training the neural network against adversarial examples using $Adv_2$ and wherein the step of dynamically generating the second adversarial example includes maximizing an average margin of a data distribution (D) of the one or more data sets by optimizing an objective function $$\min_\theta \left\{ \sum_{i \in S_\theta^+} \max\{0, d_{max} - d_\theta(x_i, y_i)\} + \beta \sum_{j \in S_\theta^-} \mathcal{J}_\theta(x_j, y_j) \right\},$$

where $S_\theta^+ = \{i : L_\theta^{LM}(x_i, y_i) < 0\}$ is a set of correctly classified examples, $S_\theta^- = \{i : L_\theta^{LM}(x_i, y_i) \geq 0\}$ is a set of wrongly classified examples, $\mathcal{J}(\bullet)$ is a regular classification loss function, $d_\theta(x_i, y_i)$ is a margin for correctly classified samples, and $\beta$ is a coefficient for balancing correct classification and margin maximization.

13. The method of claim 11, further comprising conducting a search in a direction ($Adv_2$-x); and generating a third adversarial example ($Adv_3$) having a perturbation length ($epsilon_3$) based at least on an output of the search in the direction ($Adv_2$-x).

14. The method of claim 13, further comprising training the neural network against adversarial examples using $Adv_3$.

15. The method of claim 11, wherein the search includes at least determining a point near the benign training example and along a search direction such that a logit loss is approximately zero at the point.

16. The method of claim 11, wherein the perturbation lengths are stored in a dictionary data structure.

17. The method of claim 16, wherein when the neural network encounters a new training example, a stored perturbation length is used to initialize a hyperparameter representing a minimum perturbation length.

18. The method of claim 12, wherein the training includes labelling the adversarial examples as negative training examples.

19. The method of claim 13, further comprising determining a level of available computational resources, and upon determining that the level of available computational resources is below a pre-defined threshold, training the neural network against adversarial examples using $Adv_2$.

20. A non-transitory computer readable medium storing machine interpretable instructions, which when executed by a processor, cause the processor to perform a method for generating a data set representing an adversarial example adapted for training a neural network, the method comprising:

receiving one or more data sets including at least one data set representing a benign training example (x);

dynamically generating a first adversarial example ($Adv_1$) having a perturbation length ($epsilon_1$) against benign training example (x);

conducting a search in a direction ($Adv_1$-x);

dynamically generating a second adversarial example ($Adv_2$) having a perturbation length ($epsilon_2$) based at least on an output of the search in the direction ($Adv_1$-x).

21. A computer server including a non-transitory computer readable medium storing data elements representing a neural network trained using an adversarial example generated by executing stored machine interpretable instructions causing the computer server to perform a method for generating a data set representing the adversarial example adapted for training a neural network, the method comprising:

receiving one or more data sets including at least one data set representing a benign training example (x);

dynamically generating a first adversarial example ($Adv_1$) having a perturbation length ($epsilon_1$) against benign training example (x);

conducting a search in a direction ($Adv_1$-x);

dynamically generating a second adversarial example ($Adv_2$) having a perturbation length ($epsilon_2$) based at least on an output of the search in the direction ($Adv_1$-x).

\* \* \* \* \*

UNITED STATES PATENT AND TRADEMARK OFFICE
CERTIFICATE OF CORRECTION

PATENT NO. : 11,568,261 B2
APPLICATION NO. : 16/664139
DATED : January 31, 2023
INVENTOR(S) : Weiguang Ding et al.

It is certified that error appears in the above-identified patent and that said Letters Patent is hereby corrected as shown below:

In the Claims

Column 51 Lines 34 - 39 (Claim 2):
"where $S_\theta^+ = \{i : L_\theta^{LM}(x_i, y_i) < 0\}$ is a set of correctly classified examples, $S_\theta^- = \{i : L_\theta^{LM}(x_i, y_i) \geq 0\}$ is a set of wrongly classified examples, $\mathcal{J}(\cdot)$ is a regular classification loss function, $d_\theta(x_i, y_i)$ is a margin for correctly classified samples, and β is a coefficient for balancing correct classification and margin maximization."

Should read:
--where $S_\theta^+ = \{i : L_\theta^{LM}(x_i, y_i) < 0\}$ is a set of correctly classified examples, $S_\theta^- = \{i : L_\theta^{LM}(x_i, y_i) \geq 0\}$ is a set of wrongly classified examples, $\mathcal{J}_{\prime\prime}(\cdot)$ is a regular classification loss function, $d_\theta(x_i, y_i)$ is a margin for correctly classified samples, and β is a coefficient for balancing correct classification and margin maximization.--

Column 52 Lines 33 - 38 (Claim 12):
"where $S_\theta^+ = \{i : L_\theta^{LM}(x_i, y_i) < 0\}$ is a set of correctly classified examples, $S_\theta^- = \{i : L_\theta^{LM}(x_i, y_i) \geq 0\}$ is a set of wrongly classified examples, $\mathcal{J}(\cdot)$ is a regular classification loss function, $d_\theta(x_i, y_i)$ is a margin for correctly classified samples, and β is a coefficient for balancing correct classification and margin maximization."

Should read:
--where $S_\theta^+ = \{i : L_\theta^{LM}(x_i, y_i) < 0\}$ is a set of correctly classified examples, $S_\theta^- = \{i : L_\theta^{LM}(x_i, y_i) \geq 0\}$ is a set of wrongly classified examples, $\mathcal{J}_{\prime\prime}(\cdot)$ is a regular classification loss function, $d_\theta(x_i, y_i)$ is a margin for correctly classified samples, and β is a coefficient for balancing correct classification and margin maximization.--

Signed and Sealed this
Twenty-second Day of October, 2024

Katherine Kelly Vidal
*Director of the United States Patent and Trademark Office*